(12) United States Patent
Omran et al.

(10) Patent No.: US 12,508,458 B1
(45) Date of Patent: Dec. 30, 2025

(54) METHOD OF PHOTOCATALYTIC DEGRADATION AND WATER SPLITTING USING NANOCOMPOSITE

(71) Applicant: IMAM MOHAMMAD IBN SAUD ISLAMIC UNIVERSITY, Riyadh (SA)

(72) Inventors: Mohamed Khairy Abdel Fattah Omran, Riyadh (SA); Mohamed Mokhtar Mohamed, Benha (EG); Gamal Owes El-Sayed Owes, Benha (EG); Enas Ebrahim Abdelmonem Mohamed, Benha (EG); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 18/967,004

(22) Filed: Dec. 3, 2024

(51) Int. Cl.
*A62D 3/38* (2007.01)
*A62D 3/115* (2007.01)
*C25B 1/04* (2021.01)
*A62D 101/20* (2007.01)

(52) U.S. Cl.
CPC ............ *A62D 3/115* (2013.01); *A62D 3/38* (2013.01); *C25B 1/04* (2013.01); *A62D 2101/20* (2013.01); *A62D 2203/04* (2013.01)

(58) Field of Classification Search
CPC .. C25B 1/04; A62D 2203/04; A62D 2101/20; A62D 3/38; A62D 3/115
See application file for complete search history.

(56) References Cited

U.S. PATENT DOCUMENTS

| | | | |
|---|---|---|---|
| 2009/0188783 | A1 | 7/2009 | Yamada et al. |
| 2021/0315205 | A1* | 10/2021 | Mccolgan ............... A01N 59/02 |
| 2023/0330644 | A1 | 10/2023 | Faisal et al. |

FOREIGN PATENT DOCUMENTS

| | | |
|---|---|---|
| CN | 110075896 A | 8/2019 |
| KR | 10-2243014 81 | 4/2021 |

OTHER PUBLICATIONS

Mohamed, et al, Bifunctional Fe active sites on carbon nitride and titanium-based 2D nanomaterials for efficient visible light driven ciprofloxacin degradation and overall water splitting:, Energy Conversion and Management, vol. 309, Jun. 1, 2024 (Year: 2024).*

(Continued)

*Primary Examiner* — Anthony J Zimmer
*Assistant Examiner* — Eric Scott Sherman
(74) *Attorney, Agent, or Firm* — Oblon, McClelland, Maier & Neustadt, L.L.P.

(57) ABSTRACT

A nanocomposite material including iron sulfide ($FeS_2$) nanoparticles, iron oxide ($\alpha\text{-}Fe_2O_3$) nanoparticles, titanium dioxide ($TiO_2$) nanoparticles, and graphitic carbon nitride ($C_3N_4$) nanosheets and a method of its preparation. The nanocomposite is used in a method of forming oxygen gas from water using an applied voltage and photoirradiation, a method of forming hydrogen gas from water using an applied voltage and photoirradiation, and a method of photodegrading organic pollutants using visible light photoirradiation.

20 Claims, 44 Drawing Sheets

(56) References Cited

OTHER PUBLICATIONS

Mohamed Mokhtar Mohamed, et al., "Bifunctional Fe active sites on carbon nitride and titanium-based 2D nanomaterials for efficient visible light-driven ciprofloxacin degradation and overall water splitting", Energy Conversion and Management, vol. 309. Jun. 1, 2024 (6 pages).

Ranji Rajendran, et al., "Designing of TiO2/α-Fe2O3 coupled g-C3N4 magnetic heterostructure composite for efficient Z-scheme photo-degradation process under visible light exposures", Journal of Alloys and Compounds, vol. 894, Feb. 15, 2022 (6 pages).

Shanmugam Vignesh, et al., "TiO2-CeO2/g-C3N4 S-scheme heterostructure composite for enhanced photo-degradation and hydrogen evolution performance with combined experimental and DFT study", Chemosphere, vol. 288, Part 3; Feb. 2022 (6 pages).

\* cited by examiner

METHOD OF PHOTOCATALYTIC DEGRADATION AND WATER SPLITTING USING NANOCOMPOSITE

STATEMENT OF PRIOR DISCLOSURE BY AN INVENTOR

Aspects of the present disclosure are described in Mohamed Mokhtar Mohamed, Enas E. Abdelmonem, and G. O. El-Sayed, "Bifunctional Fe active sites on carbon nitride and titanium-based 2D nanomaterials for efficient visible light-driven ciprofloxacin degradation and overall water splitting", Energy Conversion and Management, 2024, 309, 118407, which is incorporated herein by reference in its entirety.

BACKGROUND

Technical Field

The present disclosure is directed to a method of forming a nanocomposite including nanoparticles of iron, titanium and graphitic carbon nanosheets for photodegradation and water splitting under visible light.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Fossil fuels, such as coal, oil and natural gas, are the main conventional energy sources in the world due to their availability, stability and high energy density. However, rising demand for clean water and energy, driven by an expanding population, has aggravated significant investments in renewable energy, particularly solar and hydropower. Solar energy is an inexhaustible natural resource. As traditional resources like oil and coal diminish day by day, solar energy is increasingly seen as a sustainable substitute for these conventional fuels. Additionally, visible light-activated photocatalysts can be deployed for self-cleaning, air and water purification, and other applications without incurring non-renewable energy costs post-deployment, as they can effectively decompose a wide variety of pollutants.

Current semiconductor photocatalytic technology harnesses solar energy to address both energy and environmental challenges. By using solar photons, photocatalysts excite electrons and holes that can convert water into clean hydrogen fuel, mitigating issues like fossil fuel depletion and greenhouse gas emissions. A typical photocatalytic system utilizes at least one photoactive composition that, when exposed to sunlight, generates electron/hole pairs to drive energy-storing chemical reactions. Key reactions suited for this system include water splitting (producing hydrogen and oxygen). This light-driven process effectively removes toxic organic pollutants, providing a cost-effective solution to environmental pollution. Furthermore, employing solar energy for the photocatalytic degradation of contaminants, along with the photoelectrochemical splitting of water using semiconductors and photoelectrodes, presents a promising strategy for wastewater treatment and the generation of green energy, including hydrogen ($H_2$).

Currently, a large amount of research has focused on titanium dioxide ($TiO_2$), which has wide industrial applications but faces significant challenges. Despite these remarkable properties, $TiO_2$ use in photocatalytic applications has faced limitations due to its large energy band gap of around 3.2 eV. Being primarily active under UV light with wavelengths shorter than 388 nm, titania utilizes only about 3-5% of solar energy. As part of the modification strategies for the overcoming these titania application limitations, compounds like Cuo, ZnO, $SnO_2$, $WO_3$, $Fe_2O_3$, $CeO_2$ and others have been studied and applied in heterogeneous photocatalysis. However, the search for ways to overcome this challenge remains ongoing. The photocatalytic capability of metal oxide photocatalysts can be significantly increased by carefully modifying the morphology and electronic structure in several adaptable and verifiable ways.

In this context, researchers are focusing on the modification of titanium dioxide ($TiO_2$) to explore its various advantages in the field of energy generation and pollutants removal. $TiO_2$ along with iron oxide (hematite, $\alpha\text{-}Fe_2O_3$) is the most investigated candidate, not only as photoanode materials but also as pollutant-photodegraded materials due to their resistance to photocorrosion, non-toxicity, natural abundance, and low production costs [See Xie, M., et al., ACS Appl Mater Interfaces, 2015, 7, 17112-17121 & Sathe, B. R., et. al., Catal. Sci. Technol., 2014, 4, 2023-2030]. However, the drawbacks of Fe, specifically the high recombination rate of the photogenerated electrons and holes, limit its use [Juan, S et al., J. Mater. Sci., 2016, 51, 7793-7802].

Different methods have been used to modify the chemical structure and their exterior features, such as reducing particle sizes and creating composite components, to overcome the recombination rate. However, there are some important limitations, including a constrained hole diffusion length and a low electrical conductivity, that adversely affect the performance of semiconductors in PEC devices [See Cheng, Y., et. al., ACS Appl. Mater. Interfaces, 2014, 6, 10089-10098].

Two-dimensional (2D) nanomaterials have also emerged extensively in photocatalytic hydrogen production applications owing to their extraordinary optical and electronic properties. Recent progress has made in photocatalytic hydrogen evolution reaction (HER) using 2D nanomaterials (NMs) and composite heterostructures. The strong in-plane chemical bonds along with weak van der Waals interaction make these materials productive for surface-related applications. 2D nanostructures are effective for boosting $TiO_2$ performance in photocatalytic water splitting by increasing light absorption, charge separation, and reaction surface area, these nanostructures help overcome $TiO_2$ limited activity under visible light, resulting in higher hydrogen production efficiency.

Comprehensive research into the photocatalytic foundations of defect-rich metallic oxides for a range of applications, including $H_2$ evolution and contaminant degradation, could significantly advance this area of energy and the environment.

Accordingly, it is one object of the present disclosure to provide a nanocomposite as a promising photocatalytic material to overcome the limitations of existing materials and methods.

SUMMARY

According to a first aspect, a nanocomposite is disclosed. In some embodiments, the nanocomposite includes iron sulfide ($FeS_2$) nanoparticles, iron oxide (hematite, $\alpha\text{-}Fe_2O_3$) nanoparticles, titanium dioxide ($TiO_2$) nanoparticles, and graphitic carbon nitride ($C_3N_4$) nanosheets. In some embodiments, the nanocomposite has a ratio of Fe(II) to Fe(III) of 0.50:1 to 1.15:1. In some embodiments, the nanocomposite has a mean particle size of 100 to 400 nanometer (nm).

In some embodiments, the $TiO_2$ nanoparticles are present in an amount of 1 to 15 wt. %, based on a total weight of nanocomposite, and the $C_3N_4$ nanosheets are present in an amount of 1 to 15 wt. %, based on the total weight of nanocomposite.

In some embodiments, the nanocomposite has a band gap of 1.65 to 2.15 eV and an electrochemical surface area of 13 to 40 millifarads per centimeter square ($mFcm^{-2}$).

In some embodiments, the nanocomposite has a saturation magnetization of 0.001 to 0.1 electromagnetic unit per gram (emu/g), a remnant magnetization of 0.0001 to 0.01 emu/g, and a coercivity of 500 to 2000 gauss (G).

In some embodiments, the method includes forming the nanocomposite by hydrothermally treating an aqueous mixture of an iron precursor and thiourea at 150 to 250° C. for 2 to 48 hours to form an iron including component. The method further includes calcining a mixture of imidazole, hydrochloric acid, and titanium dioxide at a first temperature of 300 to 375° C. for 2 hours and a second temperature of greater than 375 to 450° C. for 1 hour to form a titanium including component. The method further includes the method includes ultrasonically treating a suspension including the iron including component, the titanium including component, and an alcohol having 1 to 4 carbon atoms to form a precursor mixture. The method further includes, drying the precursor mixture to form the nanocomposite.

In some embodiments, the iron precursor is iron (III) acetate, and the aqueous mixture has a ratio of iron (III) acetate to thiourea of 1:1 to 1:5.

In some embodiments, the alcohol having 1 to 4 carbon atoms is methanol, the suspension has a ratio of the iron including component to the titanium including component of 0.01 to 0.15, and the ultrasonically treating is performed for 6 to 24 hours.

In an exemplary embodiment, a method of electrochemically forming oxygen gas by an oxygen evolution reaction is disclosed. The method includes contacting the nanocomposite with an aqueous electrolyte solution including 1.0 M KCl. The method includes applying a potential of 0.01 to 1.5 V to the nanocomposite and a counter electrode immersed in the aqueous electrolyte solution. The method further includes irradiating the nanocomposite with visible light.

In some embodiments, the nanocomposite has an oxygen evolution reaction onset potential of 0.75 to 1.25 V relative to the reversible hydrogen electrode.

In some embodiments, the nanocomposite has a potential required to generate a current density of 10 milliampere per square centimeter ($mAcm^{-2}$) ($\eta 10$) of 0.95 to 1.25 V relative to the reversible hydrogen electrode.

In some embodiments, the nanocomposite has a Tafel slope of 37.5 to 65 millivolts per decade ($mV\ dec^{-1}$).

The present disclosure also relates to a method of electrochemically forming hydrogen gas by a hydrogen evolution reaction using the nanocomposite. In some embodiments, the method includes, contacting the nanocomposite with an aqueous electrolyte solution including 1.0 M KCl. The method includes applying a potential of −1.2 to −0.01 V to the nanocomposite and a counter electrode immersed in the aqueous electrolyte solution. In some embodiments, the method further includes irradiating the nanocomposite with visible light.

In some embodiments, the nanocomposite has a hydrogen evolution reaction onset potential of −0.25 to −0.01 V relative to the reversible hydrogen electrode.

In some embodiments, the nanocomposite has a potential required to generate a current density of 10 $mAcm^{-2}$ ($\eta 10$) of −0.75 to −0.25 V relative to the reversible hydrogen electrode.

In some embodiments, the nanocomposite has a Tafel slope of −40 to −10 $mV\ dec^{-1}$.

In some embodiments, the nanocomposite has a turnover frequency of 0.20 to 0.40 $s^{-1}$.

The present disclosure also relates to a method of photodegrading an organic pollutant using the nanocomposite. In some embodiments, the method includes irradiating with visible light a photodegradation mixture including the organic pollutant, an oxidant selected from the group consisting of hydrogen peroxide and a persulfate salt and the nanocomposite. In some embodiments, the organic pollutant is at least one selected from the group consisting of a dye, a phenol, a polycyclic aromatic hydrocarbon, an herbicide, a pesticide, an antibiotic, and a persistent organic pollutant.

In some embodiments, the nanocomposite is present in the photodegradation mixture in an amount of 0.01 to 0.75 g/100 mL, based on a total volume of the photodegradation mixture.

In some embodiments, the method degrades 70 to 99% of an initial amount of organic pollutant in a reaction time of 180 minutes.

In some embodiments, the oxidant is potassium persulfate, and the organic pollutant is an antibiotic.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
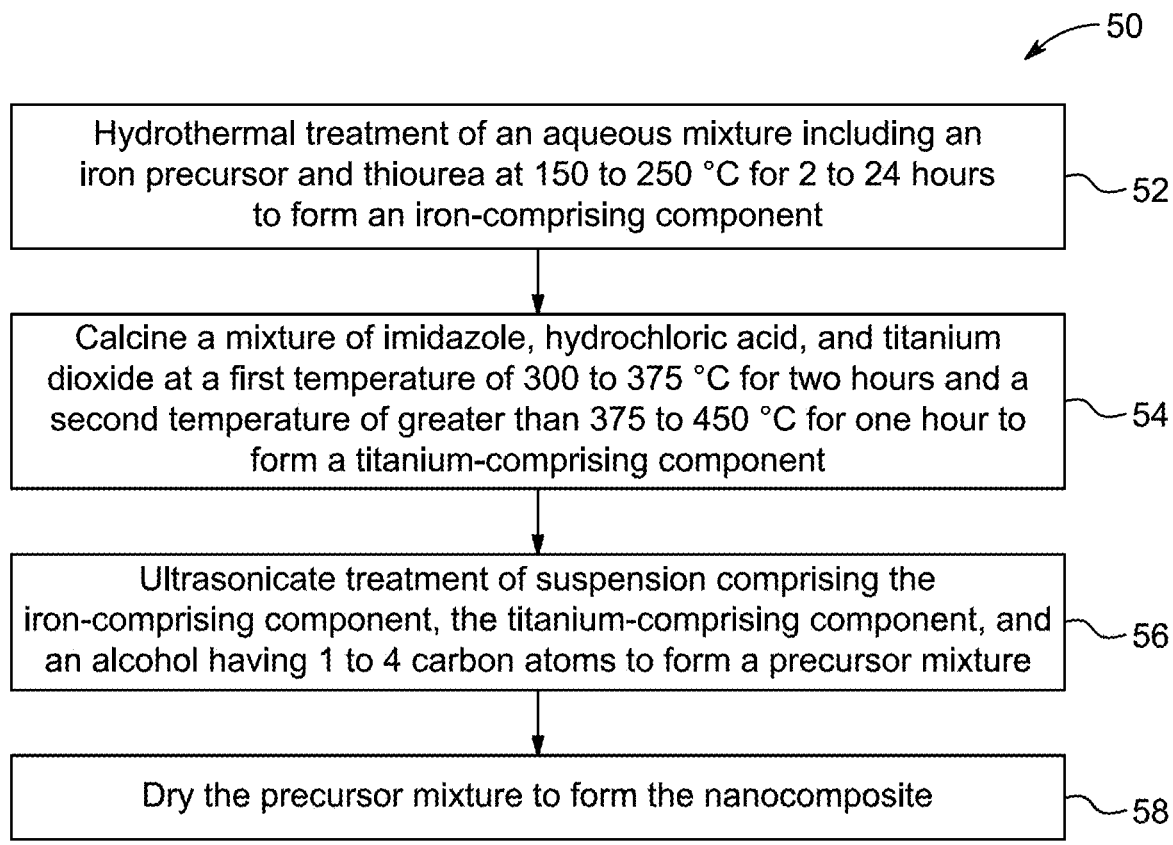
FIG. 1A is a schematic flow chart depicting a method of forming the nanocomposite, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "hydrothermal treatment" or "hydrothermally treating" refers to a process or method involving the use of high-temperature and high-pressure water vapor to induce chemical reactions or transformations in materials. This process typically occurs in a closed system, allowing for the solubilization, crystallization, or synthesis of various compounds, including nanoparticles, ceramics, and composites. Hydrothermal treating is often employed to enhance the structural, thermal, and mechanical properties of materials, facilitating the development of advanced functional materials for applications in catalysis, energy storage, and environmental remediation.

As used herein, the term "electrochemical surface area" refers to the effective area of an electrode that participates in electrochemical reactions. It is an important parameter in electrochemistry, as it influences the kinetics of electron transfer and the overall performance of electrochemical systems, such as batteries, fuel cells, and sensors. The electrochemical surface area can be determined using techniques such as cyclic voltammetry or impedance spectroscopy, providing insights into the active sites available for reaction and the efficiency of charge transfer processes at the electrode interface. A higher electrochemical surface area generally correlates with improved reaction rates and enhanced performance of the electrochemical device.

As used herein, the term "saturation magnetization" refers to the maximum magnetization that a magnetic material can achieve in the presence of an external magnetic field. It represents the extent to which the magnetic moments of the material align in response to the applied field. Saturation magnetization is a critical parameter in characterizing magnetic materials, as it indicates their ability to retain magnetization and influence their performance in applications such as magnetic storage, magnetic resonance imaging (MRI), and magnetic separation processes. This value is typically expressed in units of emu/g (electromagnetic units per gram). It is determined through magnetic measurement techniques such as vibrating sample magnetometry (VSM) or superconducting quantum interference device (SQUID) magnetometry.

As used herein, the term "remnant magnetization" refers to the magnetization that remains in a magnetic material after an external magnetic field has been removed. This phenomenon occurs when the magnetic moments within the material retain a certain degree of alignment due to magnetic interactions, resulting in a non-zero magnetization in the absence of an applied field. Remnant magnetization is an important characteristic in the study of magnetic materials, as it indicates the material's ability to retain magnetic properties, which is important for applications such as permanent magnets, magnetic recording media, and magnetic memory devices. The level of remnant magnetization is typically measured using techniques like hysteresis loop analysis, and it is represented as a specific value that reflects the material's coercivity and overall magnetic stability.

As used herein, the term "coercivity" refers to the measure of a magnetic material's resistance to becoming demagnetized. Specifically, it quantifies the intensity of the external magnetic field that must be applied to reduce the magnetization of a material to zero after it has been magnetized. Coercivity is a critical parameter in determining the suitability of a material for various applications, such as permanent magnets and magnetic storage devices. High coercivity indicates that a material can maintain its magnetization despite external magnetic influences, making it ideal for applications requiring strong and stable magnetic properties. Conversely, low coercivity materials are more easily demagnetized and are typically used in applications where temporary magnetization is sufficient. Coercivity is often assessed through hysteresis loop measurements, which illustrate the relationship between magnetization and applied magnetic field.

As used herein, the term "oxygen evolution reaction" (OER) refers to the electrochemical process in which water or hydroxide ions are oxidized to produce oxygen gas, along with protons and electrons. This reaction typically occurs at the anode during water splitting or in various electrochemical cells, such as fuel cells and electrolyzers. OER is an important reaction in energy conversion and storage technologies, particularly in the context of renewable energy applications, as it is often coupled with hydrogen evolution reactions to harness clean energy from water. The efficiency and kinetics of the OER are significantly influenced by the choice of catalyst materials, as well as the reaction conditions, including pH and temperature. Understanding and optimizing OER is vital for enhancing the overall performance of systems designed for sustainable energy production.

As used herein, the term "Tafel slope" refers to a quantitative measure of the relationship between the overpotential (the additional voltage required beyond the equilibrium potential) and the current density in an electrochemical reaction, particularly in the context of electrode kinetics. It is derived from the Tafel equation, which describes how the rate of an electrochemical reaction varies with the applied potential. The Tafel slope is typically expressed in millivolts per decade (mV/decade) and provides insight into the reaction mechanism and the efficiency of the catalyst used in processes such as the oxygen evolution reaction (OER) and hydrogen evolution reaction (HER). A lower Tafel slope indicates faster reaction kinetics and more efficient electrochemical performance, making it an important parameter in the evaluation of electrocatalysts in energy conversion and storage applications.

As used herein, the term "hydrogen evolution reaction" (HER) refers to an electrochemical process in which hydrogen gas ($H_2$) is generated from an aqueous solution, typically involving the reduction of protons ($H^+$) at the cathode of an electrochemical cell. This reaction is important in various applications, including water splitting, electrolysis, and fuel cells, as it provides a means to produce hydrogen, a clean energy carrier. The efficiency of the HER is influenced by factors such as the choice of catalyst, electrode material, and reaction conditions (e.g., pH and temperature). The kinetics of the HER can be evaluated through parameters such as overpotential and Tafel slope, which are important for optimizing catalysts used in hydrogen production.

FIG. 1A illustrates a schematic flow chart of a method 50 of method of forming the nanocomposite. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes hydrothermally treating an aqueous mixture of an iron precursor and thiourea to form an iron-comprising component.

In some embodiments, the hydrothermally treating is performed at 150 to 250° C., preferably 155 to 245° C., preferably 160 to 240° C., preferably 165 to 235° C., preferably 170 to 230° C., preferably 175 to 225° C., preferably 180 to 220° C., preferably 185 to 215° C., preferably 190 to 210° C., preferably 195 to 205° C., preferably 200° C. In some embodiments, the hydrothermally treating is performed for 2 to 48 hours, preferably 4 to 44 hours, preferably 6 to 42 hours, preferably 8 to 40 hours, preferably 10 to 38 hours, preferably 12 to 36 hours, preferably 14 to 34 hours, preferably 16 to 32 hours, preferably 18 to 30 hours, preferably 20 to 28 hours, preferably 22 to 26 hours, preferably 24 hours.

In general, the iron precursor can be any suitable source of an iron (II) or iron (III) ion. In some embodiments, the iron precursor dissociates into an iron (II) and/or iron (III) ion and an anion in water. Examples of suitable iron precursors include but are not limited to iron (II) sulfate, iron (III) chloride, iron (II) chloride, iron (III) nitrate, ferrous ammonium sulfate, iron (II) sulfide, iron (III) sulfide, iron (III) oxide, iron (II) oxide, iron (II, III) oxide, iron (III) hydroxide, iron (II) fumarate, iron (III) citrate, iron (II) malate, iron (III) bromide, iron (II) oxalate, iron (III) phosphate, iron (II) carbonate, iron (III) sulfamate, iron (II) tartrate, iron (III) thiocyanate, and iron (II) acetate. In a preferred embodiment, the iron precursor is iron (III) acetate.

In some embodiments, the concentration of the iron precursor may range from 0.01 M to 1.0 M, preferably 0.05 to 0.90 M, preferably 0.1 to 0.75 M, preferably 0.15 to 0.5 M, preferably 0.20 to 0.40 M, preferably 0.225 to 0.30 M, preferably 0.25 M.

In some embodiments, the concentration of thiourea may range from 0.1 M to 1.5 M, preferably 0.25 to 1.25 M, preferably 0.5 to 1.0 M, preferably 0.6 to 0.9 M, preferably 0.7 to 0.8 M, preferably 0.75 M.

In some embodiments, the aqueous mixture of iron (III) acetate to thiourea may have a ratio ranging from 1:1 to 1:5, preferably 1:1.5 to 1:4.5, preferably 1:2 to 1:4, preferably 1:2.25 to 1:3.75, preferably 1:2.5 to 1:3.5, preferably 1:2.75 to 1:3.25, preferably 1:2.9 to 1:3.1, preferably 1:3.

In some embodiments, the iron-comprising component may include an iron oxide. Examples of iron oxide include, but are not limited to, $Fe_3O_4$, $Fe_2O_3$, $FeO$, $Fe_4O_5$, $Fe_5O_6$, $Fe_5O_7$, $Fe_{25}O_{32}$, and $Fe_{13}O_{19}$. In some embodiments, the iron-comprising component comprises $Fe_2O_3$. In general, the $Fe_2O_3$ can be any suitable phase of $Fe_2O_3$. Examples of phases of $Fe_2O_3$ include, but are not limited to $\alpha$-$Fe_2O_3$ (also referred to as "alpha phase" or "hematite"), $\beta$-$Fe_2O_3$ (also referred to as "beta phase"), $\gamma$-$Fe_2O_3$ (also referred to as "gamma phase" or "maghemite"), and $\epsilon$-$Fe_2O_3$ (also referred to as "epsilon phase"). In some embodiments, the iron-comprising component comprises $\alpha$-$Fe_2O_3$.

In some embodiments, the iron-comprising component may include an iron sulfide. Examples of iron sulfides include, but are not limited to, $FeS$, $FeS_2$, $Fe_3S_4$, $Fe_{1-x}S$, and $Fe_2S_3$. In some embodiments, the iron-comprising component comprises $FeS_2$.

In some embodiments, the iron-comprising component may include an iron carbide. Examples of iron carbides include, but are not limited to, $Fe_2C$ and $Fe_3C$. In some embodiments, the iron-comprising component is substantially free of an iron carbide. In some embodiments, the iron-comprising component can include iron hydroxide ($Fe(OH)_3$). In some embodiments, the iron-comprising component is substantially free of iron hydroxide ($Fe(OH)_3$). In some embodiments, the iron-comprising component comprises both $FeS_2$ and $\alpha$-$Fe_2O_3$. In some embodiments, the iron-comprising component is substantially free of iron-containing materials and/or phases other than $FeS_2$ and $\alpha$-$Fe_2O_3$.

At step 54, the method 50 includes calcining a mixture of imidazole, hydrochloric acid, and titanium dioxide to form a titanium-comprising component. In some embodiments, the mixture is calcined at a first temperature of 300 to 375° C., preferably 310 to 370° C., preferably 320 to 365° C., preferably 330 to 360° C., preferably 340 to 355° C., preferably 350° C. for a first time period and a second temperature of greater than 375 to 450° C., preferably 380 to 440° C., preferably 385 to 430° C., preferably 390 to 420° C., preferably 395 to 410° C., preferably 400° C. for a second time period. In some embodiments, the first time period (i.e., the duration of the calcination at the first temperature) is 0.5 to 6 hours, preferably 0.75 to 4 hours, preferably 1 to 3 hours, preferably 1.5 to 2.5 hours, preferably 2 hours. In some embodiments, the second time period (i.e., the duration of the calcination at the second temperature) is 0.25 to 3 hours, preferably 0.5 to 2 hours, preferably 0.75 to 1.5 hours, preferably 1 hour. In some embodiments, the calcination may be conducted with a heating rate ranging from 1 to 10° C./min, preferably 2 to 8° C./min, preferably 3 of 6° C./min, preferably 4 of 5.5° C./min, preferably 5° C./min.

In some embodiments, the titanium-comprising component includes an inorganic titanium phase. Examples of inorganic titanium phases which may be included in the titanium-comprising component include, but are not limited to, $Ti_3C_2$, TiN, TiC, TiO, $Ti_3O_5$, $TiAl_3$, $TiB_2$, $TiSi_2$, $TiH_2$, TiZr, TiP, TiS, TiFe, $TiC_2$, $TiO_{2-x}$, $TiNb_2O_5$, TiOxNy, $TiO_2$—$SnO_2$, $Ti4O_7$, and titanium phosphates. In a preferred embodiment, the titanium-comprising component comprises $TiO_2$. In some embodiments, the titanium-comprising component further comprises a carbon nitride. In general, the carbon nitride can be any suitable carbon nitride. Examples of suitable carbon nitrides include, but are not limited to $\beta$-$C_3N_4$ and g-$C_3N_4$ (also referred to as "graphitic carbon nitride"). In some embodiments, the titanium-comprising component comprises g-$C_3N_4$.

At step 56, the method 50 includes ultrasonically treating a suspension comprising the iron-comprising component, the titanium-comprising component, and an alcohol having 1 to 4 carbon atoms to form a precursor mixture.

In general, the alcohol having 1 to 4 carbon atoms may be any suitable alcohol having 1 to 4 carbon atoms. Examples of alcohols having 1 to 4 carbon atoms include, but are not limited to, methanol, ethanol, n-propanol, isopropanol, tert-butanol, 1-butanol, 2-butanol, cyclopropanol, cyclobutanol, glycerol, propylene glycol, butylene glycol, and 1,2-butanediol. In some embodiments, the alcohol having 1 to 4 carbon atoms is methanol.

In some embodiments, the suspension may have a ratio of the iron-comprising component to the titanium-comprising component ranging from 0.01 to 0.15, preferably 0.02 to 0.12, preferably 0.03 to 0.11, preferably 0.04 to 0.10. In some embodiments, the suspension may have a ratio of the iron-comprising component to the titanium-comprising component of 0.04. In some embodiments, the suspension may have a ratio of the iron-comprising component to the titanium-comprising component of 0.10.

In some embodiments, the ultrasonic treatment may be performed for 2 to 24 hours, preferably 4 to 20 hours, preferably 6 to 18 hours, preferably 8 to 16 hours, preferably 10 to 14 hours, preferably about 12 hours.

At step 58, the method 50 includes drying the precursor mixture to form the nanocomposite. In some embodiments, drying may be performed at 25 to 100° C., preferably 40 to 75° C., preferably 50 to 70° C., preferably 55 to 65° C., preferably 60° C. In some embodiments, the drying is performed overnight in an oven.

In some embodiments, the nanocomposite has a ratio of Fe(II) to Fe(III) of from 0.50:1 to 1.15:1, preferably 0.60:1 to 1.10:1, preferably 0.75:1 to 1.05:1, preferably 0.80:1 to 1:1, preferably 0.85:1 to 0.95:1.

In some embodiments, the nanocomposite comprises $FeS_2$ nanoparticles. In general, the $FeS_2$ nanoparticles can be any shape known to one of ordinary skill in the art. Examples of suitable shapes the $FeS_2$ nanoparticles may take include spheres, spheroids, lentoids, ovoids, solid polyhedra such as tetrahedra, cubes, octahedra, icosahedra, dodecahedra, hollow polyhedra (also known as nanocages), stellated polyhedra (both regular and irregular, also known as nanostars), triangular prisms (also known as nanotriangles), hollow spherical shells (also known as nanoshells), tubes (also known as nanotubes), nanosheets, nanoplatelets, nanodisks, rods (also known as nanorods), and mixtures thereof. In the case of nanorods, the rod shape may be defined by a ratio of a rod length to a rod width, the ratio being known as the aspect ratio. For $FeS_2$ nanoparticles of the current invention, nanorods should have an aspect ratio less than 1000, preferably less than 750, preferably less than 500, preferably less than 250, preferably less than 100, preferably less than 75, preferably less than 50, preferably less than 25. Nanorods having an aspect ratio greater than 1000 are typically referred to as nanowires and are not a shape that the $FeS_2$ nanoparticles are envisioned as having in any embodiments.

In some embodiments, the $FeS_2$ nanoparticles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of $FeS_2$ nanoparticles having a different shape. As used herein, the term "non-uniform shape" refers to an average consistent shape that differs by more than 10% of the distribution of $FeS_2$ nanoparticles having a different shape. In one embodiment, the shape is uniform and at least 90% of the $FeS_2$ nanoparticles are spherical or substantially circular, and less than 10% are polygonal. In another embodiment, the shape is non-uniform and less than 90% of the $FeS_2$ nanoparticles are spherical or substantially circular, and greater than 10% are polygonal.

In some embodiments, the $FeS_2$ nanoparticles have a mean particle size of 10 to 1000 nm, preferably 25 to 900 nm, preferably 50 to 800 nm, preferably 75 to 700 nm, preferably 100 to 600 nm, preferably 125 to 500 nm, preferably about 150 to 400 nm, preferably 175 to 300 nm, preferably 200 to 250 nm. In embodiments where the $FeS_2$ nanoparticles are spherical, the particle size may refer to a particle diameter. In embodiments where the $FeS_2$ nanoparticles are polyhedral, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the $FeS_2$ nanoparticles have an anisotropic shape such as nanorods, the particle size may refer to a length of the nanorod, a width of the nanorod, or an average of the length and width of the nanorod. In some embodiments in which the $FeS_2$ nanoparticles have non-spherical shapes, the particle size refers to the diameter of a sphere having an equivalent volume as the particle. In some embodiments in which the $FeS_2$ nanoparticles have non-spherical shapes, the particle size refers to the diameter of a sphere having an equivalent diffusion coefficient as the particle.

In some embodiments, the $FeS_2$ nanoparticles of the present disclosure are monodisperse, having a coefficient of variation or relative standard deviation, expressed as a percentage and defined as the ratio of the particle size standard deviation (a) to the particle size mean (p) multiplied by 100 of less than 25%, preferably less than 10%, preferably less than 8%, preferably less than 6%, preferably less than 5%, preferably less than 4%, preferably less than 3%, preferably less than 2%. In some embodiments, the $FeS_2$ nanoparticles of the present disclosure are monodisperse having a particle size distribution ranging from 80% of the average particle size to 120% of the average particle size, preferably 90-110%, preferably 95-105% of the average particle size. In some embodiments, the $FeS_2$ nanoparticles are not monodisperse.

In some embodiments, the nanocomposite comprises $\alpha\text{-}Fe_2O_3$ nanoparticles. In general, the $\alpha\text{-}Fe_2O_3$ nanoparticles can be any shape known to one of ordinary skill in the art. Examples of suitable shapes the $\alpha\text{-}Fe_2O_3$ nanoparticles may take include spheres, spheroids, lentoids, ovoids, solid polyhedra such as tetrahedra, cubes, octahedra, icosahedra, dodecahedra, hollow polyhedra (also known as nanocages), stellated polyhedra (both regular and irregular, also known as nanostars), triangular prisms (also known as nanotriangles), hollow spherical shells (also known as nanoshells), tubes (also known as nanotubes), nanosheets, nanoplatelets, nanodisks, rods (also known as nanorods), and mixtures thereof. In the case of nanorods, the rod shape may be defined by a ratio of a rod length to a rod width, the ratio being known as the aspect ratio. For $\alpha\text{-}Fe_2O_3$ nanoparticles of the current invention, nanorods should have an aspect ratio less than 1000, preferably less than 750, preferably less than 500, preferably less than 250, preferably less than 100, preferably less than 75, preferably less than 50, preferably less than 25. Nanorods having an aspect ratio greater than 1000 are typically referred to as nanowires and are not a shape that the $\alpha\text{-}Fe_2O_3$ nanoparticles are envisioned as having in any embodiments.

In some embodiments, the $\alpha\text{-}Fe_2O_3$ nanoparticles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of $\alpha\text{-}Fe_2O_3$ nanoparticles having a different shape. As used herein, the term "non-uniform shape" refers to an average consistent shape that differs by more than 10% of the distribution of $\alpha\text{-}Fe_2O_3$ nanoparticles having a different shape. In one embodiment, the shape is uniform and at least 90% of the $\alpha\text{-}Fe_2O_3$ nanoparticles are spherical or substantially circular, and less than 10% are polygonal. In another embodiment, the shape is non-uniform and less than 90% of the $\alpha\text{-}Fe_2O_3$ nanoparticles are spherical or substantially circular, and greater than 10% are polygonal.

In some embodiments, the $\alpha\text{-}Fe_2O_3$ nanoparticles have a mean particle size of 10 to 1000 nm, preferably 25 to 900 nm, preferably 50 to 800 nm, preferably 75 to 700 nm, preferably 100 to 600 nm, preferably 125 to 500 nm, preferably about 150 to 400 nm, preferably 175 to 300 nm, preferably 200 to 250 nm. In embodiments where the $\alpha\text{-}Fe_2O_3$ nanoparticles are spherical, the particle size may refer to a particle diameter. In embodiments where the $\alpha\text{-}Fe_2O_3$ nanoparticles are polyhedral, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the $\alpha\text{-}Fe_2O_3$ nanoparticles have an anisotropic shape such as nanorods, the particle size may refer to a length of the nanorod, a width of the nanorod, or an average of the length and width of the nanorod. In some embodiments in which the $\alpha\text{-}Fe_2O_3$ nanoparticles have non-spherical shapes, the particle size refers to the diameter of a sphere having an equivalent volume as the particle. In some embodiments in which the $\alpha\text{-}Fe_2O_3$ nanoparticles have non-spherical shapes, the particle size refers to the diameter of a sphere having an equivalent diffusion coefficient as the particle.

In some embodiments, the $\alpha\text{-}Fe_2O_3$ nanoparticles of the present disclosure are monodisperse, having a coefficient of variation or relative standard deviation, expressed as a percentage and defined as the ratio of the particle size standard deviation (a) to the particle size mean (p) multiplied by 100 of less than 25%, preferably less than 10%, preferably less than 8%, preferably less than 6%, preferably less than 5%, preferably less than 4%, preferably less than 3%, preferably less than 2%. In some embodiments, the $\alpha\text{-}Fe_2O_3$ nanoparticles of the present disclosure are monodisperse having a particle size distribution ranging from 80% of the average particle size to 120% of the average particle size, preferably 90-110%, preferably 95-105% of the average particle size. In some embodiments, the $\alpha\text{-}Fe_2O_3$ nanoparticles are not monodisperse.

In some embodiments, the nanocomposite comprises $TiO_2$ nanoparticles. In general, the $TiO_2$ nanoparticles can be any shape known to one of ordinary skill in the art. Examples of suitable shapes the $TiO_2$ nanoparticles may take include spheres, spheroids, lentoids, ovoids, solid polyhedra such as tetrahedra, cubes, octahedra, icosahedra, dodecahedra, hollow polyhedra (also known as nanocages), stellated polyhedra (both regular and irregular, also known as nanostars), triangular prisms (also known as nanotriangles), hollow spherical shells (also known as nanoshells), tubes (also known as nanotubes), nanosheets, nanoplatelets, nanodisks, rods (also known as nanorods), and mixtures thereof. In the case of nanorods, the rod shape may be defined by a ratio of a rod length to a rod width, the ratio being known as the aspect ratio. For $TiO_2$ nanoparticles of the current invention, nanorods should have an aspect ratio less than 1000, preferably less than 750, preferably less than 500, preferably less than 250, preferably less than 100, preferably less than 75, preferably less than 50, preferably less than 25. Nanorods having an aspect ratio greater than 1000 are typically referred to as nanowires and are not a shape that the $TiO_2$ nanoparticles are envisioned as having in any embodiments. In some embodiments, the $TiO_2$ nanoparticles are in the form of two-dimensional (2D) nanosheets. The $TiO_2$ nanosheets may be shaped like blocks, flakes, ribbons, discs, granules, platelets, angular chunks, rectangular prisms, or some other shape.

In some embodiments, the $TiO_2$ nanoparticles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of $TiO_2$ nanoparticles having a different shape. As used herein, the term "non-uniform shape" refers to an average consistent shape that differs by more than 10% of the distribution of $TiO_2$ nanoparticles having a different shape.

In one embodiment, the shape is uniform and at least 90% of the $TiO_2$ nanoparticles are spherical or substantially circular, and less than 10% are polygonal. In another embodiment, the shape is non-uniform and less than 90% of the $TiO_2$ nanoparticles are spherical or substantially circular, and greater than 10% are polygonal.

In some embodiments, the $TiO_2$ nanoparticles have a mean particle size of 10 to 1000 nm, preferably 25 to 900 nm, preferably 50 to 800 nm, preferably 75 to 700 nm, preferably 100 to 600 nm, preferably 125 to 500 nm, preferably about 150 to 400 nm, preferably 175 to 300 nm, preferably 200 to 250 nm. In embodiments where the $TiO_2$ nanoparticles are spherical, the particle size may refer to a particle diameter. In embodiments where the $TiO_2$ nanoparticles are polyhedral, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the $TiO_2$ nanoparticles have an anisotropic shape such as nanorods, the particle size may refer to a length of the nanorod, a width of the nanorod, or an average of the length and width of the nanorod. In some embodiments in which the $TiO_2$ nanoparticles have non-spherical shapes, the particle size refers to the diameter of a sphere having an equivalent volume as the particle. In some embodiments where the $TiO_2$ nanoparticles have an anisotropic shape such as nanosheets, the particle size may refer to a length of the nanosheet, a width of the nanosheet, an average of the length and width of the nanosheet, a thickness of the nanosheet, or an average of the length, width, and thickness of the nanosheet. In some embodiments in which the $TiO_2$ nanoparticles have non-spherical shapes, the particle size refers to the diameter of a sphere having an equivalent volume as the particle. In some embodiments in which the $TiO_2$ nanoparticles have non-spherical shapes, the particle size refers to the diameter of a sphere having an equivalent diffusion coefficient as the particle.

In some embodiments, the $TiO_2$ nanoparticles of the present disclosure are monodisperse, having a coefficient of variation or relative standard deviation, expressed as a percentage and defined as the ratio of the particle size standard deviation (a) to the particle size mean (p) multiplied by 100 of less than 25%, preferably less than 10%, preferably less than 8%, preferably less than 6%, preferably less than 5%, preferably less than 4%, preferably less than 3%, preferably less than 2%. In some embodiments, the $TiO_2$ nanoparticles of the present disclosure are monodisperse having a particle size distribution ranging from 80% of the average particle size to 120% of the average particle size, preferably 90-110%, preferably 95-105% of the average particle size. In some embodiments, the $TiO_2$ nanoparticles are not monodisperse.

In some embodiments, the $TiO_2$ nanoparticles may be present in an amount ranging from 1 to 15 wt. %, 1.25 to 14.5 wt. %, preferably 1.5 to 14 wt. %, preferably 1.75 to 13.5 wt. %, preferably 2 to 13 wt. %, preferably 2.25 to 12.5 wt. %, preferably 2.5 to 12 wt. %, preferably 2.75 to 11.5 wt. %, preferably 3 to 11 wt. % preferably 3.25 to 10.75 wt. %, preferably 3.5 to 10.5 wt. %, preferably 3.75 to 10.25 wt. %, preferably 4 to 10 wt. %, based on the total weight of nanocomposite. In some embodiments, the $TiO_2$ nanoparticles are present in an amount of 10 wt. %, based on the total weight of nanocomposite. In some embodiments, the $TiO_2$ nanoparticles are present in an amount of 4 wt. %, based on the total weight of nanocomposite.

In some embodiments, the nanocomposite comprises $C_3N_4$ nanosheets. In some embodiments, the $C_3N_4$ nanosheets may consist of stacks of $C_3N_4$ sheets, the stacks having an average thickness and a diameter. In some embodiments, the stacks comprise 1 to 60 sheets of $C_3N_4$, preferably 2 to 55 sheets of $C_3N_4$, preferably 3 to 50 sheets of $C_3N_4$.

In some embodiments, the $C_3N_4$ is in the form of $C_3N_4$ nanosheets. The $C_3N_4$ nanosheets may be shaped like blocks, flakes, ribbons, discs, granules, platelets, angular chunks, rectangular prisms, or some other shape. For the $C_3N_4$ nanosheets, a particle size may refer to a length of the nanosheet, a width of the nanosheet, an average of the length and width of the nanosheet, a thickness of the nanosheet, or an average of the length, width, and thickness of the nanosheet.

In some embodiments, the $C_3N_4$ nanosheets may be present in an amount of from 1 to 15 wt. %, 1.25 to 14.5 wt. %, preferably 1.5 to 14 wt. %, preferably 1.75 to 13.5 wt. %, preferably 2 to 13 wt. %, preferably 2.25 to 12.5 wt. %, preferably 2.5 to 12 wt. %, preferably 2.75 to 11.5 wt. %, preferably 3 to 11 wt. % preferably 3.25 to 10.75 wt. %, preferably 3.5 to 10.5 wt. %, preferably 3.75 to 10.25 wt. %, preferably 4 to 10 wt. %, based on the total weight of nanocomposite. In some embodiments, the $C_3N_4$ nanosheets are present in an amount of 4 wt. %, based on the total weight of nanocomposite. In some embodiments, the $C_3N_4$ nanosheets are present in an amount of 10 wt. %, based on the total weight of nanocomposite.

In some embodiments, the nanocomposite is substantially free of $C_3N_4$ nanosheets.

In general, the particle size may be determined by any suitable method known to one of ordinary skill in the art. In some embodiments, the particle size is determined by powder X-ray diffraction (PXRD). Using PXRD, the particle size may be determined using the Scherrer equation, which relates the full-width at half-maximum (FWHM) of diffraction peaks to the size of regions comprised of a single crystalline domain (known as crystallites) in the sample. In some embodiments, the crystallite size is the same as the particle size. For accurate particle size measurement by PXRD, the particles should be crystalline, comprise only a single crystal, and lack non-crystalline portions. Typically, the crystallite size underestimates particle size compared to other measures due to factors such as amorphous regions of particles, the inclusion of non-crystalline material on the surface of particles such as bulky surface ligands, and particles which may be composed of multiple crystalline domains. In some embodiments, the particle size is determined by dynamic light scattering (DLS). DLS is a technique which uses the time-dependent fluctuations in light scattered by particles in suspension or solution in a solvent, typically water to measure a size distribution of the particles. Due to the details of the DLS setup, the technique measures a hydrodynamic diameter of the particles, which is the diameter of a sphere with an equivalent diffusion coefficient as the particles. The hydrodynamic diameter may include factors not accounted for by other methods such as non-crystalline material on the surface of particles such as bulky surface ligands, amorphous regions of particles, and surface ligand-solvent interactions. Further, the hydrodynamic diameter may not accurately account for non-spherical particle shapes. DLS does have an advantage of being able to account for or more accurately model solution or suspension behavior of the particles compared to other techniques. In some embodiments, the particle size is determined by electron microscopy techniques such as scanning electron microscopy (SEM) or transmission electron microscopy (TEM).

In some embodiments, the nanocomposite has a band gap of from 1.25 to 2.55 eV, preferably 1.30 to 2.50 eV, preferably 1.35 to 2.45 eV, preferably 1.40 to 2.40 eV, preferably 1.45 to 2.35 eV, preferably 1.50 to 2.30 eV, preferably 1.55 to 2.25 eV, preferably 1.60 to 2.20 eV, preferably 1.65 to 2.15 eV.

In some embodiments, the nanocomposite may have an electrochemical surface area (ECSA) of from 13 to 35 mFcm$^{-2}$, 15 to 33 mFcm$^{-2}$, preferably 17 to 32 mFcm$^{-2}$, preferably 19 to 31 mFcm$^{-2}$, preferably 21 to 30 mFcm$^{-2}$, preferably 22 to 29 mFcm$^{-2}$, preferably 23 to 28 mFcm$^{-2}$, preferably 24 to 27 mFcm$^{-2}$, preferably 25.0 to 26.5 mFcm$^{-2}$, preferably 25.5 to 26.0 mFcm$^{-2}$. In some embodiments, the electrochemical surface area is measured in an aqueous electrolyte solution as described below. In some embodiments, the electrochemical surface area is measured in 1 M KCl.

In some embodiments, the nanocomposite may have a charge transfer resistance ($\Omega_{CT}$) of 10 to 200, preferably 25 to 175$\Omega$, preferably 50 to 150$\Omega$, preferably 75 to 125$\Omega$, preferably 90 to 110$\Omega$, preferably about 100$\Omega$. In some embodiments, the charge transfer resistance is measured in an aqueous electrolyte solution as described below. In some embodiments, the charge transfer resistance is measured in 1 M KCl. In some embodiments, the nanocomposite may have a In some embodiments, the nanocomposite may have a saturation magnetization ($M_S$) ranging from 0.001 to 0.1 emu/g, preferably 0.003 to 0.08 emu/g preferably 0.005 to 0.06 emu/g, preferably 0.007 to 0.04 emu/g, preferably 0.01 to 0.025 emu/g, preferably 0.012 to 0.017 emu/g, preferably 0.014 to 0.015 emu/g. In some embodiments, the nanocomposite may have a remnant magnetization ($M_R$) ranging from 0.0001 to 0.01 emu/g, preferably 0.0005 to 0.0075 emu/g, preferably 0.001 to 0.005 emu/g, preferably 0.002 to 0.003 emu/g, preferably 0.00225 to 0.00250 emu/g. In some embodiments, the nanocomposite may have a coercivity ($H_C$) ranging from 500 to 2000 G, preferably 750 to 1750 G, preferably 1000 to 1500 G, preferably 1050 to 1450 G, preferably 1100 to 1400 G, preferably 1150 to 1350 G, preferably 1200 to 1300 G, preferably 1225 to 1250 G. In some embodiments, the nanocomposite may have a ratio of remnant magnetization to saturation magnetization ($M_R/M_S$) of 0.5 to 3.0, preferably 0.75 to 2.75, preferably 1.0 to 2.5, preferably 1.25 to 2.25, preferably 1.50 to 2.0, preferably 1.75 to 1.90.

Figure 1B:
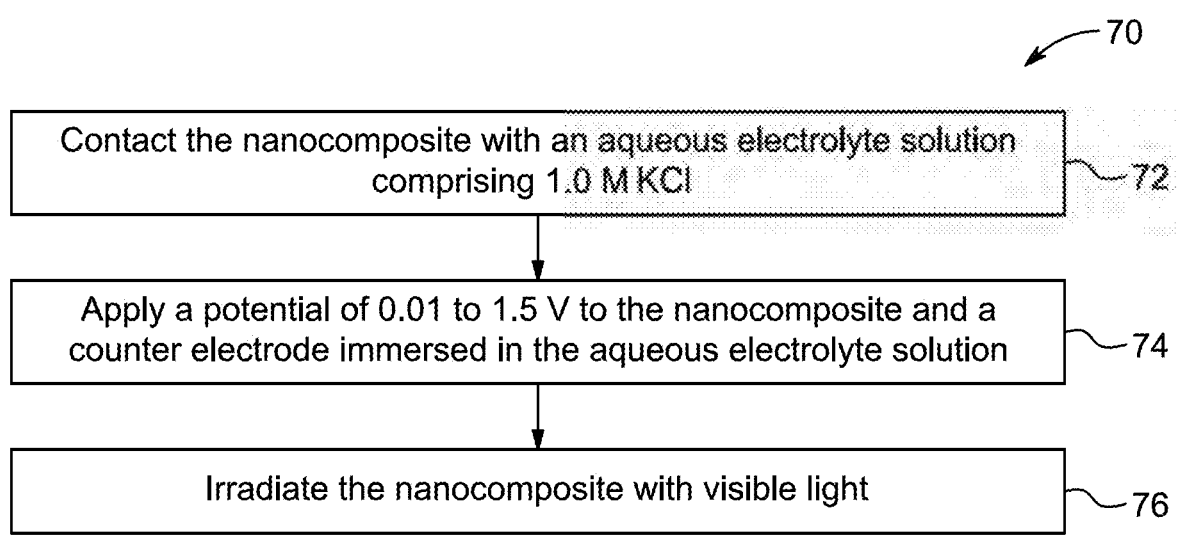
FIG. 1B is a schematic flow chart depicting a method of electrochemically forming oxygen gas by an oxygen evolution reaction, according to certain embodiments.

FIG. 1B illustrates a schematic flow chart of a method 70 of a method of electrochemically forming oxygen gas by an oxygen evolution reaction The order in which the method 70 is described is not intended to be construed as a limitation, and any number of the described method steps can be combined to implement the method 70. Additionally, individual steps may be removed or skipped from the method 70 without departing from the spirit and scope of the present disclosure.

At step 72, the method 70 includes contacting the nanocomposite with an aqueous electrolyte solution. In some embodiments, the aqueous electrolyte solution includes an electrolyte. Examples of electrolytes include, but are not limited to NaCl, KCl, LiCl, MgSO$_4$, Na$_2$SO$_4$, CaCl$_2$, NH$_4$NO$_3$, NaHCO$_3$, K$_2$SO$_4$, H$_3$PO$_4$, BaCl$_2$, NaAc (sodium acetate), KNO$_3$, MgCl$_2$, Ca(NO$_3$)$_2$, Li$_2$SO$_4$, Na$_3$PO$_4$, (NH$_4$)$_2$SO$_4$, NaF, CsCl, and RbCl. In some embodiments, the electrolyte is KCl. In some embodiments, the concentration of KCl ranges from 0.1 to 2 M, preferably 0.25 to 1.75 M, preferably 0.5 to 1.5 M, preferably 0.6 to 1.4 M, preferably 0.75 to 1.25 M, preferably 0.8 to 1.2 M, preferably 0.9 to 1.1 M, preferably about 1 M.

At step 74, the method 70 includes applying a potential of 0.01 to 1.5 V to the nanocomposite and a counter electrode immersed in the aqueous electrolyte solution. In some embodiments, the potential applied to the nanocomposite may range from 0.01 to 1.5 V, preferably 0.25 to 1.45 V, preferably 0.40 to 1.40 V, preferably 0.50 to 1.35 V, preferably 0.60 to 1.30 V, preferably 0.75 to 1.25 V, preferably 0.80 to 1.20 V, preferably 0.85 to 1.15 V, preferably 0.90 to 1.10 V, preferably about 0.93 to 1.09 V.

At step 76, the method 70 includes irradiating the nanocomposite with visible light. In some embodiments, the irradiating source may include but not limited to, mercury vapor lamps, UV-C lamps, metal halide lamps, LED light sources, low-pressure mercury lamps, high-pressure mercury lamps, arc lamps, fluorescent lamps, halogen lamps, carbon arc lamps, incandescent bulbs, near-infrared lasers, UV-LEDs, titanium-dioxide (TiO2) activated lamps, pulsed light sources, microwave plasma sources, solar simulators, cold cathode lamps, sunlight or a xenon and ultraviolet excimer lamps. In a preferred embodiment, the irradiating source is visible lamp.

In some embodiments, the nanocomposite may have an oxygen evolution reaction onset potential ranging from 0.75 to 1.25 V, preferably 0.80 to 1.10 V, preferably 0.85 to 1.00 V, preferably 0.90 to 0.95 V, preferably about 0.93 V, relative to the reversible hydrogen electrode. In some embodiments, the nanocomposite may have a potential required to generate a current density of 10 mAcm$^{-2}$ ($\eta$10) ranges from 0.95 to 1.25 V, preferably 1.00 to 1.15 V, preferably 1.05 to 1.10 V, preferably about 1.09 V, relative to the reversible hydrogen electrode.

In some embodiments, the nanocomposite may have a Tafel slope ranging from 37.5 to 65 mV dec$^{-1}$, 40 to 62.5 mV dec$^{-1}$, preferably 42.5 to 60 mV dec$^{-1}$, preferably 45 to 57.5 mV dec$^{-1}$, preferably 47.5 to 55 mV dec$^{-1}$, preferably 50 to 52.5 mV dec$^{-1}$, preferably 51.5 to 51.6 mV dec$^{-1}$.

Figure 1C:
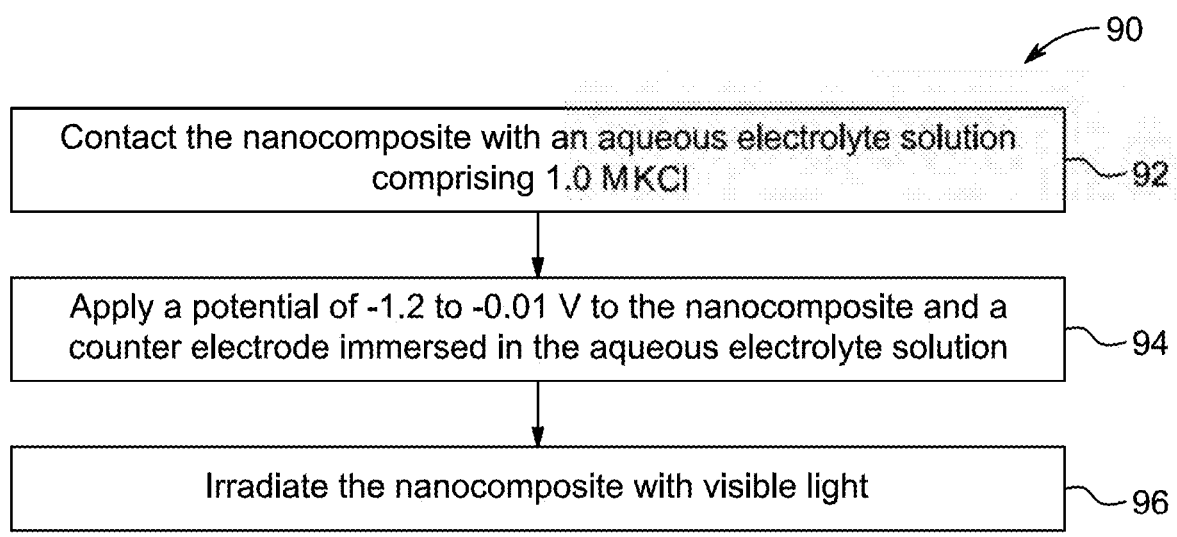
FIG. 1C is a schematic flow chart depicting a method of electrochemically forming hydrogen gas by a hydrogen evolution reaction, according to certain embodiments.

FIG. 1C illustrates a schematic flow chart of a method 90 of method of electrochemically hydrogen gas by a hydrogen evolution reaction The order in which the method 90 is described is not intended to be construed as a limitation, and any number of the described method steps can be combined to implement the method 90. Additionally, individual steps may be removed or skipped from the method 90 without departing from the spirit and scope of the present disclosure.

At step 92, the method 90 includes contacting the nanocomposite of with an aqueous electrolyte solution. In some embodiments, the aqueous electrolyte solution includes an electrolyte. Examples of electrolytes include, but are not limited to NaCl, KCl, LiCl, MgSO$_4$, Na$_2$SO$_4$, CaCl$_2$, NH$_4$NO$_3$, NaHCO$_3$, K$_2$SO$_4$, H$_3$PO$_4$, BaCl$_2$, NaAc (sodium acetate), KNO$_3$, MgCl$_2$, Ca(NO$_3$)$_2$, Li$_2$SO$_4$, Na$_3$PO$_4$, (NH$_4$)$_2$SO$_4$, NaF, CsCl, and RbCl. In some embodiments, the electrolyte is KCl. In some embodiments, the concentration of KCl ranges from 0.1 to 2 M, preferably 0.25 to 1.75 M, preferably 0.5 to 1.5 M, preferably 0.6 to 1.4 M, preferably 0.75 to 1.25 M, preferably 0.8 to 1.2 M, preferably 0.9 to 1.1 M, preferably about 1 M.

At step 94, the method 90 includes applying a potential of −1.2 to −0.01 V to the nanocomposite and a counter electrode immersed in the aqueous electrolyte solution. In some embodiments, a potential applied to the nanocomposite may range from −1.2 to −0.01 V, preferably −1.1 to −0.02 V, preferably −1.0 to −0.03 V, preferably −0.9 to −0.04 V, preferably −0.8 to −0.05 V, preferably 0.7 to −0.07 V, preferably −0.6 to −0.08 V, preferably −0.55 to −0.09 V, preferably −0.54 to −0.1 V.

At step 96, the method 90 includes irradiating the nanocomposite with visible light. In some embodiments, the irradiating source may include but not limited to, mercury vapor lamps, UV-C lamps, metal halide lamps, LED light sources, low-pressure mercury lamps, high-pressure mercury lamps, arc lamps, fluorescent lamps, halogen lamps, carbon arc lamps, incandescent bulbs, near-infrared lasers, UV-LEDs, titanium-dioxide ($TiO_2$) activated lamps, pulsed light sources, microwave plasma sources, solar simulators, cold cathode lamps, sunlight or xenon and ultraviolet excimer lamps. In preferred embodiment, the irradiating source is visible lamp.

In some embodiments, the nanocomposite may have a hydrogen evolution reaction onset potential range from −0.25 to −0.01 V, preferably −0.20 to −0.025 V, preferably −0.175 to −0.05 V, preferably −0.15 to −0.075 V, preferably −0.125 to −0.09 V, preferably −0.1 V relative to the reversible hydrogen electrode.

In some embodiments, the nanocomposite may have a potential required to generate a current density of 10 $mAcm^{-2}$ ($\eta 10$) ranges from −0.75 to −0.25 V, preferably −0.70 to −0.30 V, preferably −0.65 to −0.40 V, preferably −0.60 to −0.45 V, preferably −0.55 to −0.50 V, preferably −0.54 V relative to the reversible hydrogen electrode.

In some embodiments, the nanocomposite may have a Tafel slope ranging from −40 to −10 mV $dec^{-1}$, preferably −35.0 to −12.5 mV $dec^{-1}$, preferably −32.5 to −15.0 mV $dec^{-1}$, preferably −30.0 to −17.5 mV $dec^{-1}$, preferably −27.5 to −20.0 mV $dec^{-1}$, preferably −25.0 to −22.0 mV $dec^{-1}$, preferably −24.5 to −23.0 mV $dec^1$, preferably −24.0 to −23.5 mV $dec^1$, preferably −23.75 to −23.70 mV $dec^1$, preferably −23.72 mV $dec^1$.

In some embodiments, the nanocomposite may have a turnover frequency for HER in a range of from 0.20 to 0.40 $s^{-1}$, preferably 0.21 to 0.38 $s^{-1}$, 0.22 to 0.36 $s^{-1}$, preferably 0.23 to 0.35 $s^{-1}$, preferably 0.24 to 0.34 $s^{-1}$, preferably 0.25 to 0.33 $s^{-1}$, preferably 0.26 to 0.32 $s^{-1}$, preferably 0.27 to 0.31 $s^{-1}$, preferably 0.28 to 0.30 $s^{-1}$, preferably 0.29 $s^{-1}$.

The present disclosure also relates to a method of photodegrading an organic pollutant. In some embodiments, the method includes irradiating with visible light a photodegradation mixture including the nanocomposite, an organic pollutant and an oxidant. In some embodiments, the oxidant may be selected from hydrogen peroxide and a persulfate salt. Examples of persulfate salts include, but are not limited to sodium persulfate, ammonium persulfate, calcium persulfate, magnesium persulfate, lithium persulfate, barium persulfate, strontium persulfate, potassium peroxymonosulfate, sodium peroxymonosulfate, peracetic acid, perpropionic acid, perbenzoic acid, peracetic acid, potassium peroxydisulfate, sodium peroxydisulfate, ammonium peroxydisulfate, lithium peroxydisulfate, calcium peroxydisulfate, and aluminum peroxydisulfate. In some embodiments the persulfate salt is potassium persulfate.

In some embodiments, the organic pollutant is at least one selected from the group consisting of a dye, a phenol, a polycyclic aromatic hydrocarbon, an herbicide, a pesticide, an antibiotic, and a persistent organic pollutant.

In some embodiments, the organic pollutant is a dye. A dye is a colored substance that chemically binds to a material it may be intended to color. Generally, a dye is applied in solution, typically aqueous solution. Examples of dyes include, but are not limited to: acridine dyes, which are acridine and its derivatives such as acridine orange, acridine yellow, acriflavine, and gelgreen; anthraquinone dyes, which are anthroaquinone and its derivatives such as acid blue 25, alizarin, anthrapurprin, carminic acid, 1,4-diamno-2,3-dihydroanthraquinone, 7,14-dibenzypyrenequinone, dibromoanthrone, 1,3-dihydroxyanthraquinone, 1,4-dihydroxyanthraquinone, disperse red 9, disperse red 11, indanthrone blue, morindone, oil blue 35, parietin, quinizarine green SS, remazol brilliant blue R, solvent violet 13, 1,2,4-trihydroxyanthraquinone, vat orange 1, and vat yellow 1; diaryl methane dyes such as auramine O, triarylmethane dyes such as acid fuchsin, aluminon, aniline blue WS, aurin, aurintricarboxylic acid, brilliant blue FCF, brilliant green, bromocresol green, bromocresol purple, bromocresol blue, bromophenol blue, bromopyrogallol red, chlorophenol red, coomassie brilliant blue, cresol red, O-cresolphthalein, crystal violet, dichlorofluorescein, ethyl green, fast green FCT, FIAsH-EDT2, fluoran, fuchsine, green S, light green SF, malachite green, merbromin, metacresol purple, methyl blue, methyl violet, naphtholphthalein, new fuchsine, pararosaniline, patent blue V, phenol red, phenolphthalein, phthalein dye, pittacal, spirit blue, thymol blue, thymolphthalein, Victoria blue BO, Victoria blue R, water blue, xylene cyanol, and xylenol orange; azo dyes such as acid orange 5, acid red 13, alican yellow, alizarine yellow R, allura red AC, amaranth, amido black 10B, aniline yellow, arylide yellow, azo violet, azorubine, basic red 18, biebrich scarlet, Bismarck brown Y, black 7984, brilliant black BN, brown FK, chrysoine resorcinol, citrus red 2, congo red, D&C red 33, direct blue 1, disperse orange 1, eriochrome black T, evans blue, fast yellow AB, orange 1, hydroxynaphthol blue, janus green B, lithol rubine BK, metanil yellow, methyl orange, methyl red, methyl yellow, mordant brown 33, mordant red 19, naphthol AS, oil red 0, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine, azin dyes such as basic black 2, mauveine, neutral red, Perkin's mauve, phenazine, and safranin; indophenol dyes such as indophenol and dichlorophenolindophenol; oxazin dyes; oxazone dyes; thiazine dyes such as azure A, methylene blue, methylene green, new methylene blue, and toluidine blue; thiazole dyes such as primuline, stains-all, and thioflavin; xanthene dyes such as 6-carboxyfluorescein, eosin B, eosin Y, erythrosine, fluorescein, rhodamine B, rose bengal, and Texas red; fluorone dyes such as calcein, carboxyfluorescein diacetate succinimidyl ester, fluo-3, fluo-4, indian yellow, merbromin, pacific blue, phloxine, and seminaphtharhodafluor; or rhodamine dyes such as rhodamine, rhodamine 6G, rhodamine 123, rhodamine B, sulforhodamine 101, and sulforhodamine B.

In some embodiments, the organic pollutant is a phenol. A phenol is a compound consisting of a hydroxyl group (—OH) bonded directly to an aromatic hydrocarbon group. Examples of phenols include, but are not limited to, phenol (the namesake of the group of compounds), bisphenols (including bisphenol A), butylated hydroxytoluene (BHT), 4-nonylphenol, orthophenyl phenol, picric acid, phenolphthalein and its derivatives mentioned above, xylenol, diethylstilbestrol, L-DOPA, propofol, butylated hydroxyanisole, 4-tert-butylcatechol, tert-butylhydroquinone, carvacrol, chloroxyleol, cresol (including M-, O-, and P-cresol), 2,6-di-tert-butylphenol, 2,4-dimethyl-6-tert-butylphenol, 2-ethyl-4,5-dimethylphenol, 4-ethylguaiacol, 3-ethylphenol, 4-ethylphenol, flexirubin, mesitol, 1-nonyl-4-phenol, thymol, 2,4,6-tri-tert-butylphenol, chlorophenol (including 2-, 3-, and 4-chlorophenol), dichlorophenol (including 2,4- and 2,6-dichlorophenol), bromophenol, dibromophenol (including 2,4-dibromophenol), nitrophenol, norstictic acid, oxybenzone, and paracetamol (also known as acetoaminophen).

In some embodiments, the organic pollutant is a polycyclic aromatic hydrocarbon. A polycyclic aromatic hydrocarbon (PAH) is an aromatic hydrocarbon composed of multiple aromatic rings. Examples of polycyclic aromatic hydrocarbons include naphthalene, anthracene, phenanthrene, phenalene, tetracene, chrysene, triphenylene, pyrene, pentacene, benzo[a]pyrene, corannulene, benzo[g,h,i]perylene, coronene, ovalene, benzo[c]fluorine, acenapthene, acenaphthylene, benz[a]anthracene, benzo[b]fluoranthene, benzo[j]fluoranthene, benzo[k]fluoranthene, benzo[e]pyrene, cyclopenta[c,d]pyrene, dibenz[a,h]anthracene, dibenzo[a,e]pyrene, dibenzo[a,h]pyrene, dibenzo[a,i]pyrene, dibenzo[a,l]pyrene, fluoranthene, fluorine, indeno[1,2,3-c,d]pyrene, 5-methylchrysene, naphthacene, pentaphene, picene, and biphenylene.

In some embodiments, the organic pollutant is an herbicide. An herbicide (also known as "weedkiller") is a substance that is toxic to plants and may kill, inhibit the growth of, or prevent the germination of plants. Herbicides are typically used to control the growth of or remove unwanted plants from an area of land, particularly in an agricultural context. Examples of herbicides include, but are not limited to, 2,4-D, aminopyralid, chlorsulfuron, clopyralid, dicamba, diuron, glyphosate, hexazinone, imazapic, imazapyr, methsulfuron methyl, picloram, sulfometuron methyl, triclopyr, fenoxaprop, fluazifop, quizalofop, clethodim, sethoxydim, chlorimuron, foramsulfuron, halosulfuron, nicosulfuron, primisulfuron, prosulfuron, rimsulfuron, thofensulfuron, tribenuron, imazamox, imazaquin, flumetsulam, cloransulam, thiencarbazone, fluoxpyr, diflufenzopyr, atrazine, simazine, metribuzin, bromoxynil, bentazon, linuron, glufosinate, clomazone, isoxaflutole, topramezone, mesotrione, tembotrione, acifluorfen, formesafen, lactofen, flumiclorac, flumioxazin, fulfentrazone, carfentrazone, fluthiacet-ethyl, falufenacil, paraquat, ethalfluralin, pendimethalin, trifluralin, butylate, EPTC, ecetochlor, alachlor, metolachlor, dimethenamid, flufenacet, and pyroxasulfone.

In some embodiments, the organic pollutant is a pesticide. A pesticide is a substance meant to prevent, destroy, or control pests including, but not limited to algae, bacteria, fungi, plants, insects, mites, snails, rodents, and viruses.

A pesticide intended for use against algae is known as an algicide. Examples of algicides include benzalkonium chloride, bethoxazin, cybutryne, dichlone, dichlorophen, diuron, endothal, fentin, isoproturon, methabenthiazuron, nabam, oxyfluorfen, pentachlorophenyl laurate, quinoclamine, quinonamid, simazine, terbutryn, and tiodonium.

A pesticide intended for use against bacteria is known as a bactericide. Examples of bactericides include antibiotics such as: aminoglycosides such as amikacin, gentamicin, kanamycin, neomycin, netilmicin, tobramycin, paromomycin, streptomycin, and spectinomycin; ansamycins such as geldanamycin, herbimycin, and rifaximin; carbacephems such as loracarbef; carbapenems such as ertapenem, doripenem, imipenem, and meropenem; cephalosporins such as cefadroxil, cefazolin, cephradine, cephapirin, cephalothin, cephalexin, cefaclor, cefoxitin, cefotetan, cefamandole, cefmetazole, cefonicid, cefprozil, cefuroxime, cefixime, cefdinir, cefditoren, cefoperazone, cefotaxime, cefpodoxime, cefazidime, ceftibuten, ceftizoxime, moxalactam, ceftriaxone, cefepime, cefaroline fosamil, and ceftobiprole; glycopeptides such as teicoplanin, vancomycin, telavancin, dalbavancin, and oritavancin; lincosamides such as clindamycin and lincomycin; lipopeptides such as daptomycin; macrolides such as azithromycin, clarithromycin, erythromycin, roxithromycin, telithromycin, spiramycin, and fidoxamicin; monobactams such as aztreonam; nitrofurans such as furazolidone and nitrofurantoin; oxazolidinones such as linezolid, posizolid, radezolid, and torezolid; penicillins such as amoxicillin, ampicillin, azlocillin, dicloxacillin, flucloxacillin, mezlocillin, methicillin, nafcillin, oxacillin, penicillins (including penicillin G and V), piperacillin, temocillin, and ticarcillin; polypeptides such as bacitracin, colistin, and polymyxin B; quinolones such as ciproflaxacin, enoxacin, gatifloxacin, gemifloxacin, levofloxacin, lomefloxacin, moxifloxacin, nadifloxacin, nalidixic acid, norfloxacin, ofloxacin, trovafloxacin, gepafloxacin, sparfloxacin, and temafloxacin; sulfonamides such as mafenide, sulfacetamide, sulfadiazine, sulfadithoxine, sulfamethizole, sulfamethoxazole, sulfanilamide, sulfasalazine, sulfisoxazole, and sulfonamidochrysoidine; tetracyclines such as demeclocycline, doxycycline, metacycline, minocycline, oxytetracycline, and tetracycline.

A pesticide intended for use against fungi is known as a fungicide. Examples of fungicides include acibenzolar, acypetacs, aldimorph, anilazine, aureofungin, azaconazole, azithiram, azoxystrobin, benalaxyl, benodanil, benomyl, benquinox, benthiavalicarb, binapacryl, biphenyl, bitertanol, bixafen, blasticidin-S, boscalid, bromuconazole, captafol, captan, carbendazim, carboxin, carpropamid, chloroneb, chlorothalonil, chlozolinate, cyazofamid, cymoxanil, cyprodinil, dichlofluanid, diclocymet, dicloran, diethofencarb, difenoconazole, diflumetorim, dimethachlone, dimethomorph, diniconazole, dinocap, dodemorph, edifenphos, enoxastrobin, epoxiconazole, etaconazole, ethaboxam, ethirimol, etridiazole, famoxadone, fenamidone, fenarimol, fenbuconazole, fenfuram, fenhexamid, fenoxanil, fenpropidin, fenpropimorph, ferbam, fluazinam, fludioxonil, flumorph, fluopicolide, fluopyram, fluoroimide, fluoxastrobin, flusilazole, flutianil, flutolain, flopet, fthalide, furalaxyl, guazatine, hexaconazole, hymexazole, imazalil, imibenconazole, iminoctadine, iodocarb, ipconazole, iprobenfos, iprodione, iprovalicarb, siofetamid, isoprothiolane, isotianil, kasugamycin, laminarin, mancozeb, mandestrobin, mandipropamid, maneb, mepanypyrim, mepronil, meptyldinocap, mealaxyl, metominostrobin, metconazole, methafulfocarb, metiram, metrafenone, myclobutanil, naftifine, nuarimol, octhilinone, ofurace, orysastrobin, oxadixyl, oxathiapiprolin, oxolinic acid, oxpoconazole, oxycarboxin, oxytetracycline, pefurazate, penconazole, pencycuron, penflufen, penthiopyrad, phenamacril, picarbutrazox, picoxystrobin, piperalin, polyoxin, probenzole, prochloraz, procymidone, propamocarb, propiconazole, propineb, proquinazid, prothiocarb, prothioconazole, pydiflumetofen, pyraclostrobin, pyrametostrobin, pyraoxystrobin, pyrazophos, pyribencarb, pyributicarb, pyrifenox, pyrimethanil, pyrimorph, pyriofenone, pyroquilon, quinoxyfen, quintozene, sedaxane, silthiofam, simeconazole, spiroxamine, streptomycin, tebuconazole, tebufloquin, teclofthalam, teenazene, terbinafine, tetraconazole, thiabendazole, thifluzamide, thiphanate, thiram, tiadinil, tolclosfos-methyl, folfenpyrid, tolprocarb, tolylfluanid, triadimefon, triadimenol, triazoxide, triclopyricarb, tricyclazole, tridemorph, trifloxystrobin, triflumizole, triforine, validamycin, and vinclozolin.

A pesticide intended for use against plants is known as an herbicide as described above. A pesticide intended for use against insects is known as an insecticide. Examples of insecticides are: organochlorides such as Aldrin, chlordane, chlordecone, DDT, dieldrin, endofulfan, endrin, heptachlor, hexachlorobenzene, lindane, methoxychlor, mirex, pentachlorophenol, and TDE; organophosphates such as acephate, azinphos-methyl, bensulide, chlorethoxyfos, chlorpyrifos, diazinon, chlorvos, dicrotophos, dimethoate, disulfoton, ethoprop, fenamiphos, fenitrothion, fenthion, malathion, methamdophos, methidathion, mevinphos, monocrotophos, naled, omethoate, oxydemeton-methyl, parathion, phorate, phosalone, phosmet, phostebupirim, phoxim, pirimiphos-methyl, profenofos, terbufos, and trichlorfon; carbamates such as aldicarb, bendiocarb, carbofuran, carbaryl, dioxacarb, fenobucarb, fenoxycarb, isoprocarb, methomyl; pyrethroids such as allethrin, bifenthrin, cyhalothrin, cypermethrin, cyfluthrin, deltamethrin, etofenprox, fenvalerate, permethrin, phenothrin, prallethrin, resmethrin, tetramethrin, tralomethrin, and transfluthrin; neonicotinoids such as acetamiprid, clothiandin, imidacloprid, nithiazine, thiacloprid, and thiamethoxam; ryanoids such as chlorantraniliprole, cyanthaniliprole, and flubendiamide.

A pesticide intended for use against mites is known as a miticide. Examples of miticides are permethrin, ivermectin, carbamate insecticides as described above, organophosphate insecticides as described above, dicofol, abamectin, chlorfenapyr, cypermethrin, etoxazole, hexythiazox, imidacloprid, propargite, and spirotetramat.

A pesticide intended for use against snails and other mollusks is known as a molluscicide. Examples of molluscicides are metaldehyde and methiocarb.

A pesticide intended for use against rodents is known as a rodenticide. Examples of rodenticides are warfarin, coumatetralyl, difenacoum, brodifacoum, flocoumafen, bromadiolone, diphacinone, chlorophacinone, pindone, difethialone, cholecalciferol, ergocalciferol, ANTU, chloralose, crimidine, 1,3-difluoro-2-propanol, endrin, fluroacetamide, phosacetim, pyrinuron, scilliroside, strychnine, tetramethylenedisulfotetramine, bromethalin, 2,4-dinitrophenol, and uragan D2.

A pesticide intended for use against viruses is known as a virucide. Examples of virucides are cyanovirin-N, griffithsin, interferon, NVC-422, scytovirin, urumin, virkon, zonroz, and V-bind viricie.

In some embodiments, the organic pollutant is a persistent organic pollutant. A persistent organic pollutant is a toxic chemical that adversely affects human and environmental health, can be transported by wind and water, and can persist for years, decades, or centuries owing to resistance to environmental degradation by natural chemical, biological, or photolytic processes. Persistent organic pollutants are regulated by the United Nations Environment Programme 2001 Stockholm Convention on Persistent Pollutants. Examples of persistent organic pollutants are Aldrin, chlordane, dieldrin, endrin, heptachlor, hexachlorobenzene, mirex, toxaphene, polychlorinated biphenyl (PCBs), dichlorodiphenyltrichloroethane (DDT), dioxins, polychlorinated dibenzofurans, chlordecone, hexachlorocyclohexane (α- and β-), hexabromodiphenyl ether, lindane, pentachlorobenzene, tetrabromodiphenyl ether, perfluorooctanesulfonic acid, endosulfans, and hexabromocyclododecane.

In some embodiments, the organic pollutant is an antibiotic. In some embodiments, the organic pollutant is ciprofloxacin.

In some embodiments, the nanocomposite may be free flowing or supported on or within a substrate, for example, a column. Examples of supported nanocomposite include materials and geometries where the nanocomposite is supported within a fixed bed, a static packed bed, a fluidized bed, embedded in a porous support (such as a porous polymer matrix or porous inorganic matrix), in or on a ceramic support, in or on a polymer support, or in or on a silica support.

In some embodiments, the nanocomposite is present in the photodegradation mixture in an amount of 0.01 to 0.75 g/100 mL, preferably 0.02 to 0.5 g/100 mL, preferably 0.025 to 0.40 g/100 mL preferably 0.05 to 0.25 g/100 mL preferably 0.075 to 0.125 g/mL, preferably 0.09 to 0.11 g/100 mL, preferably 0.1 g/100 mL, based on a total volume of photodegradation mixture. In some embodiments, the photodegradation mixture comprises water.

In some embodiments, the initial concentration of ciprofloxacin may range from 5 ppm to 100 μm, preferably 10 ppm to 50 ppm, preferably 15 ppm to 30 ppm, preferably 20 ppm.

In some embodiments, the nanocomposite may achieve degradation rates ranging from 70% to 99%, preferably 75% to 99%, preferably 80% to 98%, preferably 85% to 97%, preferably 87.5% to 96.5%, preferably 90% to 96%, preferably 92.5 to 95% of an initial amount of organic pollutant within a reaction time of 180 minutes.

EXAMPLES

The following examples demonstrate the material and method of forming nanocomposite using nanoparticles. The examples are provided solely for illustration and are not to be construed as limitations of the present disclosure, as many variations thereof are possible without departing from the spirit and scope of the present disclosure.

Example 1: Fabrication of the Nanocomposite $FeS_2/\alpha\text{-}Fe_2O_3$

A three-hour time for incubation was given to a 0.25 M ferric acetate solution, and a 0.75 M thiourea solution. The reaction was started by combining 25 ml of the ferric acetate solution and 25 ml of the thiourea solution. The reaction mixture was then stirred for thirty minutes. The mixture was then placed in a furnace with a Teflon-coated lid and heated up to 200° C. for 24 hours. The combined $FeS_2/\alpha\text{-}Fe_2O_3$ ("FeS$_2$/FeO") mixture was then given time to cool naturally. Further, deionized water was used to thoroughly wash the resulting black, amorphous product before it was given an acetone treatment. Finally, the mixture was put in an airtight container after drying for 12 hours at 100° C.

Example 2: Synthesis of g-$C_3N_4$ Nanosheets g-$C_3N_4$ nanosheets were synthesized from urea using high temperature heating. In a standard synthesis, 8 g of urea was placed in a crucible using a lid and heated in a muffle oven at 550° C. for a period of two hours at a temperature rise of 4° C. min$^{-1}$.

Example 3: Sol-Gel Synthesis of 2D TiO$_2$ Nanoparticles

The TiO$_2$ nanoparticles were synthesized using a sol-gel preparation method. In a typical synthesis, 30 ml of ethanol and 10 ml of titanium isopropoxide (TTIP>98%) were combined and swirled for 60 minutes at 50-60° C. Next, 150 ml of ionized water (DI) and 3 ml of the nitric acid (HNO$_3$) were combined, and the resulting mixture served as a hydrolysis catalyst that was introduced dropwise to the TTIP and ethanol. This process typically required four hours or more. Following the addition, the liquid was stirred for vigorously for a two-hour period at 60° C., forming a suspension with a high degree of viscosity. The suspension was then annealed at 600° C. for 4 hours and obtained crystalline $TiO_2$ nanoparticles.

Example 4: Synthesis of Modified Black $TiO_2/C_3N_4$

Approximately 4 g of imidazole and titanium dioxide ($TiO_2$) nanoparticles were mixed and placed in a crucible with three milliliters (mL) of HCl (37%). This mixture was heated for two hours at 350° C. and for one hour at 400° C., each with a rate of heating of 5° C./min.

Example 5: Preparation of $FeS_2/\alpha-Fe_2O_3$@2D Materials

Approximately 0.04 g of each g-$C_3N_4$, $TiO_2$ and/or $TiO_2$ black/$C_3N_4$ were ground to fine powder and then added to 50 mL methanol. After ultrasonic treatment for 2 h, the materials were found to be exfoliated into thin sheets that formed a homogeneous suspension. Then, 0.96 g of $FeS_2/\alpha-Fe_2O_3$ was dispersed in the suspension and stirred for 12 hours. The products were obtained by sedimentation, washed with deionized water, and then dried at 60° C. overnight in an oven. The samples were named, for example, as $FeS_2/FeO$@10 $TiO_2$ and $FeS_2/FeO$@4$TiO_2$b-$C_3N_4$, where $TiO_2$b is designated for black titania.

Example 6: X-Ray Diffraction and Infrared Analyses

Figure 2:
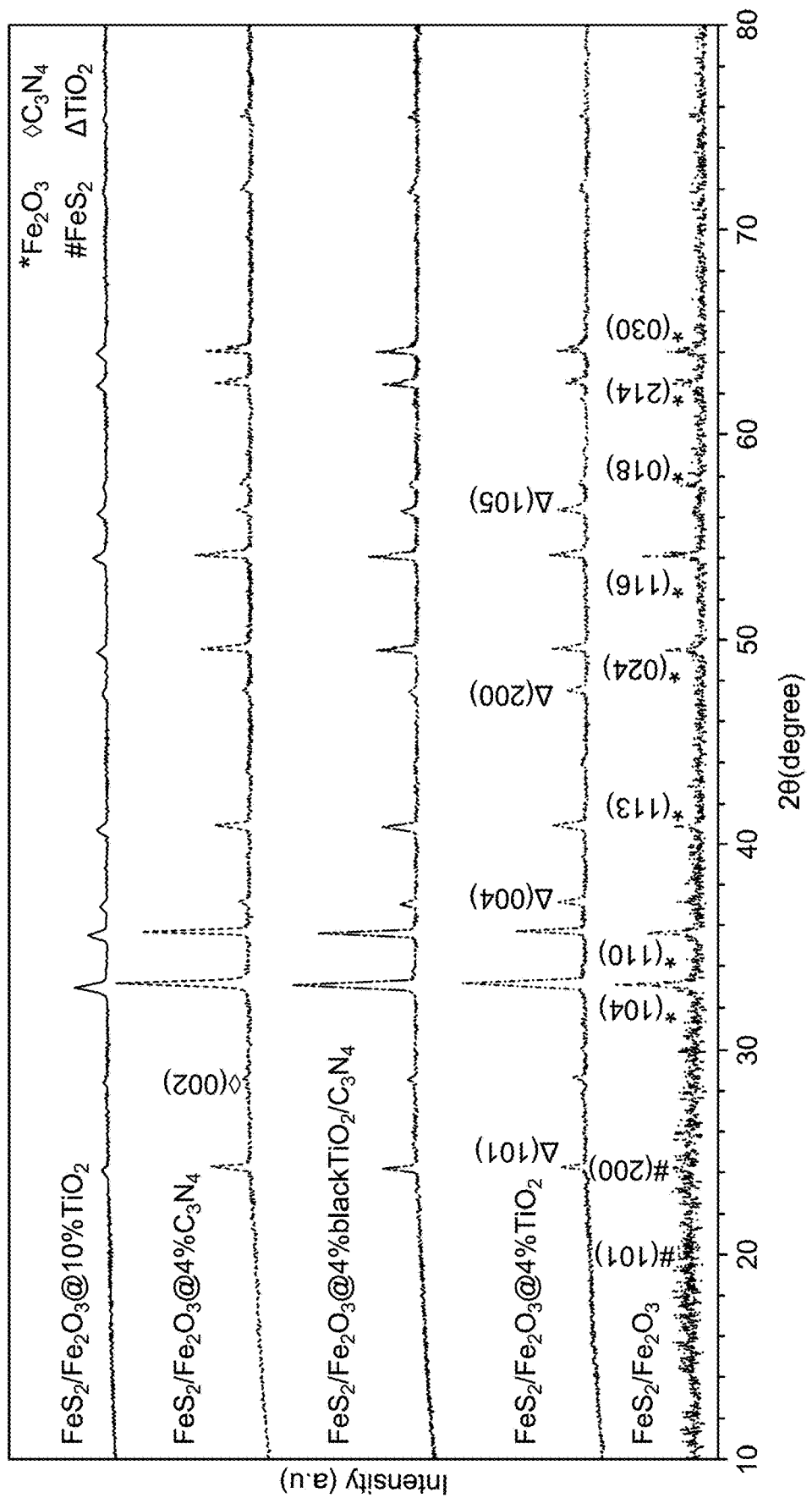
FIG. 2 shows X-ray diffraction (XRD) pattern of $FeS_2$/FeO, $FeS_2$/FeO@4% $TiO_2$, $FeS_2$/FeO@4% $TiO_2b/C_3N_4$, $FeS_2$/FeO@4% $C_3N_4$ and $FeS_2$/FeO@10% $TiO_2$ photocatalysts, according to certain embodiments.

The XRD patterns of fabricated $FeS_2/FeO$ and their nanocomposites with the 2D nanomaterials are shown in FIG. 2. The diffraction peaks of $FeS_2/FeO$ are well indexed to a combination of the rhombohedral hematite ($\alpha-Fe_2O_3$) phase, with peaks at 33.5°, 35.82°, 40.55°, 49.8°, 54.09°, 57.85°, 62.310, and 64.2°, and to the pyrite ($FeS_2$) phase at 19.720 and 24.1°. These correspond to lattice planes (104), (110), (113), (024), (116), (018), (214) and (030) for $\alpha-Fe_2O_3$ and (101) and (200) for $FeS_2$. These results are in good agreement with the previously reported methods [Lauri, T., et. al., Electrochem. Commun., 2012, 20, 15-18; and Sleightholme, A. E. S., et. al., Electrochem. Commun., 2008, 10, 151-155, each of which is incorporated herein by reference in its entirety]. The latter peaks were almost preserved following the 2D incorporation, with a significant increase in intensities except vanishing those of $FeS_2$ and also confirming an increase in the crystallite size of FeO. This increase in intensity of FeO peaks is not attributed to the addition of $TiO_2$ peaks, as these peaks occurred at different 2theta values. The diffraction pattern peaks attributable to $TiO_2$ in FIG. 2 correspond to the (101), (004), (200) and (105) reflections of the anatase phase with maintaining the FeO rhombohedral structure. This may indicate possible replacement of some of the $Fe^{3+}$ for $Ti^{4+}$ based on the small shift to larger 2-theta angles of some peaks due to decreasing the ionic radius of the latter than that of the former. Interestingly, the nanocomposite $FeS_2/FeO$@10 $TiO_2$ shows a marked decrease in intensity compared with the other 2D incorporated samples (4% $TiO_2$, 4% $C_3N_4$, 4% $TiO_2$b/$C_3N_4$) illustrating strong interaction at this level of $TiO_2$ and a decrease in crystallite size. The appearance of new peaks in those samples at 2θ values of 28.3°, and 44.0° not observed in $FeS_2/FeO$ may indicate the strong interaction of latter moieties with the 2D structure and/or to the formation of deficient Ti sites. Indeed, such impacts are barely discernible at the 4% 2D level. Further, the existence of some tiny peaks at 2θ=72° and 74.8° attributable to rutile were also observed throughout all the 2D incorporated materials. The addition of black titania to $C_3N_4$ influenced the peak intensities of the peaks, which decreased when compared with black titania-free $C_3N_4$ material. Due to the decrease in black titania proportion, no oxygen-deficient titania moieties were detected.

Figure 3:
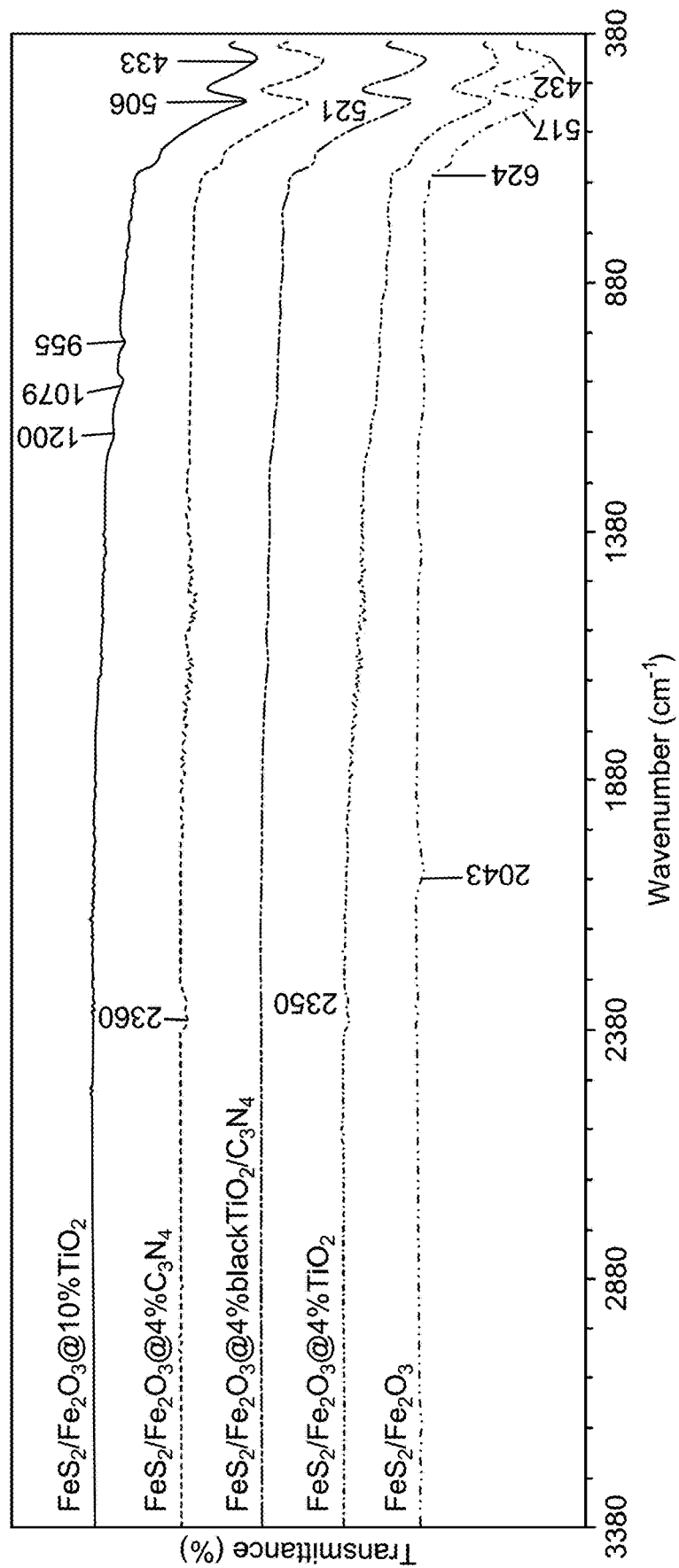
FIG. 3 shows a fourier-transform infrared (FTIR) spectrum of $FeS_2/Fe_2O_3$, $FeS_2/Fe_2O_3$@4% $TiO_2$, $FeS_2$/$Fe_2O_3$@4% $TiO_2b/C_3N_4$, $FeS_2/Fe_2O_3$@4% $C_3N_4$ and $FeS_2$/$Fe_2O_3$@10% $TiO_2$ in the 400-4000 range, according to certain embodiments.

The FTIR spectra of fabricated $FeS_2/FeO$ and their nanocomposites with various 2D nanomaterials ($TiO_2$, $C_3N_4$, and $TiO_2$b/$C_3N_4$), which were captured in the region of 380-3380 $cm^{-1}$, are displayed in FIG. 3. Peaks for the features of the Fe—O of $Fe_2O_3$ and Fe—S of $FeS_2$ bond vibrations, respectively, can potentially be seen in the $FeS_2/FeO$ spectra at 432 $cm^{-1}$, 517 $cm^{-1}$, and 624 $cm^{-1}$. Shifting of the former peaks of Fe—O to lower wavenumbers than its usual positions indicates the presence of $FeS_2$ and provides evidence for an interaction between these phases. The incorporation of 2D nanomaterials with $FeS_2/FeO$ results in the appearance of the same peaks, with minor shifts for the F—O peak located at 517 $cm^{-1}$ into 521 $cm^{-1}$ and 506 $cm^{-1}$ for 4% $TiO_2$ and 10% $TiO_2$, respectively. This indicates that in the latter 2D material, the peak was driven by Fe—O rather than the Fe—S bond that was preserved throughout all the 2D incorporations. Due to its small amount, the 4% $C_3N_4$ sample no longer exhibits any typical peaks in the 1200-1650 $cm^{-1}$ region, as evidenced by XRD data that did not reveal the crystal facet (002) at 2θ=27.3°. Tiny bands are visible on the $FeS_2/FeO$@2D 10% $TiO_2$ nanocomposite at 995, 1079, and 1200 $cm^{-1}$ that correspond to the Ti—O—Fe and C—O stretching modes and surface remnants of pyrite, respectively. The chemical bonds formed between $FeS_2/FeO$ and 2D $TiO_2$ lead to the formation of an interface between them, which facilitates charge transfer as well as promoting the separation of photogenerated charges as described below.

Example 7. Electron Microscopy Characterization

Figure 4A:
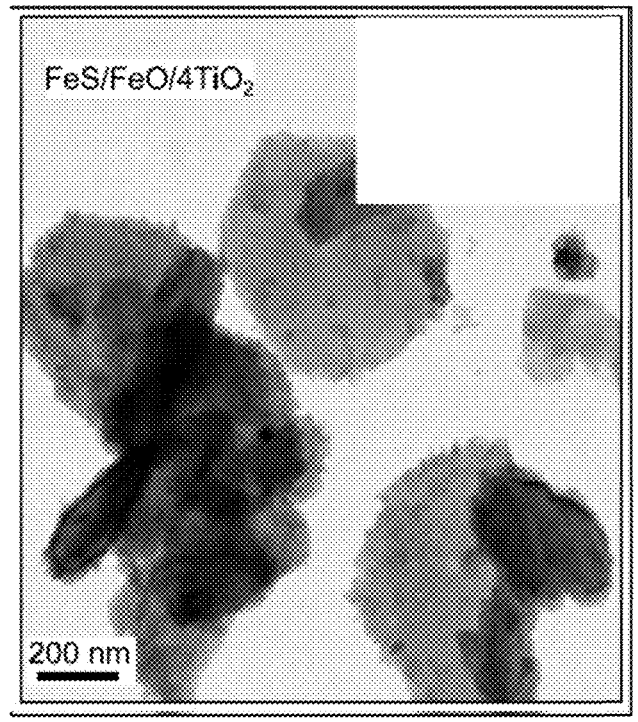
FIG. 4A shows a transmission electron microscopy (TEM) image of $FeS_2/FeO@4TiO_2$, according to certain embodiments.
Figure 4B:
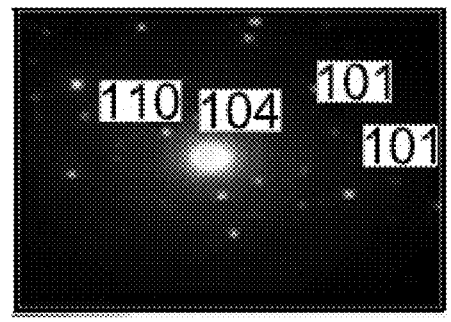
FIG. 4B shows a selected area electron diffraction (SAED) profile of $FeS_2/FeO@4TiO_2$, according to certain embodiments.
Figure 4C:
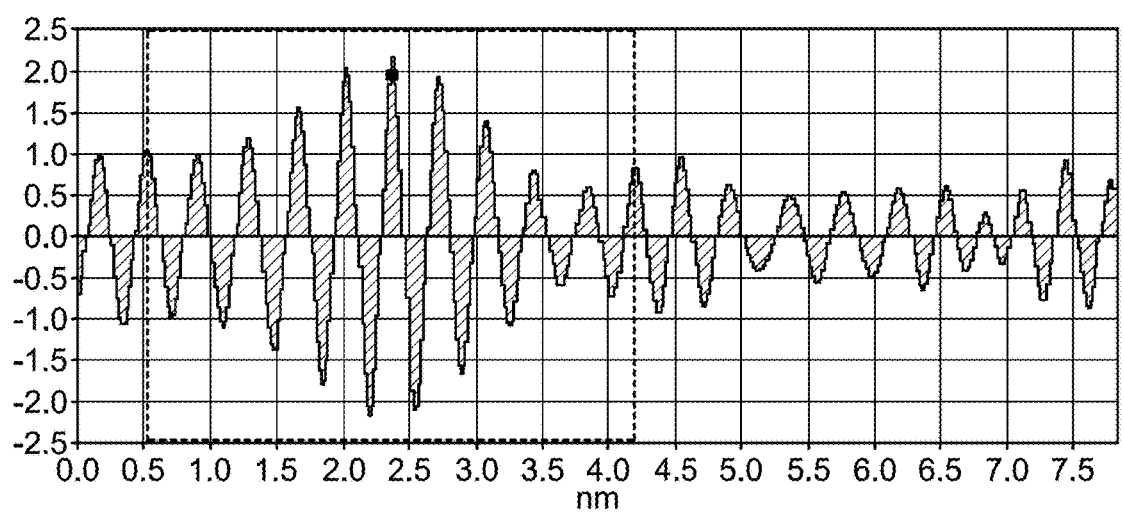
FIG. 4C is an Inverse Fast Fourier Transform (IFFT) profile of $FeS_2/FeO@4TiO_2$, according to certain embodiments.
Figure 4D:
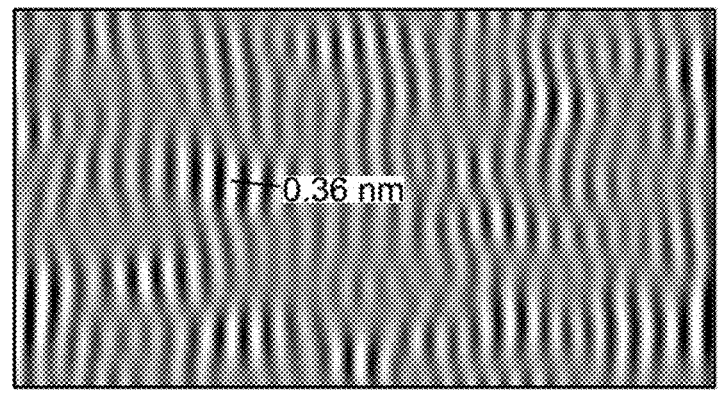
FIG. 4D is a Fast Fourier Transform (FFT) profiles of $FeS_2/FeO@4TiO_2$, according to certain embodiments.
Figure 4E:
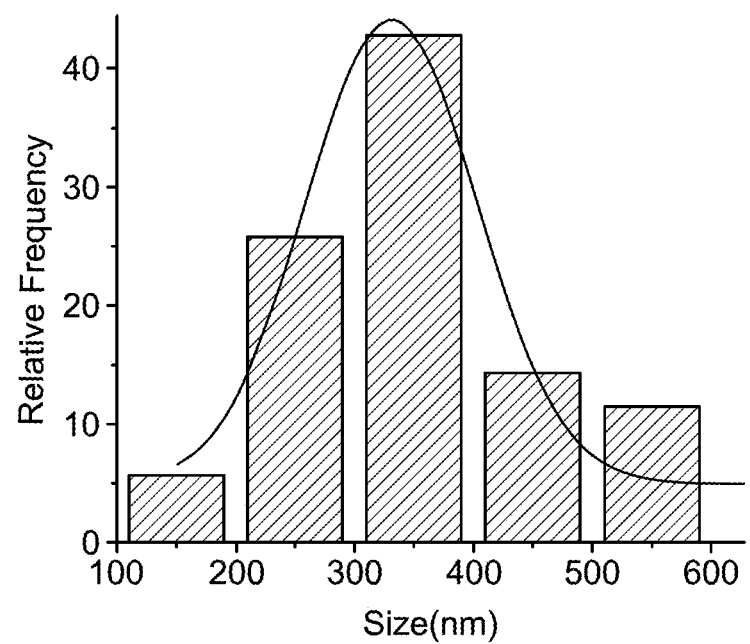
FIG. 4E shows a histogram of particle size distribution of $FeS_2/FeO@4TiO_2$, according to certain embodiments.
Figure 4F:
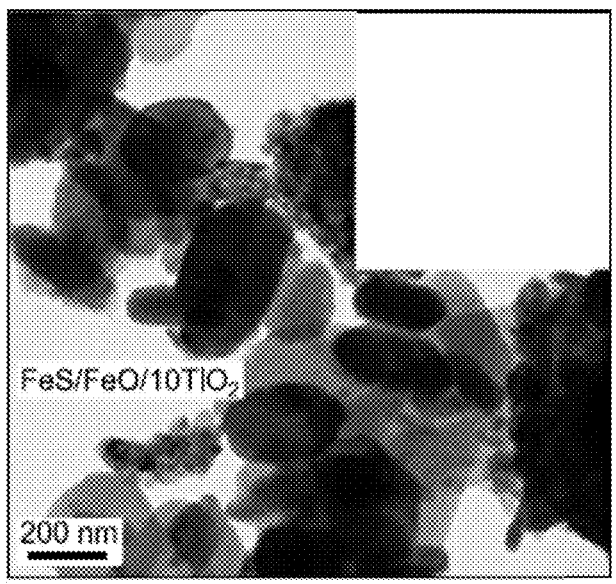
FIG. 4F shows a TEM image of $FeS_2/FeO@10TiO_2$, according to certain embodiments.
Figure 4G:
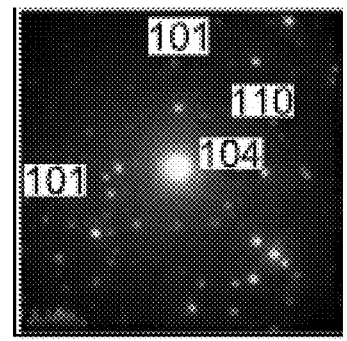
FIG. 4G shows a and SAED profile of $FeS_2/FeO@10TiO_2$, according to certain embodiments.
Figure 4H:
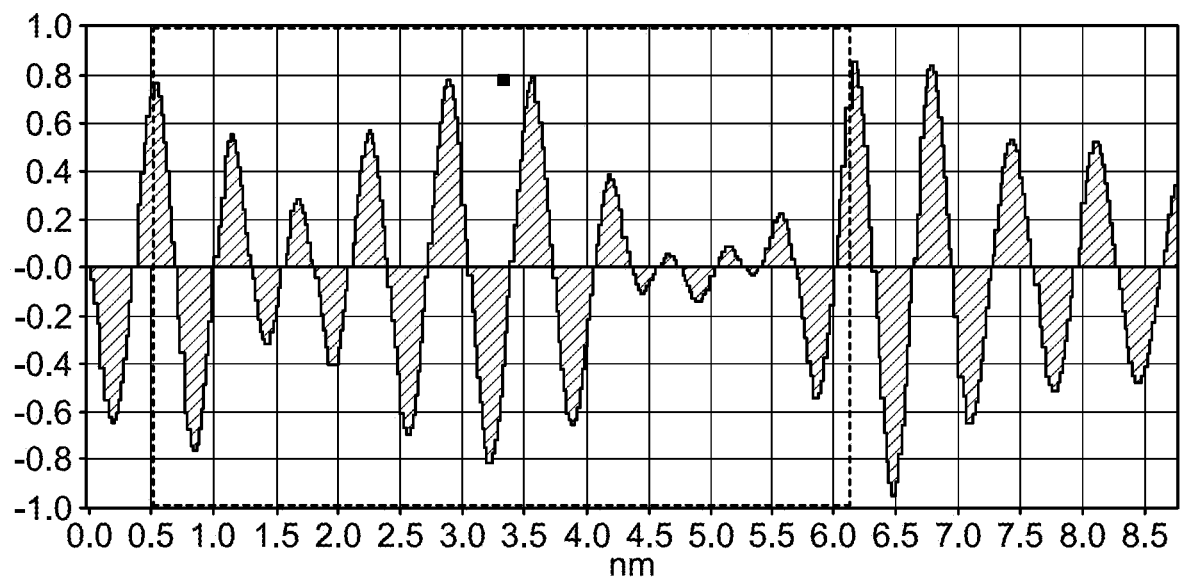
FIG. 4H is a IFFT profile of $FeS_2/FeO@10TiO_2$, according to certain embodiments.
Figure 4I:
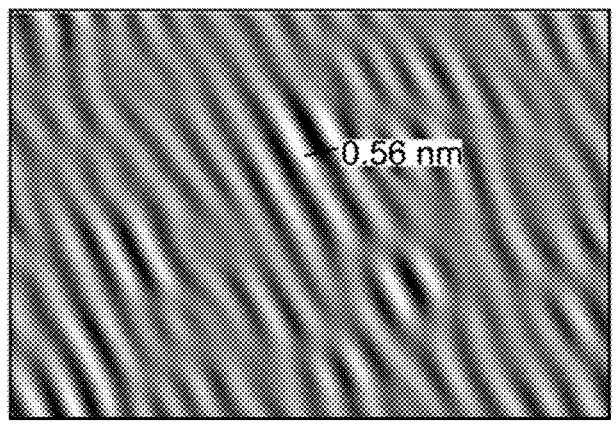
FIG. 4I is a FFT profile of $FeS_2/FeO@10TiO_2$, according to certain embodiments.
Figure 4J:
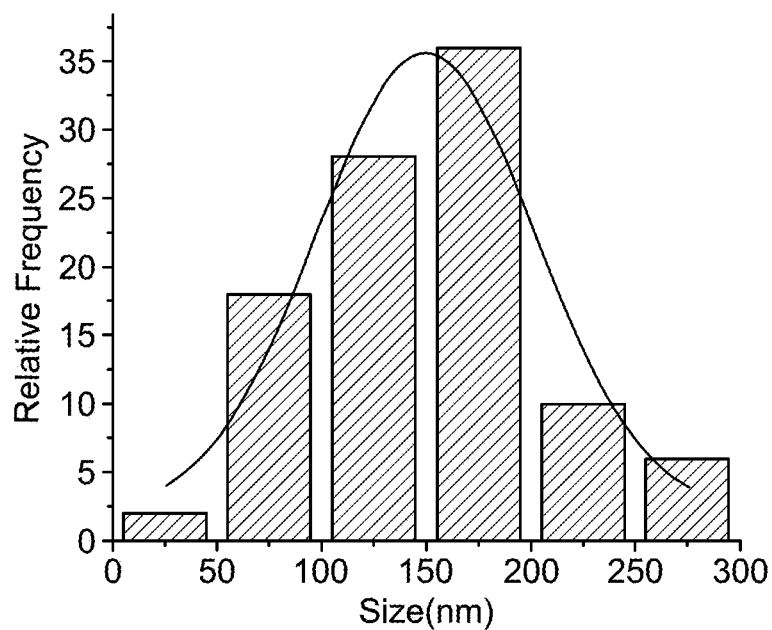
FIG. 4J shows a histogram of particle size distribution of $FeS_2/FeO@10TiO_2$, according to certain embodiments.
Figure 4K:
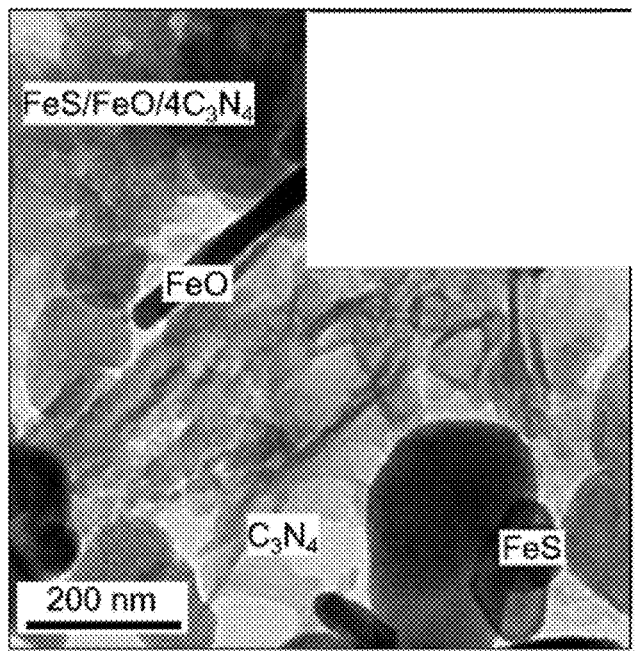
FIG. 4K shows a TEM image of $FeS_2/FeO@4C_3N_4$, according to certain embodiments.
Figure 4L:
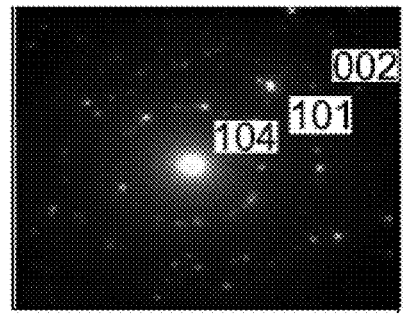
FIG. 4L shows a SAED profile of $FeS_2/FeO@4C_3N_4$, according to certain embodiments.
Figure 4M:
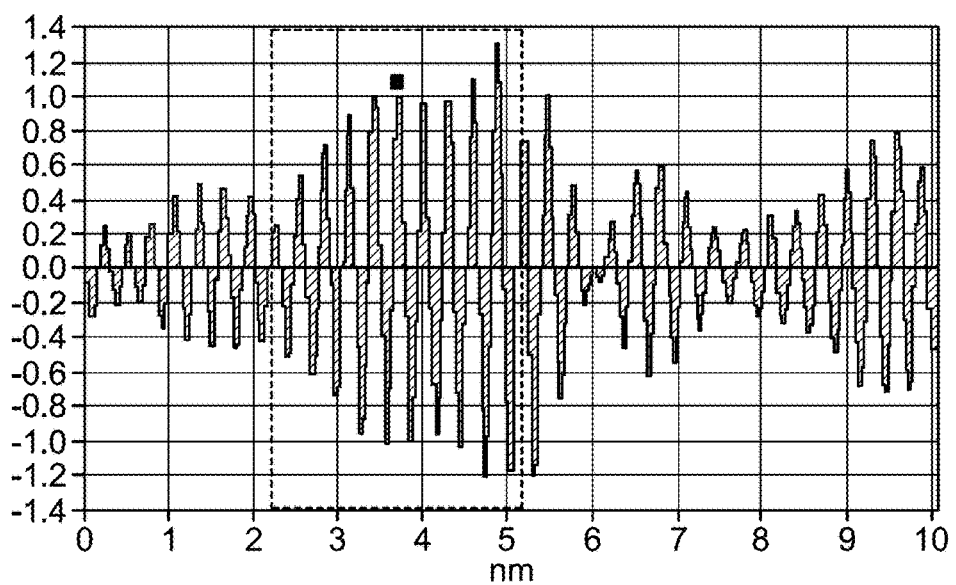
FIG. 4M is a IFFT profile of $FeS_2/FeO@4C_3N_4$, according to certain embodiments.
Figure 4N:
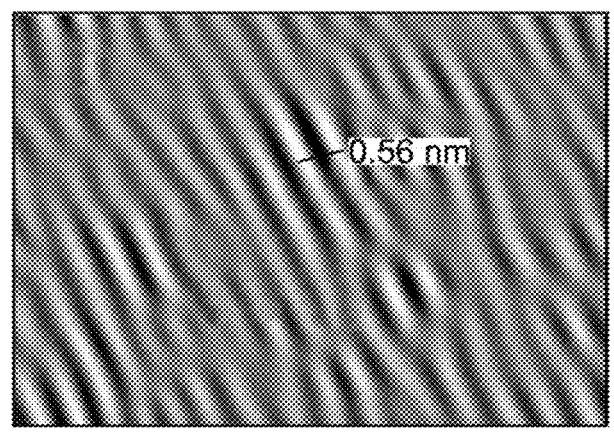
FIG. 4N is a FFT profile of $FeS_2/FeO@4C_3N_4$, according to certain embodiments.
Figure 4O:
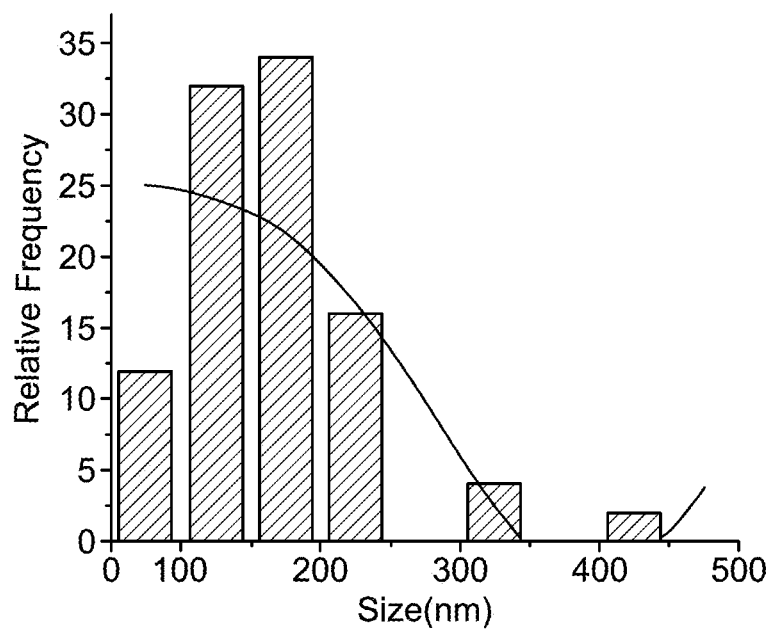
FIG. 4O shows a histogram of a particle size distribution of $FeS_2/FeO@4C_3N_4$, according to certain embodiments.
Figure 4P:
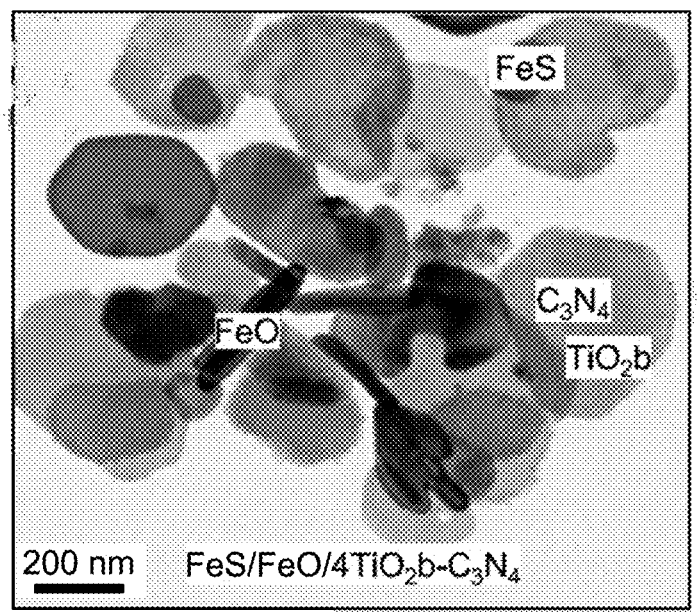
FIG. 4P shows a TEM image of $FeS_2/FeO@4TiO_2b-C_3N_4$, according to certain embodiments.
Figure 4Q:
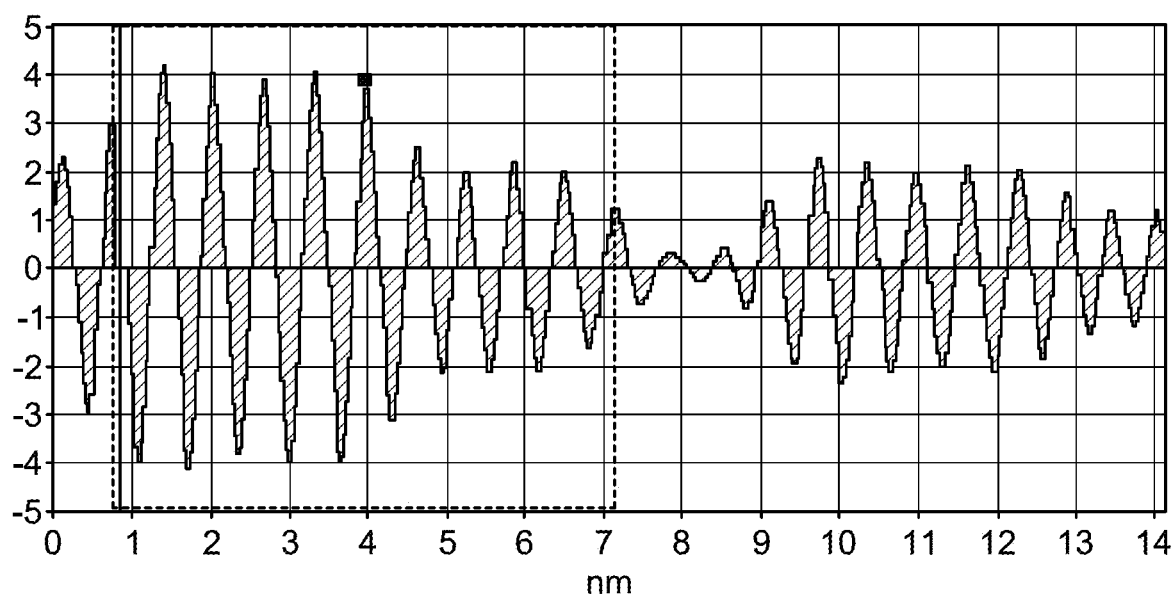
FIG. 4Q is a IFFT profile of $FeS_2/FeO@4TiO_2b-C_3N_4$, according to certain embodiments.
Figure 4R:
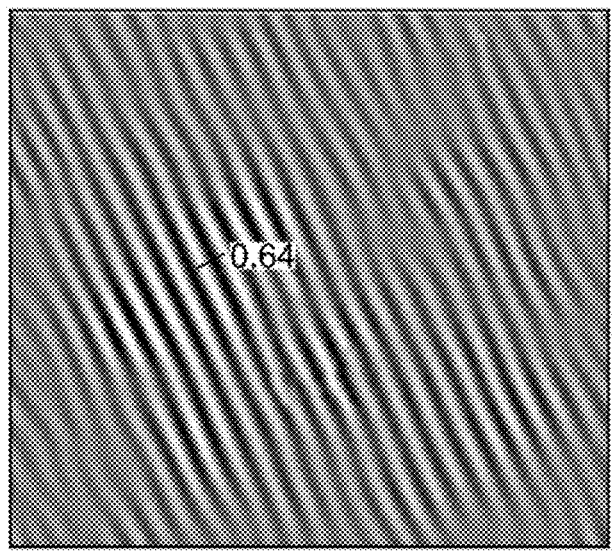
FIG. 4R is a FFT profile of $FeS_2/FeO@4TiO_2b-C_3N_4$, according to certain embodiments.
Figure 4S:
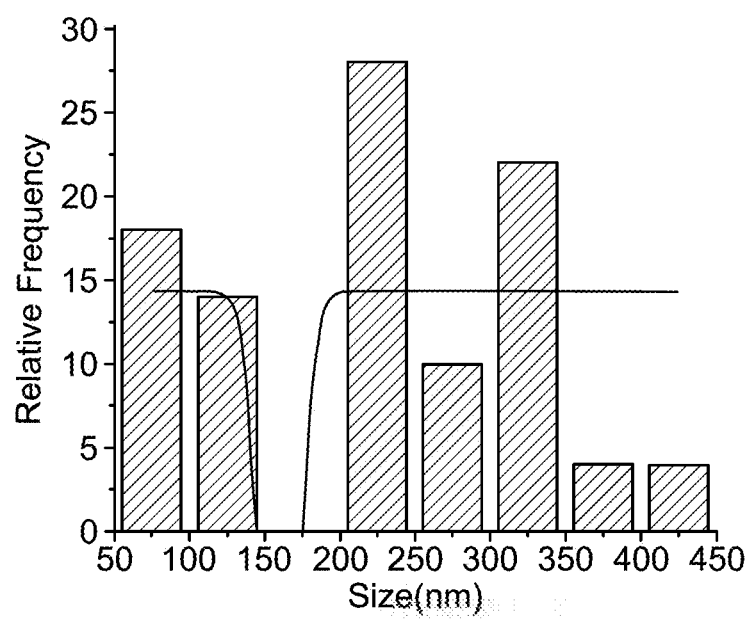
FIG. 4S shows a histogram of particle size distribution of $FeS_2/FeO@4TiO_2b-C_3N_4$, according to certain embodiments.

The TEM images show that the $FeS_2/FeO$ loaded with 4% $TiO_2$ (FIGS. 4A-4E) includes layered of 2D $TiO_2$ nanosheets coated by spindle shapes of $\alpha-Fe_2O_3$ and nanoparticles of $FeS_2$ (dark parts-FIG. 4A). The SAED figure (FIG. 4B) shows diffraction spots indicating the crystallinity as well as the strong interaction between components forming the catalyst, as evidenced by the clear lattice spacing of (104) and (110) for FeO, (101) for $FeS_2$ and (101) for $TiO_2$. The FFT and IFFT values (FIGS. 4C-4D) indicate a d-spacing at 0.36 nm that is assigned to FeS, representing the lattice spacing of (200), indicating its good orientation on the 2D$TiO_2$ sample. These images show particles having a mean size of 340 nm with size distribution ranging from 100 to 700 nm, determined after counting 100 particles (FIG. 4E). Increasing the $TiO_2$ loading into 10% results in the same morphology including spindle/nanoparticle shapes of FeO/$FeS_2$ covering the 2D of $TiO_2$ (bright parts) (FIG. 4F). The SAED also displayed separate spots with halos (FIG. 4G), possibly indicating the presence of high energy amorphous phase, as evidenced from XRD results. The FFT and IFFT patterns (FIGS. 4H-4I) indicate a d-spacing of 0.56 nm not identified in any of the nanocomposite components and assigned to the existence of a new phase resulted from the interaction of the components. The particle size in this sample appears to be well controlled, having a mean particle size of 153 nm with a narrower distribution (FIG. 4J). The close proximity between FeO and $FeS_2$ with $TiO_2$ may help promote species transfer throughout photocatalysis, which is advantageous for building a Z-scheme hybrid nanocomposite. The $FeS_2/FeO@4\%$ $C_3N_4$ image exhibited thin folded nanosheets of $C_3N_4$ incorporated with big nanoparticles/spindle shapes of $FeS_2/FeO$ (FIG. 4K). The SAED circles (FIG. 4L) matched with (104), (101) and (002) diffraction planes. These planes are put into effect in an increasing order from the interior to the exterior to FeO, FeS, and 2D $C_3N_4$. The FFT and IFFT profiles (FIGS. 4M-4N) showed a d-spacing of 0.56 nm that may be related to a new nanocomposite formation since none of FeS, FeO, or $C_3N_4$ have a d-spacing at the mentioned value. This sample displays particle sizes similar to that delivered for 10% $TiO_2$ with a slightly narrower distribution (FIG. 4O). The $FeS_2/FeO@4\%$ $TiO_2b-C_3N_4$ catalysts presented similar morphology (FIG. 4P) as that of metal containing $C_3N_4$ however with larger particles sizes reaching a mean of 230 nm with narrow distribution (FIG. 4S), as well as ridged porous sheets of $C_3N_4$ as a result of evolution of black $TiO_2$ within it. The FFT and IFFT (FIGS. 4Q-4R) showed an interplanar spacing of 0.64 nm not observed before of any of the components forming the nanocomposite, indicating the possible formation of a new phase.

Example 8. Optical Characterization

Figure 5A:
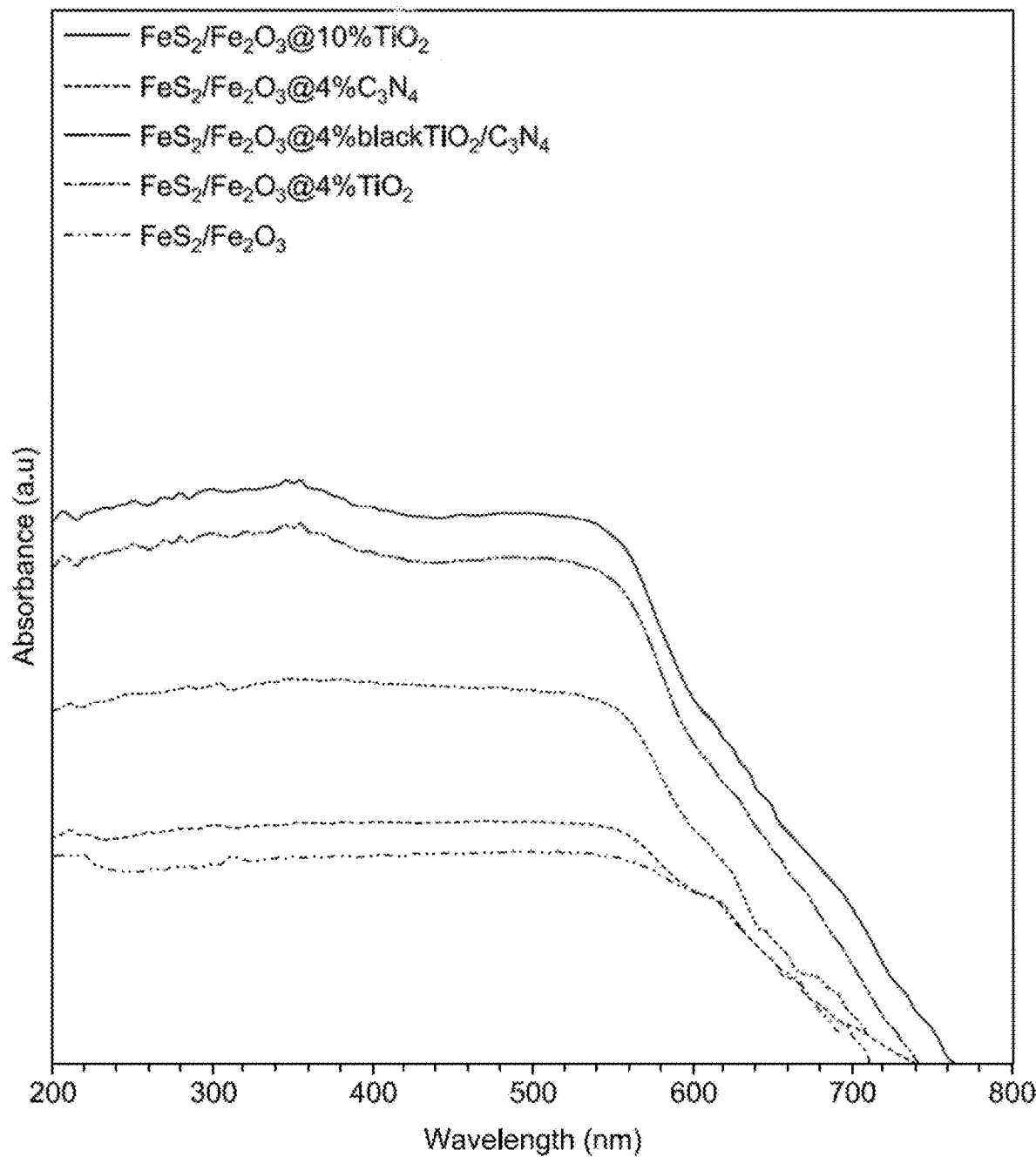
FIG. 5A shows a UV-Vis absorption spectra of $FeS_2/FeO@4\% TiO_2$, $FeS_2/FeO @10\% TiO_2$, $FeS_2/FeO@4\% TiO_2b-C_3N_4$, and $FeS_2/FeO@C_3N_4$.
Figure 5B:
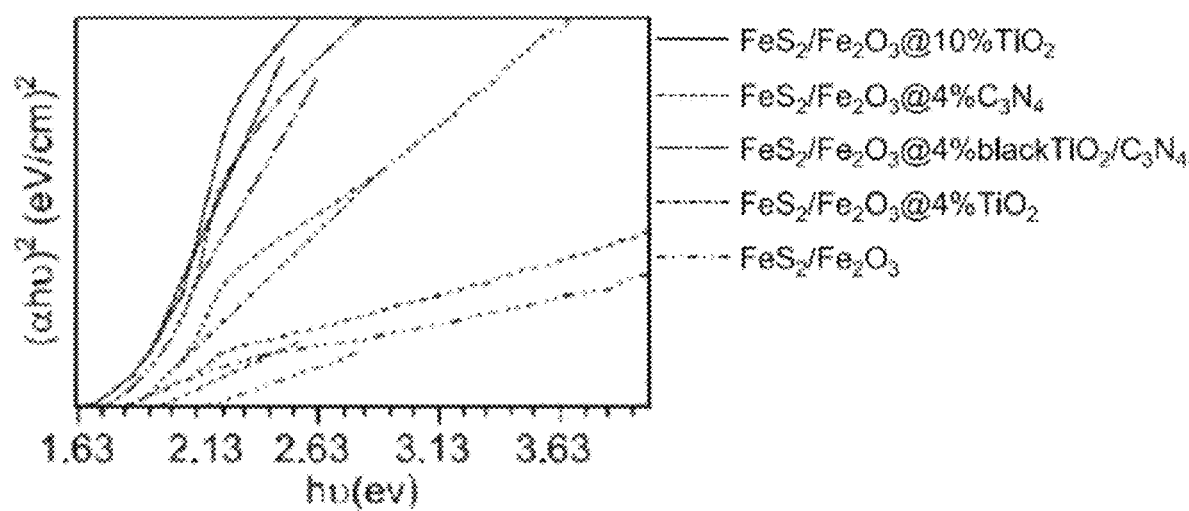
FIG. 5B shows the corresponding Tauc plots for calculating band gap energy, according to certain embodiments.

The UV-Vis spectra (between 200 and 800 nm) of all the manufactured nanocomposites are shown in FIG. 5A. The energy gap curves, calculated using the Tauc relation are shown in FIG. 5B. When compared to the binary nanocomposite $FeS_2/FeO$, the three-component materials appear to exhibit enhanced absorption over the whole 200-620 nm range, indicating the synergistic effect of the addition of $TiO_2$ and $C_3N_4$ to the latter nanocomposite. Significantly, the $FeS_2/FeO@10TiO_2$ nanocomposite enlarged the absorption range to 760 nm and showed the maximum amount of light absorbed in the visible to near IR, followed by $FeS_2/FeO@4TiO_2b-C_3N_4$. The electrical transition from the valence band to the conduction band and the increased defect ratio, as depicted from XRD and TEM results, can explain the sample containing $10TiO_2$ to absorb strongly in the UV-Vis range. In nanocomposites with $10TiO_2$ and $TiO_2b-C_3N_4$, a broad visible light absorption band at 552 nm is attributed to the indirect transition between $Fe^{3+}$ (3d) electrons, while the discrete peak observed at ~360 nm is attributed to the straight transition from $O^{2-}(2p)$ to $Fe^{3+}$ (3d). Apart from the latter nanocomposites, the prior peak became nearly invisible in the rest of the nanocomposites, indicating the small number of active sites. The estimated bandgap values for all the nanocomposites were as follows: $FeS_2/FeO@10TiO_2$ (1.68 eV)<$FeS_2/FeO@4C_3N_4$ (1.78 eV)<$FeS_2/FeO@4TiO_2$ (1.88 eV)<$FeS_2/FeO@4TiO_2b-C_3N_4$ (1.98 eV)<$FeS_2/FeO$ (2.13 eV). This demonstrates that the $FeS_2/FeO@10TiO_2$ photocatalyst is a superior narrow-bandgap semiconductor.

Photochemical applications can benefit from a lower band gap since they require less energy for charge transport. On the other hand, excessively small band gap energy may accelerate recombination or unwanted transitions of electrons to sink sites. The $\alpha$-$Fe_2O_3$ catalyst's narrow band gap of 2.05 eV is comparable to $FeS_2/FeO$'s (2.13 eV), indicating that FeO makes up most of the binary compound. This result leads to an electronic excitation from Fe to Ti, which results in a decrease in the narrowing of the band gap of Fe-doped $TiO_2$. This may provide a clue about promoting migration and separation of carriers caused by photons, in addition to aiding in the formation of a conduction band at an elevated location. The expansion of the absorption spectra may also be caused by defects associated with transition energy levels. Through the creation of trapped sites and the promotion of a higher exciton recombination velocity, these defects may facilitate the migration of the carrier.

Figure 5C:
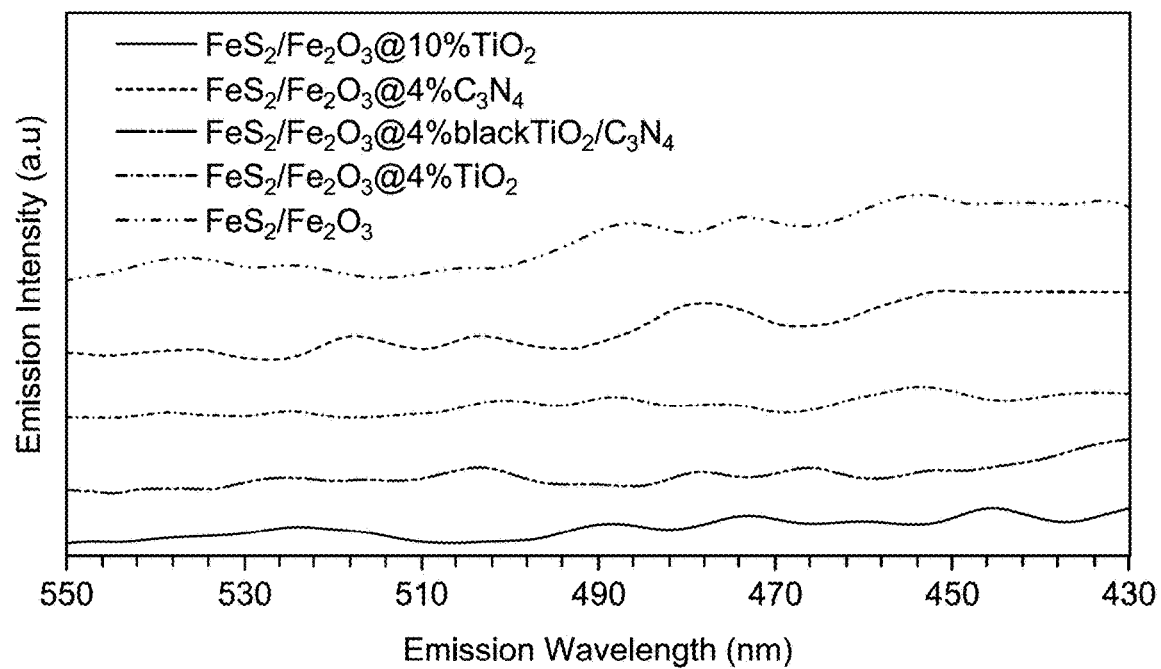
FIG. 5C is a PL emission spectrum of $FeS_2/FeO@4\% TiO_2$, $FeS_2/FeO@10\% TiO_2$, $FeS_2/FeO@4\% TiO_2b-C_3N_4$, and $FeS_2/FeO@C_3N_4$, according to certain embodiments.

Furthermore, PL spectroscopy is a useful technique to observe the separation efficacy of the photogenerated charges. As seen in FIG. 5C, the $FeS_2/FeO@10TiO_2$ nanocomposite has the weakest emission among the catalysts, showing the effective charge carriers' separation efficiency in the ternary photocatalyst. The PL study confirmed the migration of charges in the ternary photocatalysts comprised of $FeS_2/FeO@10TiO_2$ compared with their rest counterparts, as well as the binary system that presented the highest recombination. For the variously manufactured catalysts, distinctly located PL peaks (different transitions) with shifts were found. These different peaks are usually linked to variations in structural arrangements, a greater concentration of structural imperfections, and an alteration to the electronic structure.

Example 9. X-Ray Photoelectron Spectroscopy Characterization

Figure 6A:
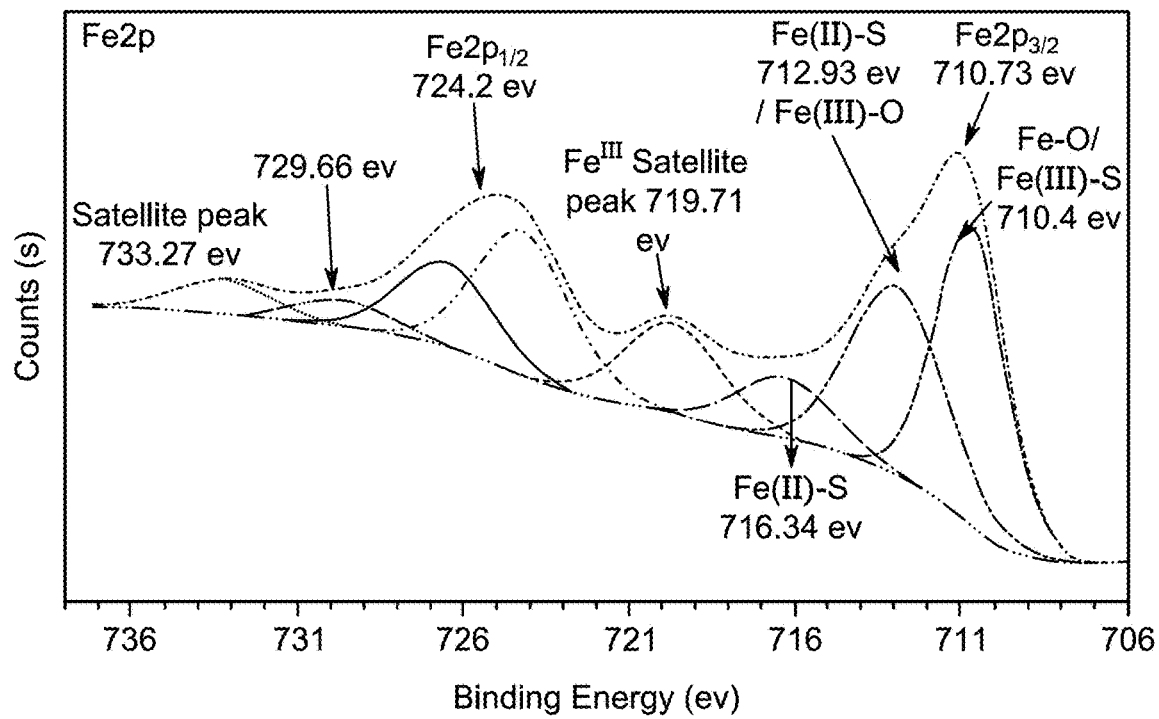
FIG. 6A is a high-resolution x-ray photoelectron spectroscopy (XPS) spectrum of Fe 2p of $FeS_2/FeO@4\% TiO_2$, according to certain embodiments.
Figure 6B:
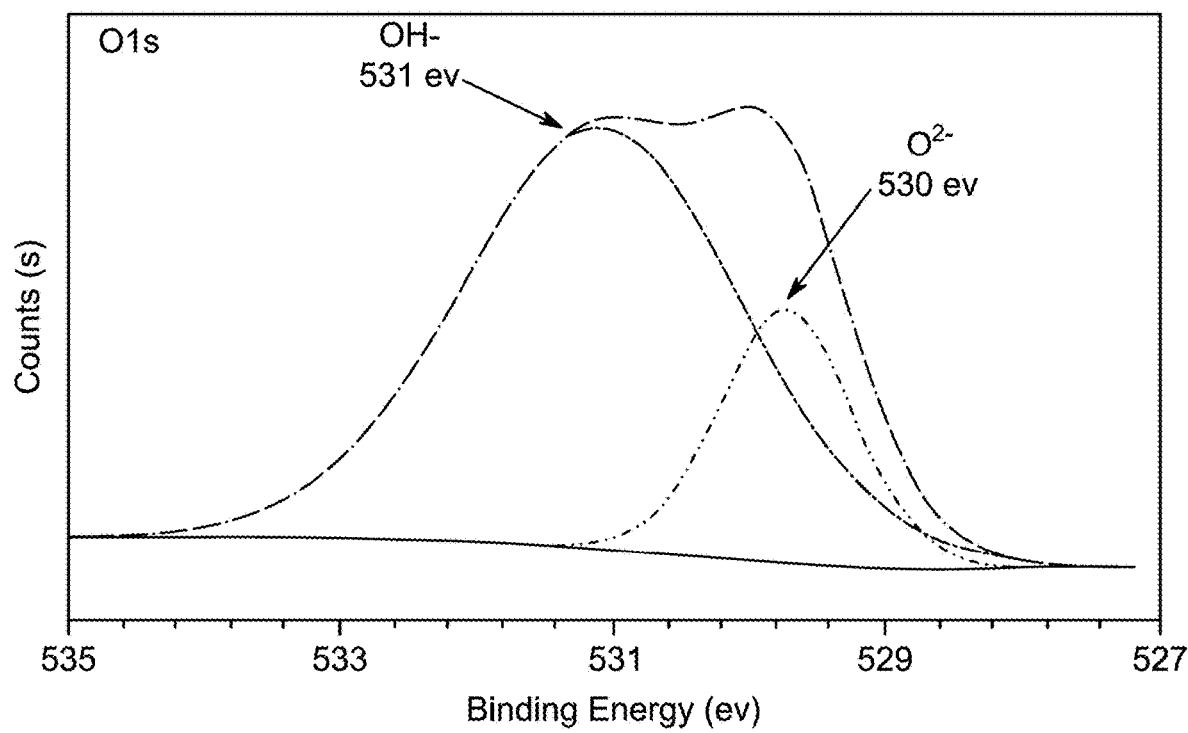
FIG. 6B is a high-resolution XPS spectrum of O 1s of $FeS_2/FeO@4\% TiO_2$, according to certain embodiments.
Figure 6C:
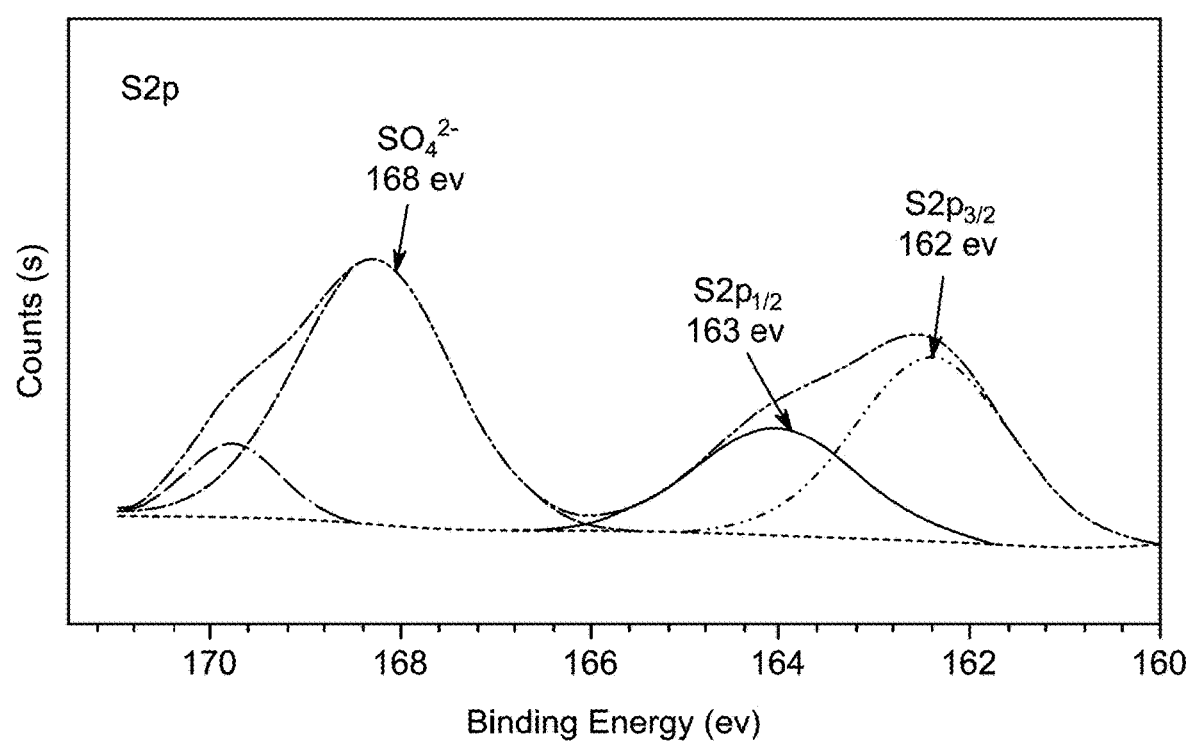
FIG. 6C is a high-resolution XPS spectrum of S 2p of $FeS_2/FeO@4\% TiO_2$, according to certain embodiments.
Figure 6D:
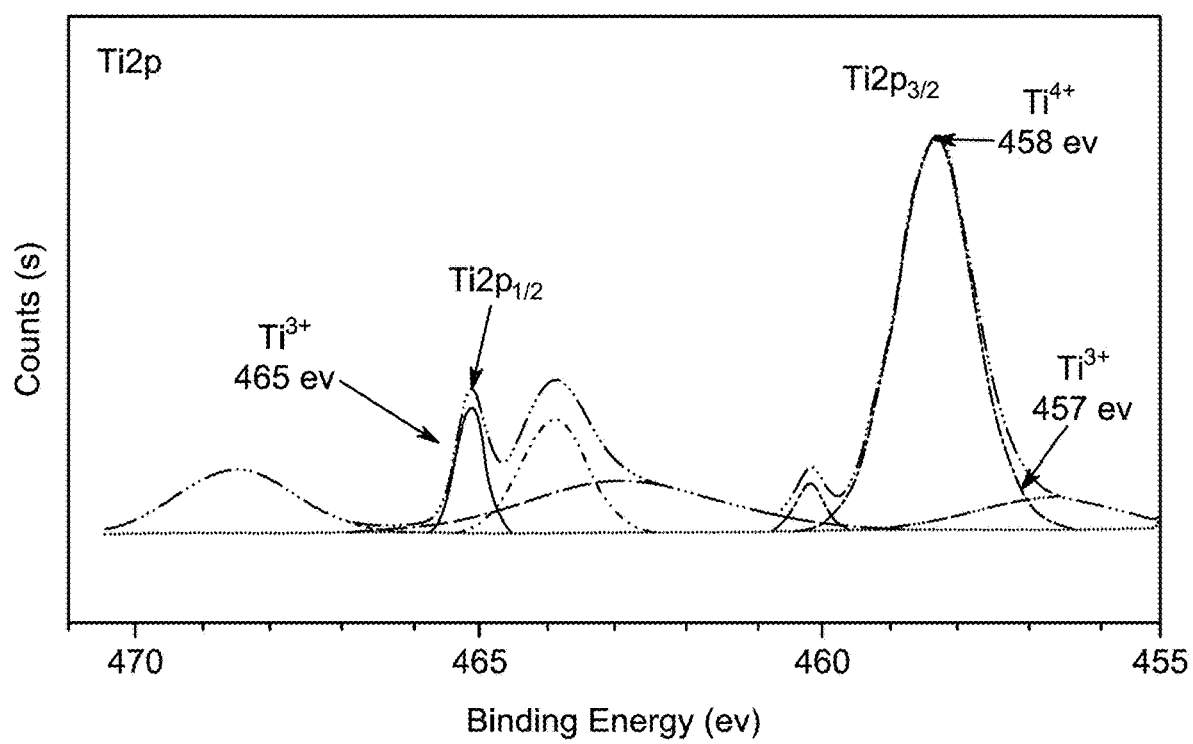
FIG. 6D is a high-resolution XPS spectrum of Ti 2p of $FeS_2/FeO@4\% TiO_2$, according to certain embodiments.
Figure 6E:
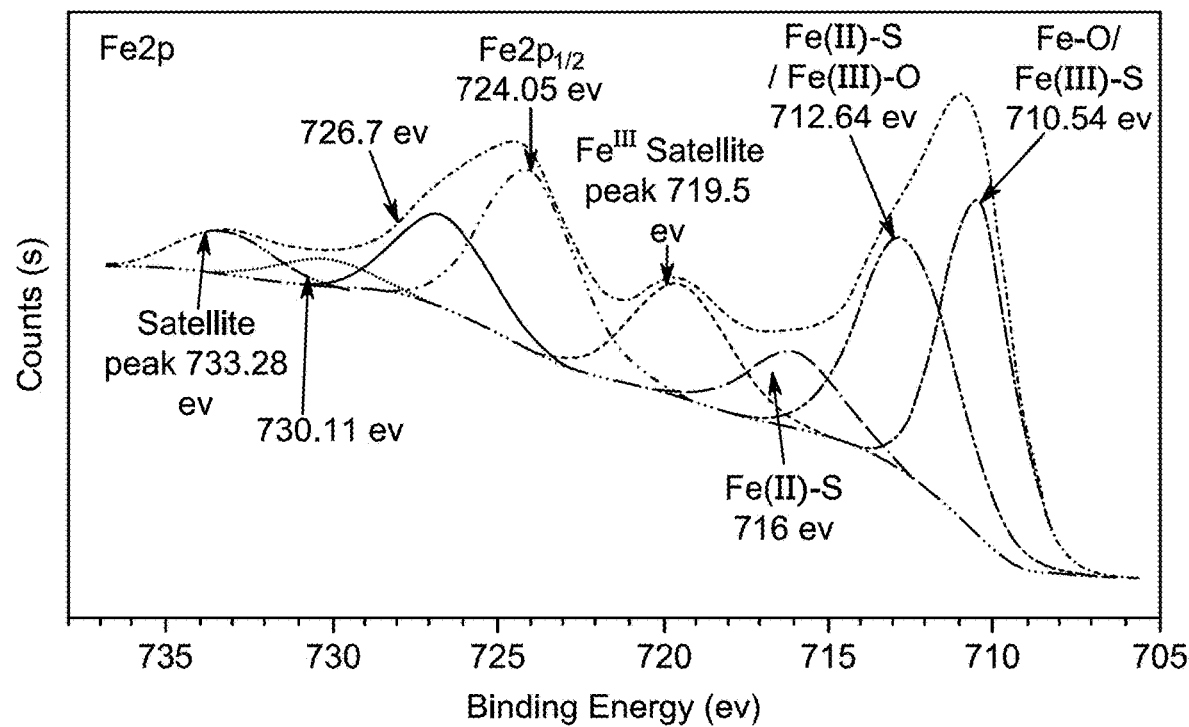
FIG. 6E is a high-resolution XPS spectrum of Fe 2p of $FeS_2/FeO@10\% TiO_2$, according to certain embodiments.
Figure 6F:
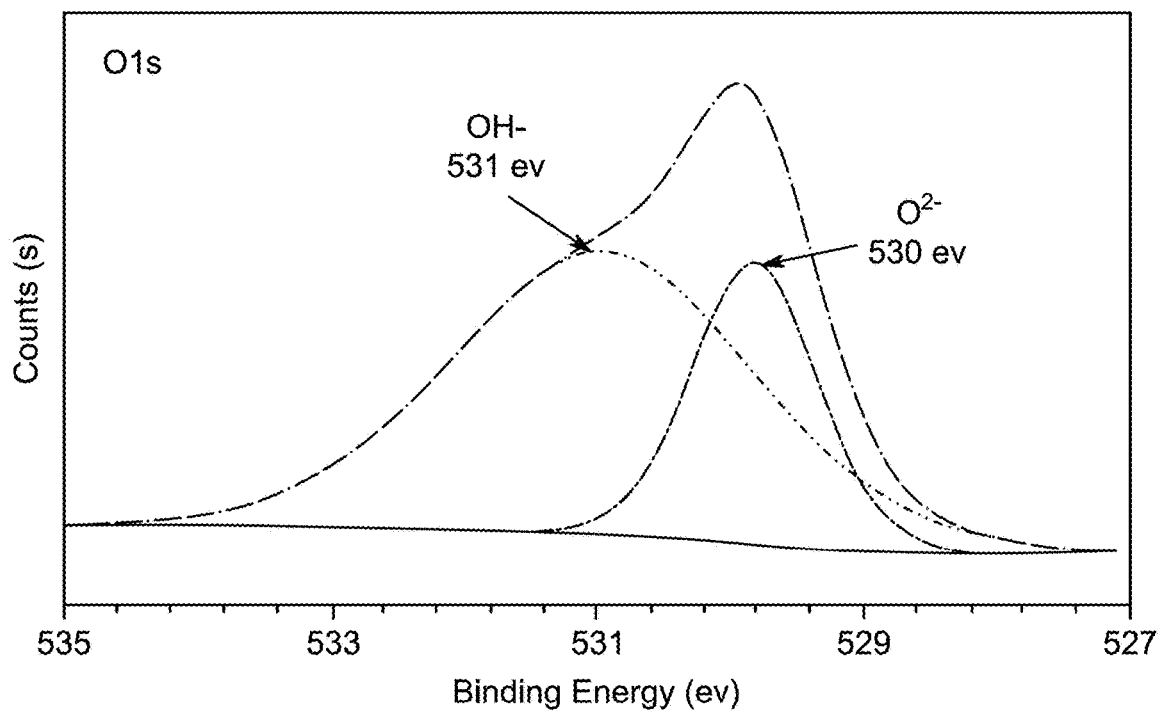
FIG. 6F is a high-resolution XPS spectrum of O 1s of $FeS_2/FeO@10\% TiO_2$, according to certain embodiments.
Figure 6G:
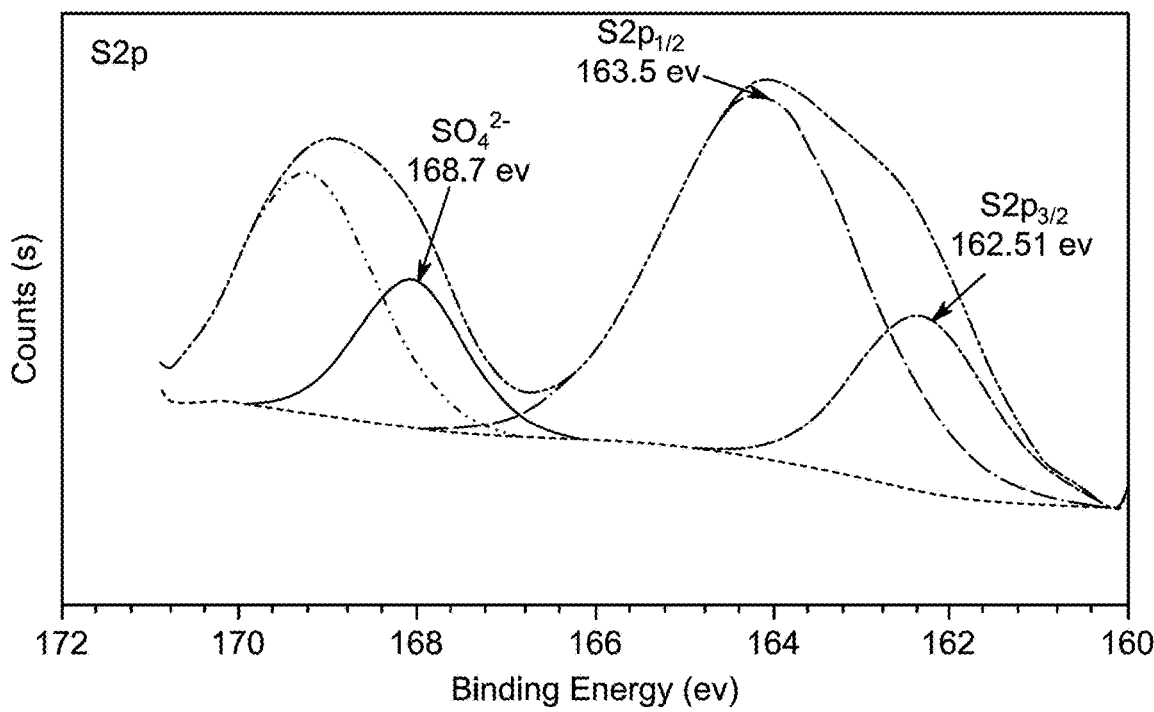
FIG. 6G is a high-resolution XPS spectrum of S 2p of $FeS_2/FeO@10\% TiO_2$, according to certain embodiments.
Figure 6H:
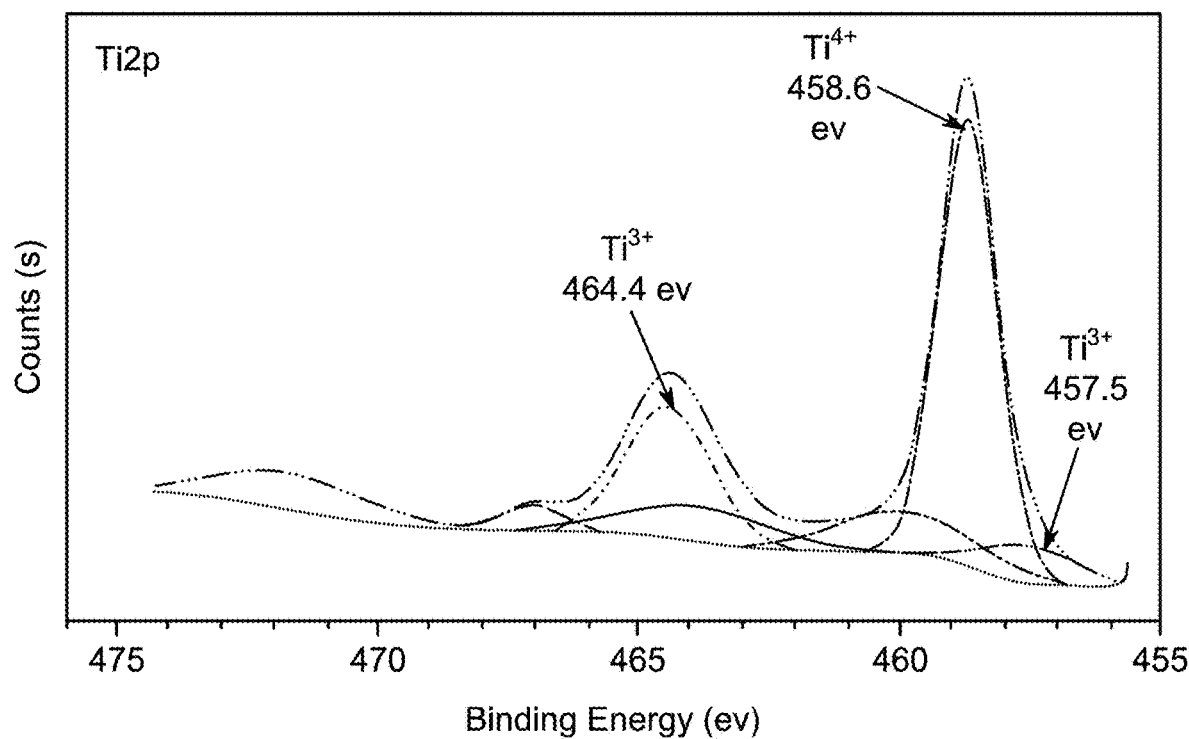
FIG. 6H is a high-resolution XPS spectrum of Ti 2p of $FeS_2/FeO@10\% TiO_2$, according to certain embodiments.
Figure 6I:
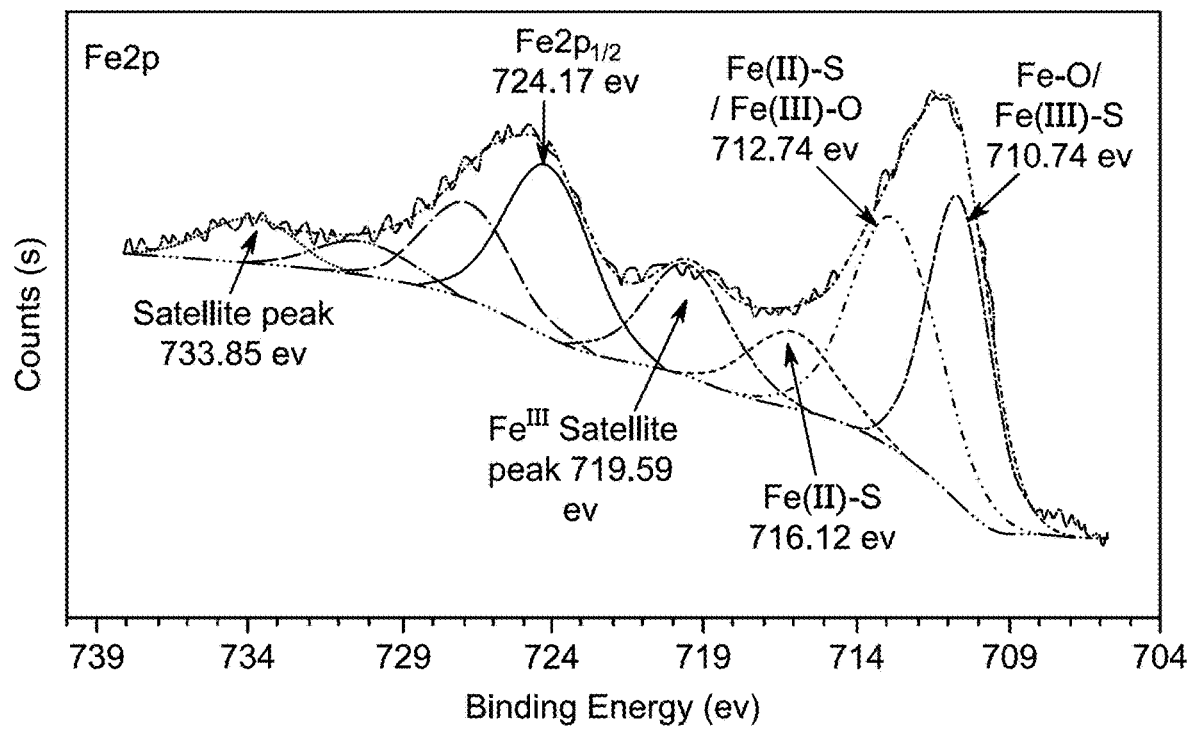
FIG. 6I is a high-resolution XPS spectrum of Fe 2p of $FeS_2/FeO@4\% TiO_2b-C_3N_4$, according to certain embodiments.
Figure 6J:
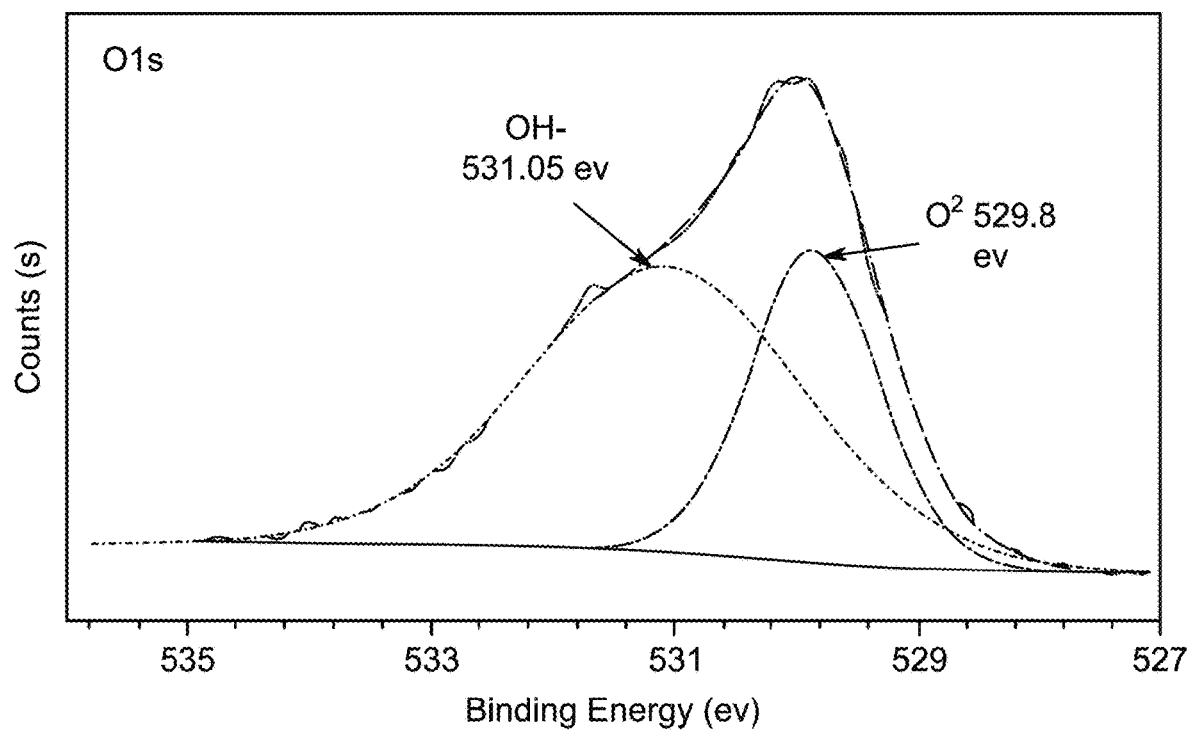
FIG. 6J is a high-resolution XPS spectrum of 0 is of $FeS_2/FeO@4\% TiO_2b-C_3N_4$, according to certain embodiments.
Figure 6K:
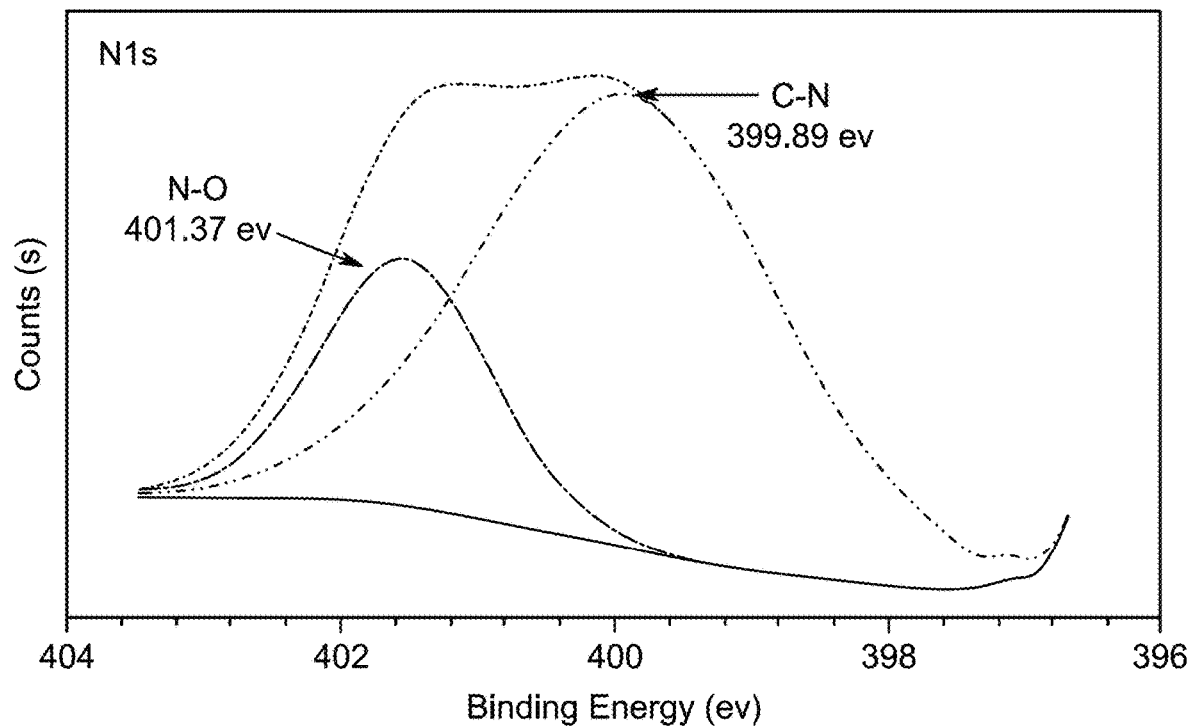
FIG. 6K is a high-resolution XPS spectrum of N 1s of $FeS_2/FeO@4\% TiO_2b-C_3N_4$, according to certain embodiments.
Figure 6L:
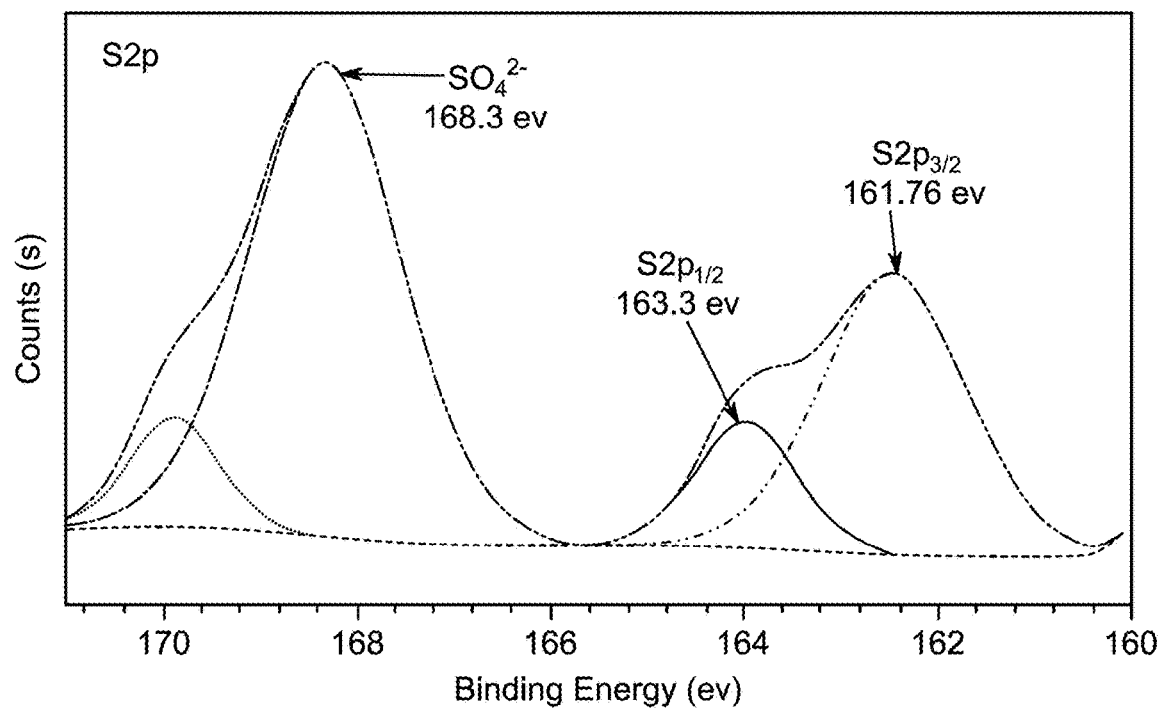
FIG. 6L is a high-resolution XPS spectrum of S 2p of $FeS_2/FeO@4\% TiO_2b-C_3N_4$, according to certain embodiments.
Figure 6M:
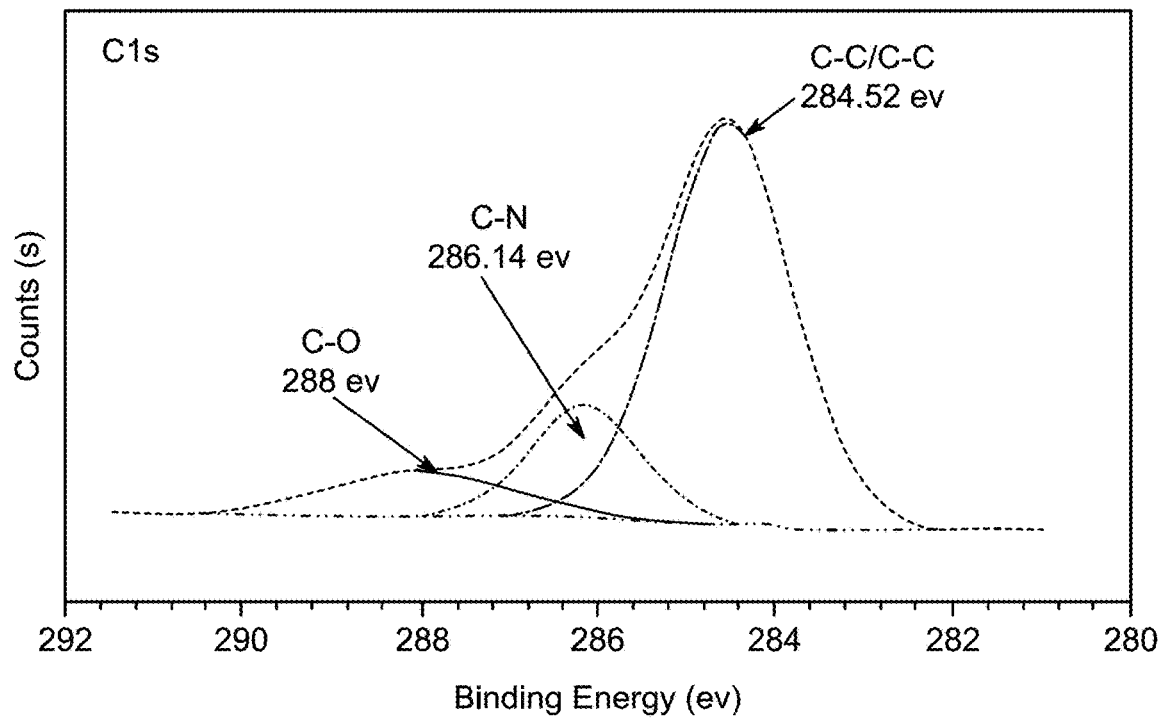
FIG. 6M is a high-resolution XPS spectrum of C 1s of $FeS_2/FeO@4\% TiO_2b-C_3N_4$, according to certain embodiments.
Figure 6N:
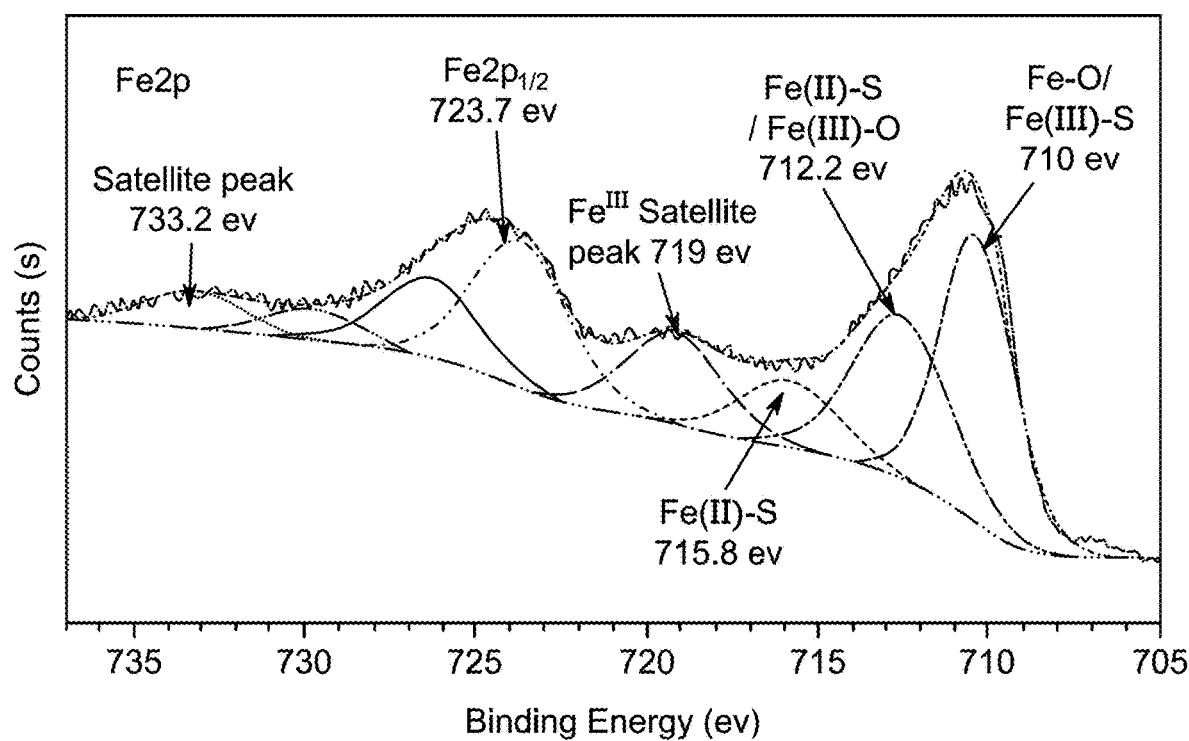
FIG. 6N is a high-resolution XPS spectrum of Fe 2p of $FeS_2/FeO@C_3N_4$, according to certain embodiments.
Figure 6O:
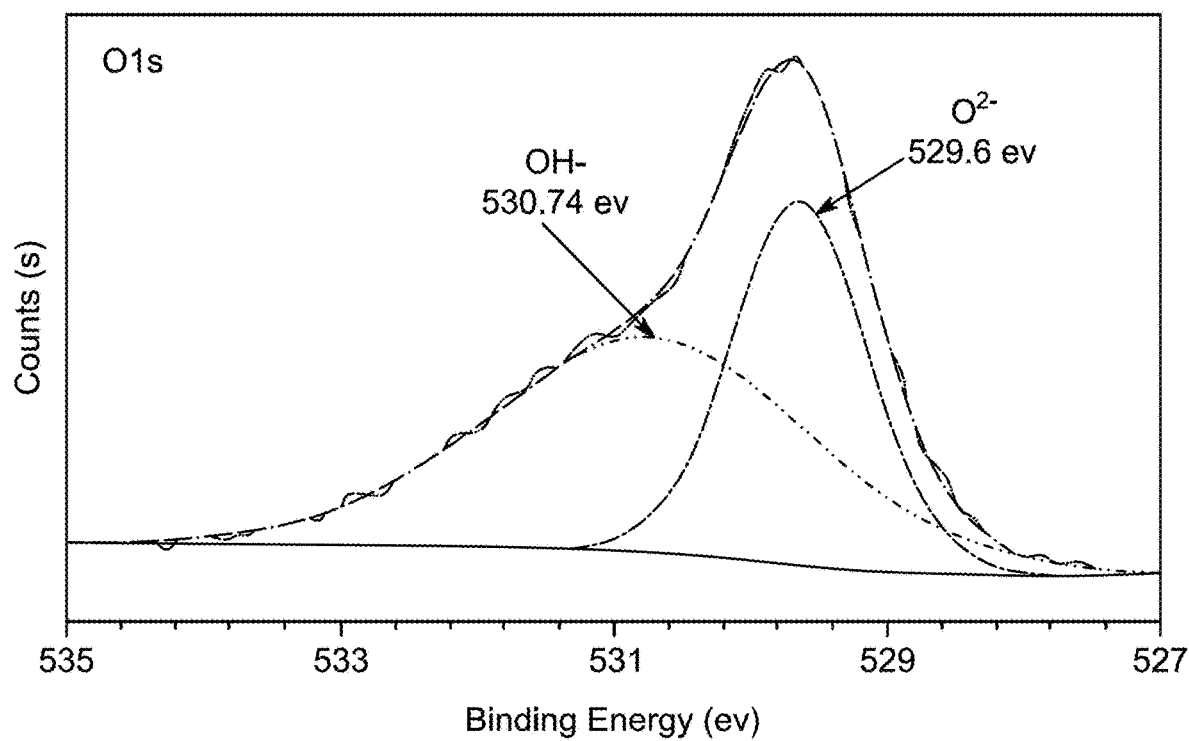
FIG. 6O is a high-resolution XPS spectrum of O 1s of $FeS_2/FeO@C_3N_4$, according to certain embodiments.
Figure 6P:
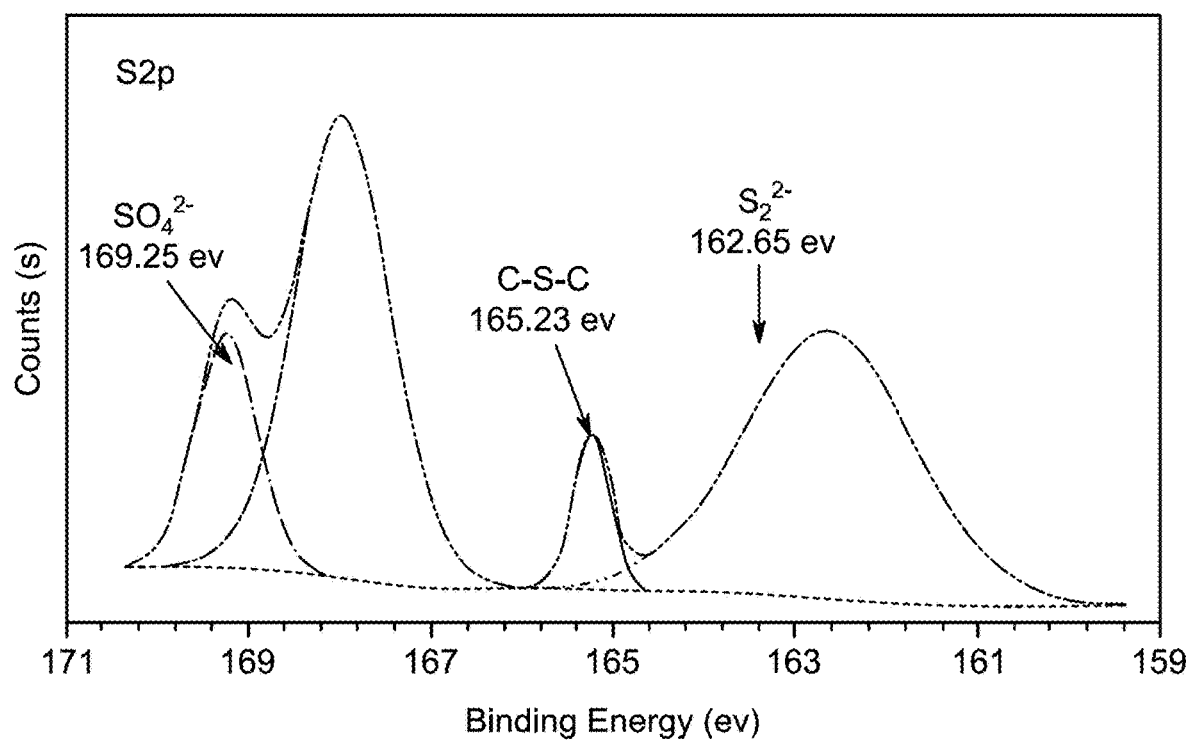
FIG. 6P is a high-resolution XPS spectrum of N 1s of $FeS_2/FeO@C_3N_4$, according to certain embodiments.
Figure 6Q:
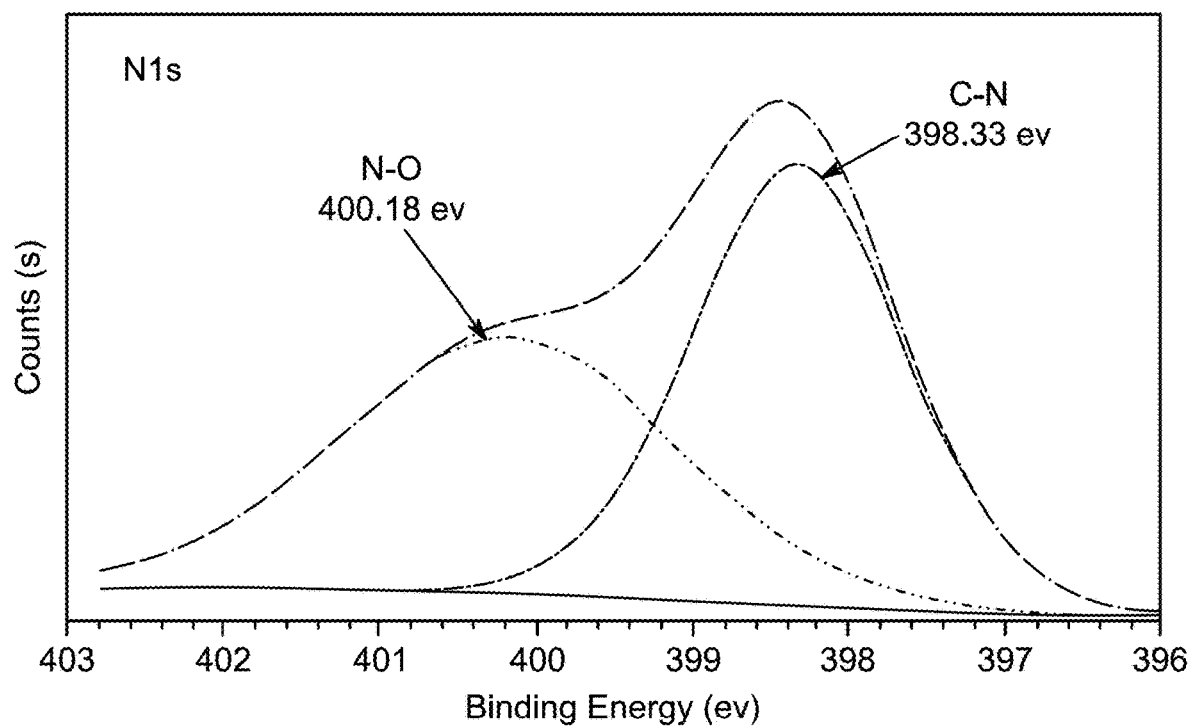
FIG. 6Q is a high-resolution XPS spectrum of S 2p of $FeS_2/FeO@C_3N_4$, according to certain embodiments.
Figure 6R:
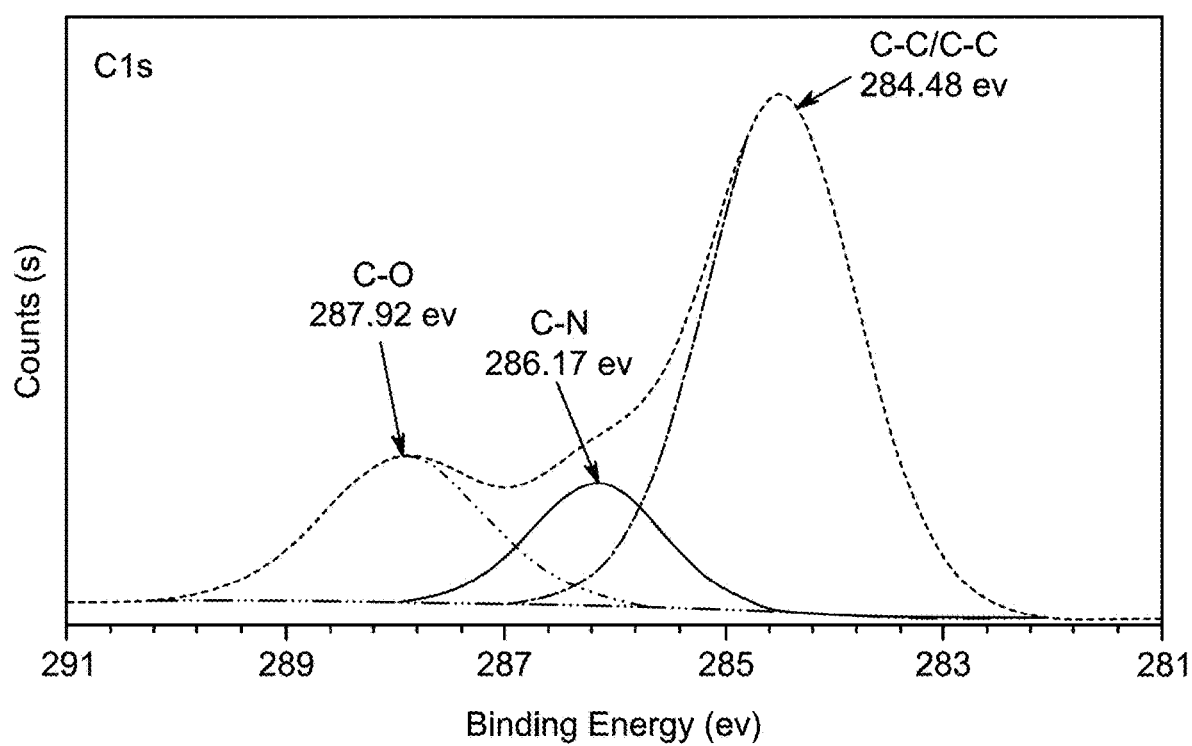
FIG. 6R is a high-resolution XPS spectrum of C 1s of $FeS_2/FeO@C_3N_4$, according to certain embodiments.
Figure 7A:
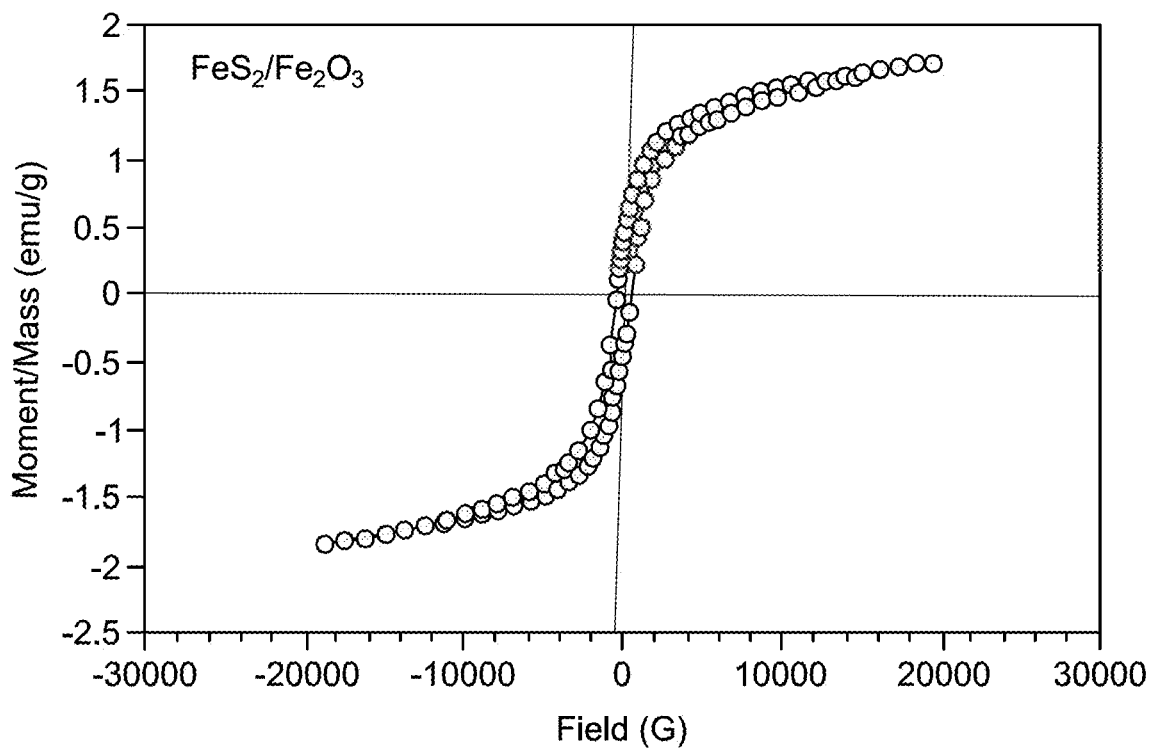
FIG. 7A shows curves for vibrating sample magnetometer (VSM) magnetization of $FeS_2/Fe_2O_3$ catalysts measured at room temperature, according to certain embodiments.
Figure 7B:
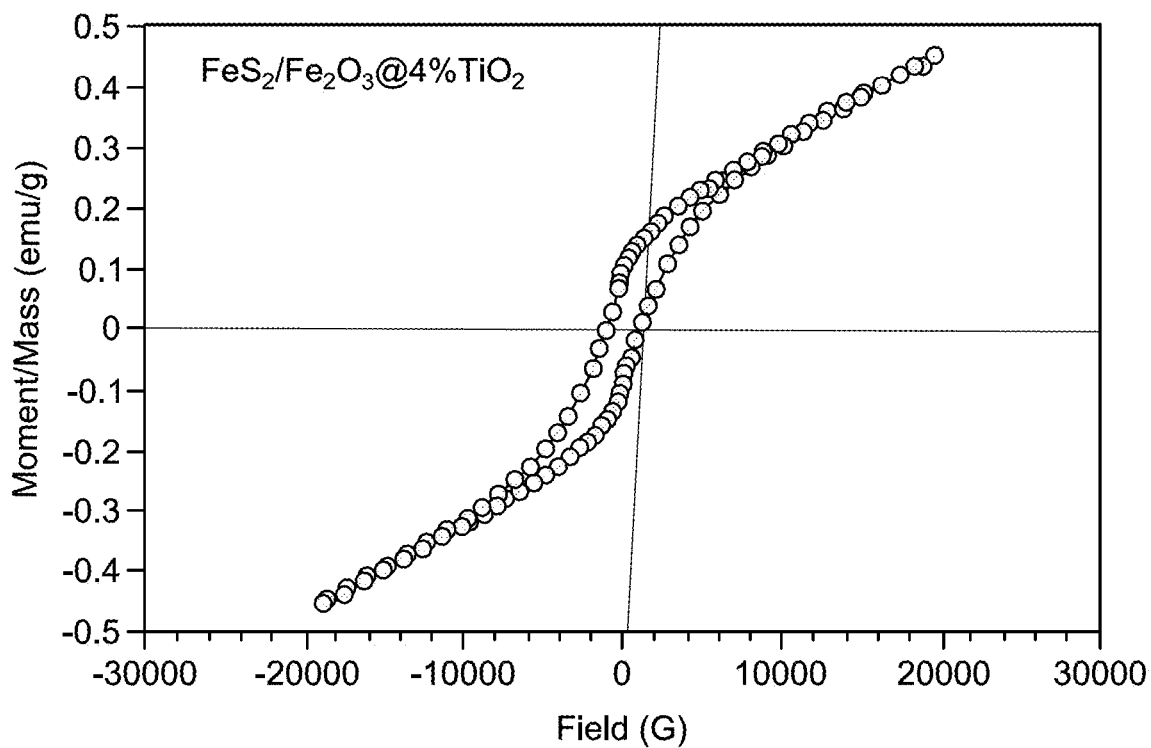
FIG. 7B shows curves for VSM magnetization of $FeS_2/Fe_2O_3@4\% TiO_2$ catalysts measured at room temperature, according to certain embodiments.
Figure 7C:
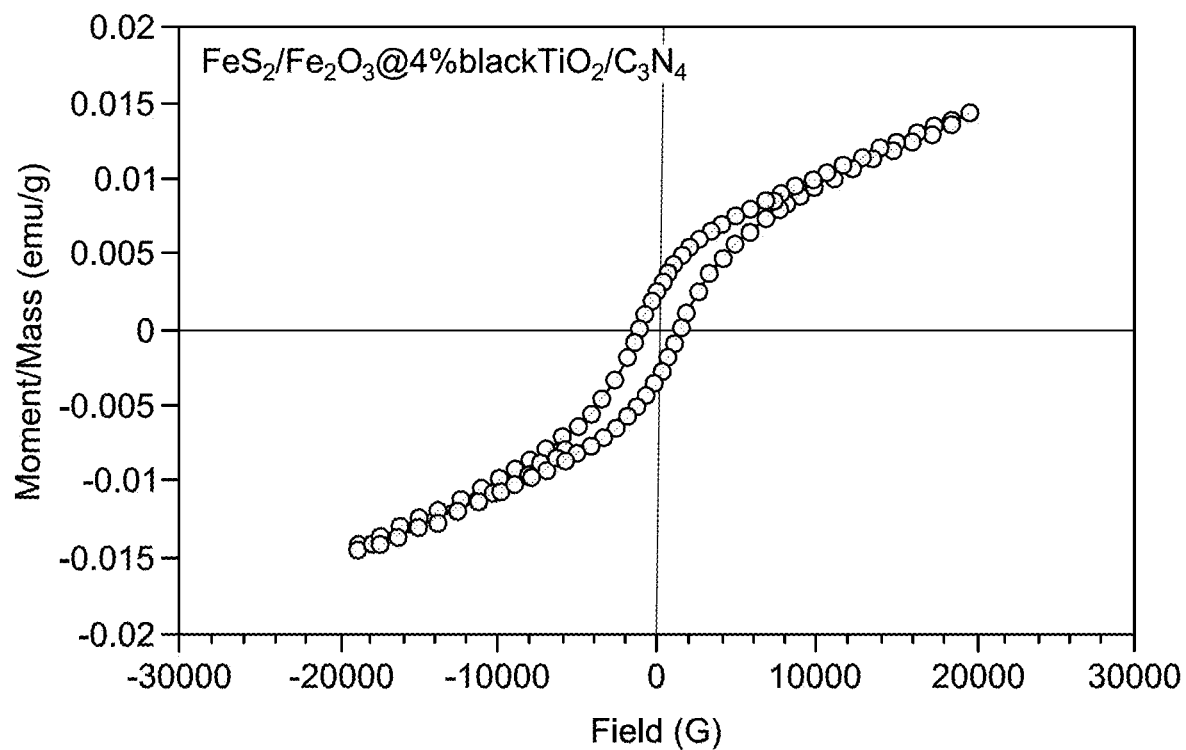
FIG. 7C shows curves for VSM magnetization of $FeS_2/Fe_2O_3@4\% blackTiO_2/C_3N_4$ catalysts measured at room temperature, according to certain embodiments.
Figure 7D:
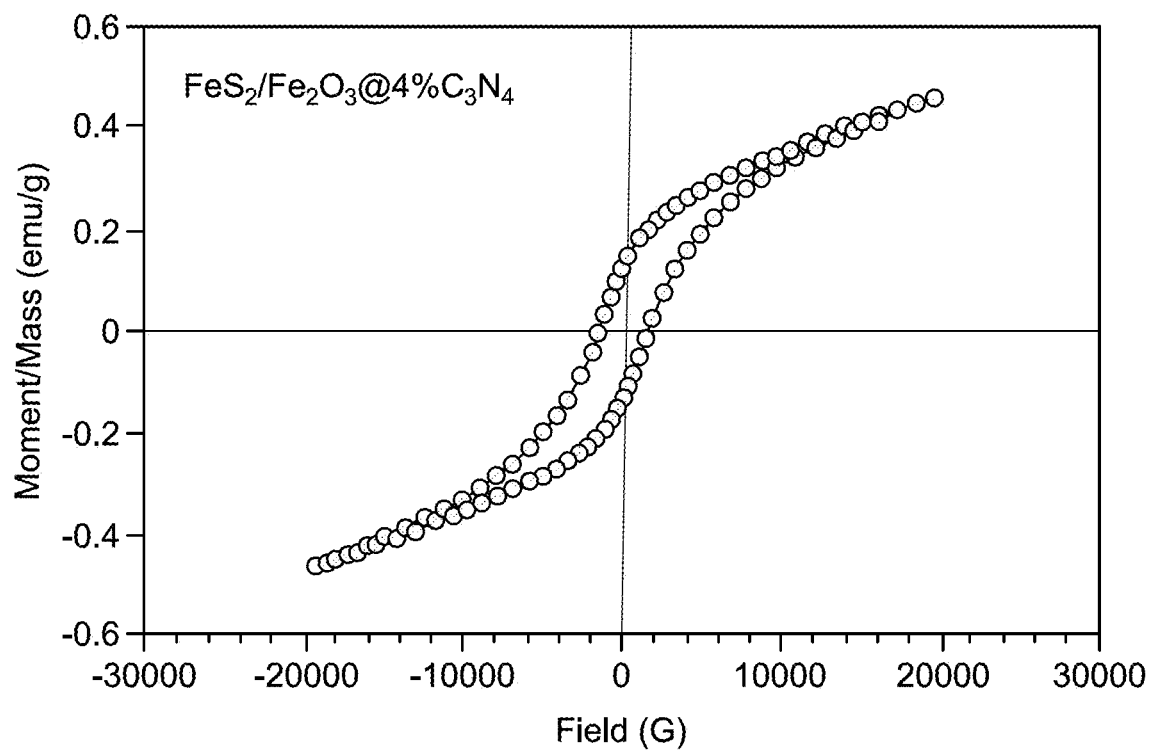
FIG. 7D shows curves for VSM magnetization of $FeS_2/Fe_2O_3@4\% C_3N_4$ catalysts measured at room temperature, according to certain embodiments.
Figure 7E:
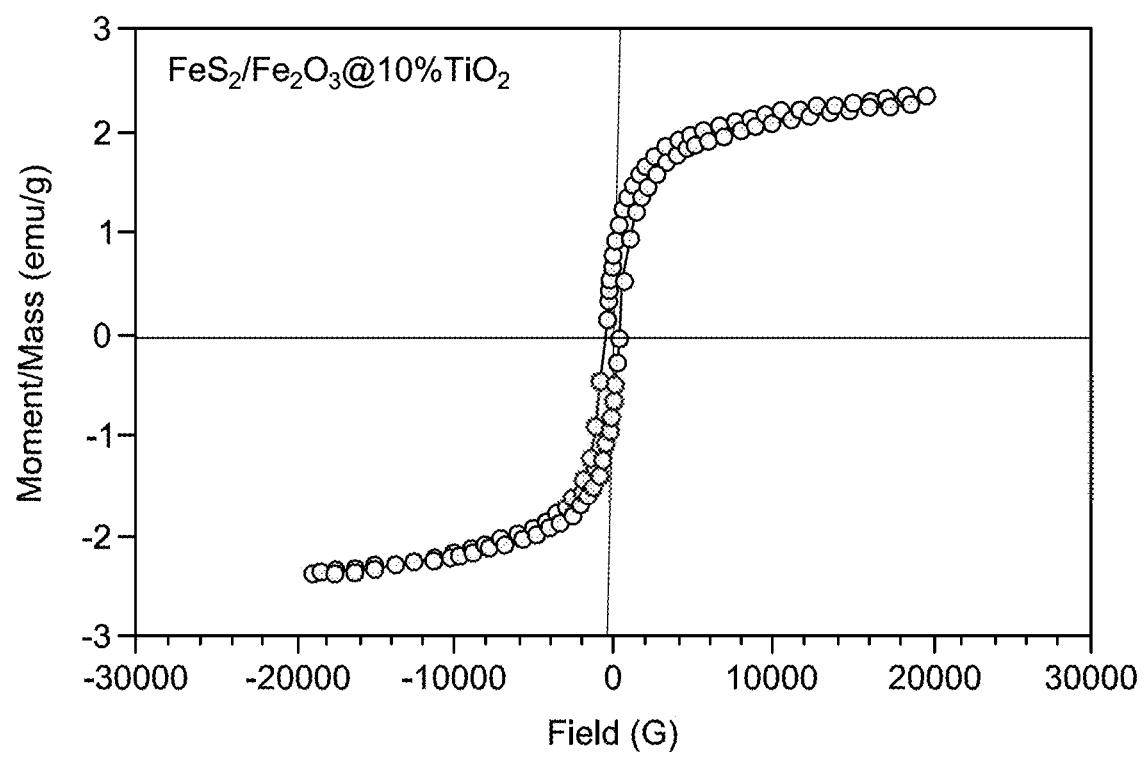
FIG. 7E shows curves for VSM magnetization of $FeS_2/Fe_2O_3@10\% TiO_2$ catalysts measured at room temperature, according to certain embodiments.

FIGS. 6A-6R displays the results of the XPS investigation of the $FeS_2/FeO@4\%$ $TiO_2$, $FeS_2/FeO@10\%$ $TiO_2$, $FeS_2/FeO@4\%$ $C_3N_4$, and $FeS_2/FeO@4\%$ $TiO_2$ $b-C_3N_4$ nanocomposites. The first two nanocomposites (FIGS. 6A-6H) include peaks for S2p, Ti2p, Fe2p, and O1s as main elements in their narrow scan spectra, whereas the latter (FIGS. 6I-6R) also have peaks for C1s and N1s. Two peaks are visible at the binding energy margin of 162.0-162.51 eV and 163.0-163.5 eV in the high-resolution S2p spectra (FIG. 6A-6H), which correspond to S 2p3/2 and S 2p1/2 of the sulfur binding energy in FeS. When contrasted to $4TiO_2$, the binding energy shifted compared to the nanocomposite containing $10TiO_2$. As demonstrated in all spectra, there is a similar progression of the $SO_4^{2-}$ peaks defined at binding energies between 168 eV obtained for $4TiO_2$ and 168.7 eV obtained for $10TiO_2$. Since Ti has a lower electronegativity than Fe, altering its local chemical surroundings will cause the quantity of electrons to fall and the energy of binding to boost around the Ti element. A similar outcome, but with a shift to a lower binding energy relative to the $TiO_2b-C_3N_4$ nanocomposite, was also observed. Moreover, a peak at a binding energy of 169.25 eV that was linked to the exposure of the C—S—C moieties was shown by the nanocomposite that contained $C_3N_4$ (FIGS. 6I-6R). Two unique peaks at 710.73 and 724.20 eV.(FIGS. 6A-6R) were also observed in the high-resolution XPS spectrum of Fe 2p. These peaks correspond to Fe 2p2/3 and $2p_{1/2}$ with satellite lines. The $Fe^{3+}$ of $\alpha$-$Fe_2O_3$ properties are in line with the spectrum shown in previous work with minor shifts towards higher energy for the $10TiO_2$ nanocomposite [Lemke, A. J., et. al., J. Power Sources, 2014, 256, 319-323, incorporated herein by reference in its entirety]. The Fe(II)S peak is also observed at a binding energy of 712.93 eV in the $4TiO_2$-containing nanocomposite, having an intensity of 85% of that of $Fe^{3+}$ moieties. In the $10TiO_2$ nanocomposites the Fe(II)S peak had an intensity of 93% of $Fe^{3+}$. In the spectrum of Ti 2p (FIGS. 6A-6R), the Ti 2p3/2 and Ti $2p_{1/2}$ peaks were located at binding energies of 458.0 eV (for $4TiO_2$), 458.7 eV (for $10TiO_2$), and 464.65-465 eV, respectively, which is in agreement with the value of $Ti^{4+}$ in the $TiO_2$ lattice. $Ti^{3+}$ in $Ti_2O_3$ is also represented by the peak $Ti2p_{1/2}$ at binding energy 464.4 (465) eV. This indicates that $TiO_2$ and $Ti_2O_3$ are generated simultaneously. Further, the $Ti^{3+}$ proportion was 19% for $10TiO_2$ compared to 5% on the 4TiO$_2$ nanocomposite. The expansion of the Ti$^{3+}$ peak's area indicates that either a significant amount of Ti$_2$O$_3$ is created or that, following doping, a hybrid oxide structure containing Fe and the oxidation state Ti$^{3+}$ is created. The decreasing area of Ti$^{4+}$ indicates that there is less TiO$_2$ in the sample, which is likely due to the substitution of transition metal ions forming a Ti—O—Fe bond in the TiO$_2$ lattice. An overlap of the three-dimensional orbitals of the Ti and Fe atoms is also indicated by the shift seen in peak positions.

As illustrated in FIGS. 6A-6R, the binding energy peaks at 531.0 eV observed in the O1s core level spectra are the result of bounded hydroxyl groups in the nanocomposites. The peak at 530.00 eV is attributed to metal-bonding within the two oxides. The C$_3$N$_4$ nanocomposite exhibited a trend towards lower binding energies, wherein an increase in the concentration of the latter peak prompted the participation of Fe species. The 10TiO$_2$ nanocomposite has the second-highest concentration of OH groups, next to the 4TiO$_2$ nanocomposite. The N1s spectra of C$_3$N$_4$ and TiO$_2$b-C$_3$N$_4$ nanocomposite samples (FIGS. 6I-6R) consist of two main components at 400.0-401.37 eV, and 398.0-399.89 eV correspond to N—O and C=N, respectively, confirming the incorporation of carbon nitride. This peak shifts to higher energy for both components in the TiO$_2$b-C$_3$N$_4$ nanocomposite, comparatively. The C1s spectra in the latter nanocomposites are deconvoluted into three peaks at 284.0-284.48 eV, attributable to C—C/C—H bonds; 286.14-286.17 eV, due to the contribution of C—N; and the third component at 287.9-288 eV, identified as sp$^{2-}$ bonded carbon in the C=O group.

Example 10. Magnetic Characterization

The magnetic properties of the investigated nanophotocatalysts are shown in FIG. 7 and Table 1. All the nanocomposites have multi-domain structures since their M$_r$/M$_s$≤0.5. The FeS$_2$/FeO@4TiO$_2$b-C$_3$N$_4$, however had a higher M$_r$/M$_s$ value of 1.754, indicating it exists as a single-magnetic domain and is highly anisotropic in nature. This may be associated with an increase in the nanocomposite's particle size, which reached 230 nm with a low distribution and significantly impacted the magnetic characteristics. The nanocomposites including C$_3$N$_4$, 4TiO$_2$b-C$_3$N$_4$, and 4TiO$_2$ exhibited the greatest H$_e$ values, indicating that they maintained significant portions of the saturation field upon removal of the magnetic field. This was further demonstrated by the broadening of the hysteresis in their respective curves. On the other hand, the FeS$_2$/FeO@10TiO$_2$ nanocomposites exhibited relatively small hysteresis loops, which is indicative of their soft magnetic character and their ability to facilitate electrical transmission as well as great permeability. The 10TiO$_2$ nanocomposite had the largest Ti—Fe exchange when compared to the 4TiO$_2$ nanocomposite, with the 10TiO$_2$ nanocomposite's M$_s$ being increased more than the 4TiO$_2$ nanocomposite's. This may indicate that the 10TiO$_2$ nanocomposite has an upwardly parallel spin orientation that even surpasses that of the FeS$_2$/FeO combination. The 10TiO$_2$ nanocomposite had the highest residual magnetization. This may indicate substitution of Fe for Ti. These results indicate that the nanocomposite has sufficient magnetic capabilities to be readily separated from the solution.

TABLE 1

The magnetic properties of different photocatalysts obtained by vibrating sample magnetometry (VSM).

| Composite Name | HC (±0.05 G) | MR (±0.05 emu/g) | MS (±0.05 emu/g) | MR/Ms |
|---|---|---|---|---|
| FeS$_2$/FeO | 387 | 0.299 | 1.729 | 0.173 |
| FeS$_2$/FeO@ 10TiO$_2$ | 406.10 | 0.577 | 2.33 | 0.248 |
| FeS$_2$/FeO@4TiO$_2$ | 1070 | 88.46 × 10$^{-3}$ | 0.452 | 0.0195 |
| FeS$_2$/FeO@4TiO$_2$b-C$_3$N$_4$ | 1227.6 | 2.49 × 10$^{-3}$ | 14.19 × 10$^{-3}$ | 1.754 |
| FeS$_2$/FeO@4C$_3$N$_4$ | 1512 | 0.1201 | 0.4632 | 0.259 |

Figure 8A:
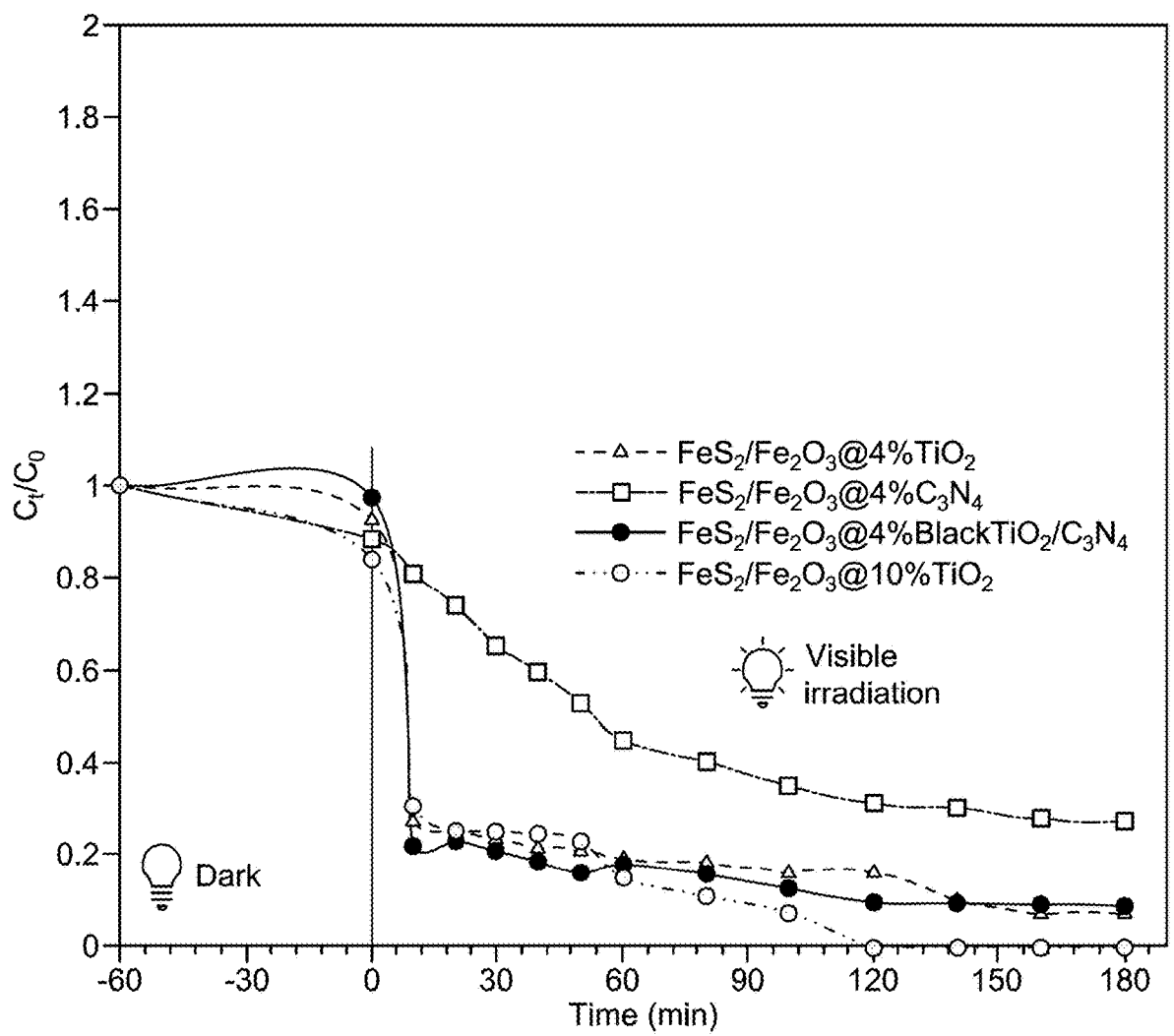
FIGS. 8A-8B show plots of $C/C_0$ for different photocatalysts vs. irradiation time for the degradation of ciprofloxacin, according to certain embodiments.
Figure 8B:
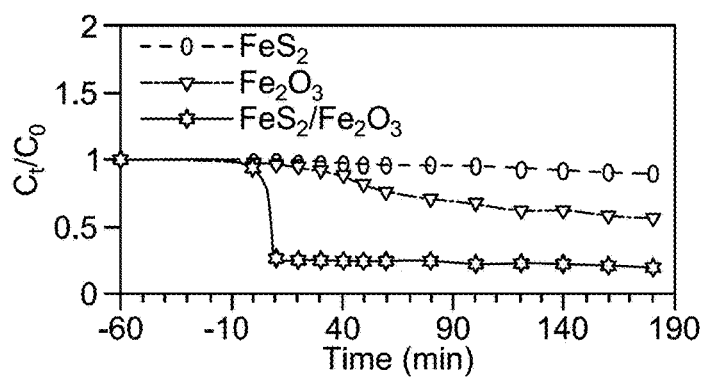
Figure 8C:
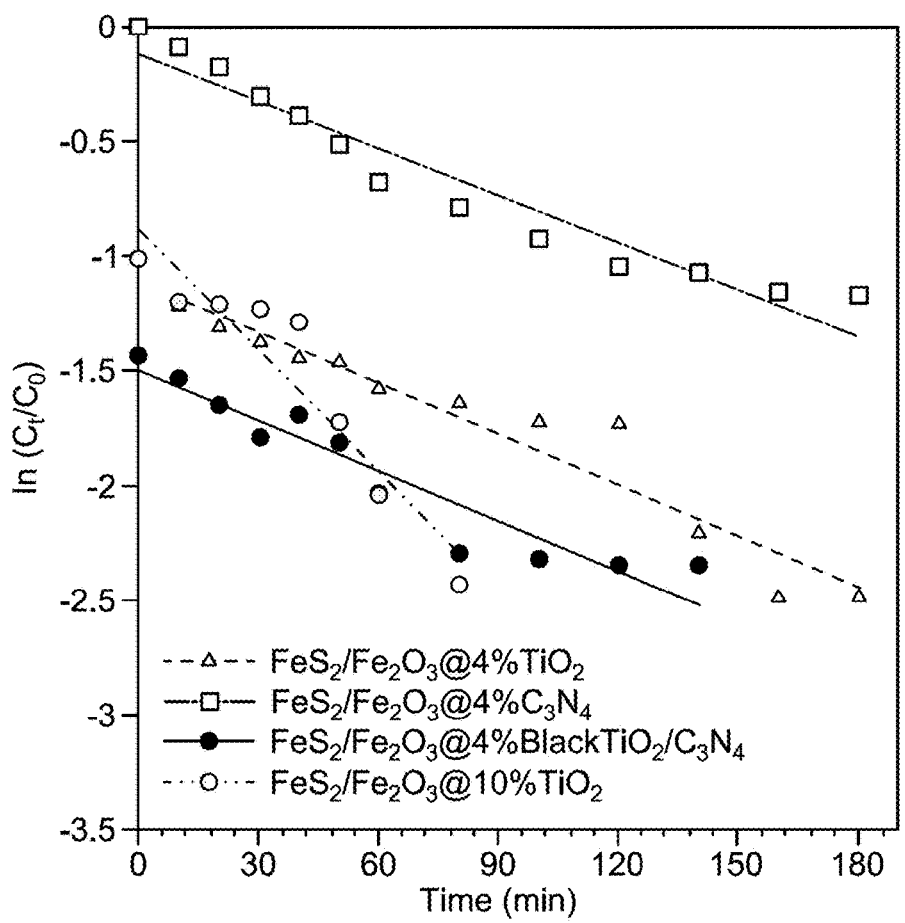
FIG. 8C shows a plot for kinetic curves $\ln C/C_0$ vs. time for degradation of ciprofloxacin, according to certain embodiments.

Example 11: Photocatalysis Approach to Ciprofloxacin Degradation Using H$_2$O$_2$ The photocatalytic degradation action of FeS$_2$/FeO supported on the 2D TiO$_2$ at both 4 and 10% loading alongside 4% C$_3$N$_4$ and 4% TiO$_2$b-C$_3$N$_4$ towards ciprofloxacin (20 ppm) using H$_2$O$_2$ (1.7×10$^{-4}$ M) as an oxidizing agent is shown in FIG. 8A. The reaction kinetics curves are shown in FIG. 8C. Under the same testing and tracing settings, individual FeS$_2$ and FeO as well as their nanocomposites (FeS$_2$/FeO) were tested for comparison (FIG. 8B). The latter catalysts show, respectively, degradation rates of 10%, 40%, and 70%. The three component systems FeS$_2$/FeO@4Ti, FeS$_2$/FeO@10Ti, FeS$_2$/FeO@4C$_3$N$_4$, and FeS$_2$/FeO@4TiO$_2$b-C$_3$N$_4$ indicate a dark (without illumination) degradation amount in a range of 5% for FeS$_2$/FeO@TiO$_2$b-C$_3$N$_4$ to 18% for FeS$_2$/FeO@10TiO$_2$. With illumination, the latter showed the best photocatalytic performances, showing complete degradation (100% removal) in 120 min with a rate constant of 17.6×10$^{-3}$, outperforming the other catalysts (FeS$_2$/FeO@4TiO$_2$ and FeS$_2$/FeO@4bTi-C$_3$N$_4$), which approach 90% removal until 180 min, apart from FeS$_2$/FeO@C$_3$N$_4$, which shows only 70% removal. This demonstrates how TiO$_{2x}$ and Fe ions work in conjunction to increase the production of more active radical species and promote the breakdown of CIP. According to first-order kinetics calculations, the rate constant of the superior photocatalytic sample FeS$_2$/FeO@10TiO$_2$ is 2.3 to 2.5 times larger compared to the other photocatalysts, as shown in Table 2. The latter catalyst's strong photocatalytic activity reflects both the synergism between all of the components and how well it activates H$_2$O$_2$. A significant amount of exposed Ti$^{3+}$/Ti$^{4+}$ sites and sulfur vacancies are produced when FeS$_2$/FeO nanoparticles are deposited on the surface of 2D TiO$_2$ nanosheets, as evidenced by the XPS data. These factors, along with accelerated Fe$^{3+}$/Fe$^{2+}$ cycling and quick electron migration, all contribute to the increased photodegradation speed. Furthermore, under acidic circumstances (pH 3.5), the nanocomposite catalyst performs optimally, overcoming the difficulties associated with traditional Fenton reactions. Spectrophotometric tracing investigations were carried out to determine whether the reaction mixture contains any leached metal. As a result, it appears that no iron may be found at that pH of the solution at least in the reaction period, indicating the chemical cohesiveness and connection of the nanocomposite components.

Figure 8D:
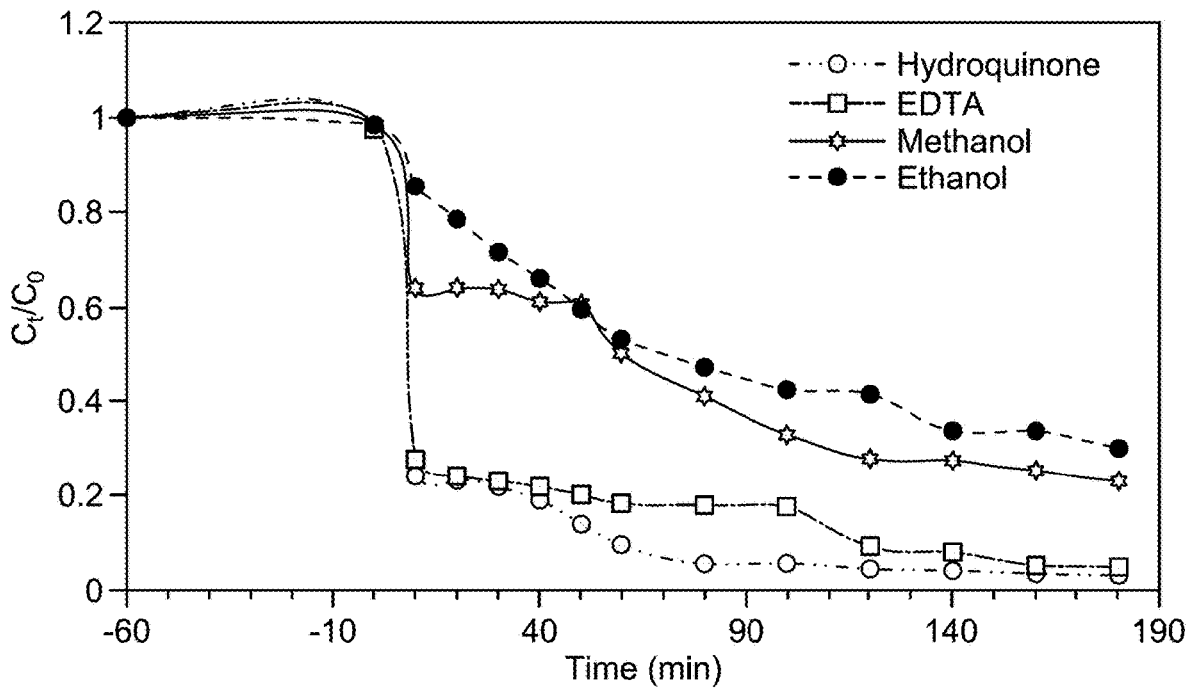
FIG. 8D shows the impact of various scavengers on the photodegradation of ciprofloxacin using the $FeS_2/Fe_2O_3@10\% TiO_2$ catalyst, according to certain embodiments.

A scavenging study (FIG. 8D) was performed to the best FeS$_2$/FeO@10TiO$_2$ photocatalyst to identify the primary reactive radical forms that were present during the H$_2$O$_2$—CIP degradation. The experiments performed in the study used methanol (a scavenger for •OH radicals), hydroquinone (a scavenger for •O$_2^-$ radicals), and EDTA (a scavenger for holes). Following a 180-minute reaction in a system without inhibitors, the degradation efficiency of CIP was 100%.

However, with the addition of methanol and ethanol, respectively, the efficiency was reduced to 37.3% and 29.5%. This result indicates that the •OH radical is involved in the degradation mechanism and that ethanol is a superior scavenger compared to methanol. Thus, it can be concluded that in the $FeS_2/FeO@10TiO_2$ reaction system, •OH radicals are involved and are accountable for the degradation of CIP. Since $H_2O_2$ consumption can result in the generation of •OH, it has a significant impact on the effectiveness of the pollutant degradation. However, both $h^+$ and $•O_2^-$ radicals share very little in the CIP oxidation. The latter moiety can be produced via the pathway shown in formula 4.

$$h^+ + H_2O_2 \rightarrow O_2^{•-} + 2H^+ \quad (4)$$

Figure 8E:
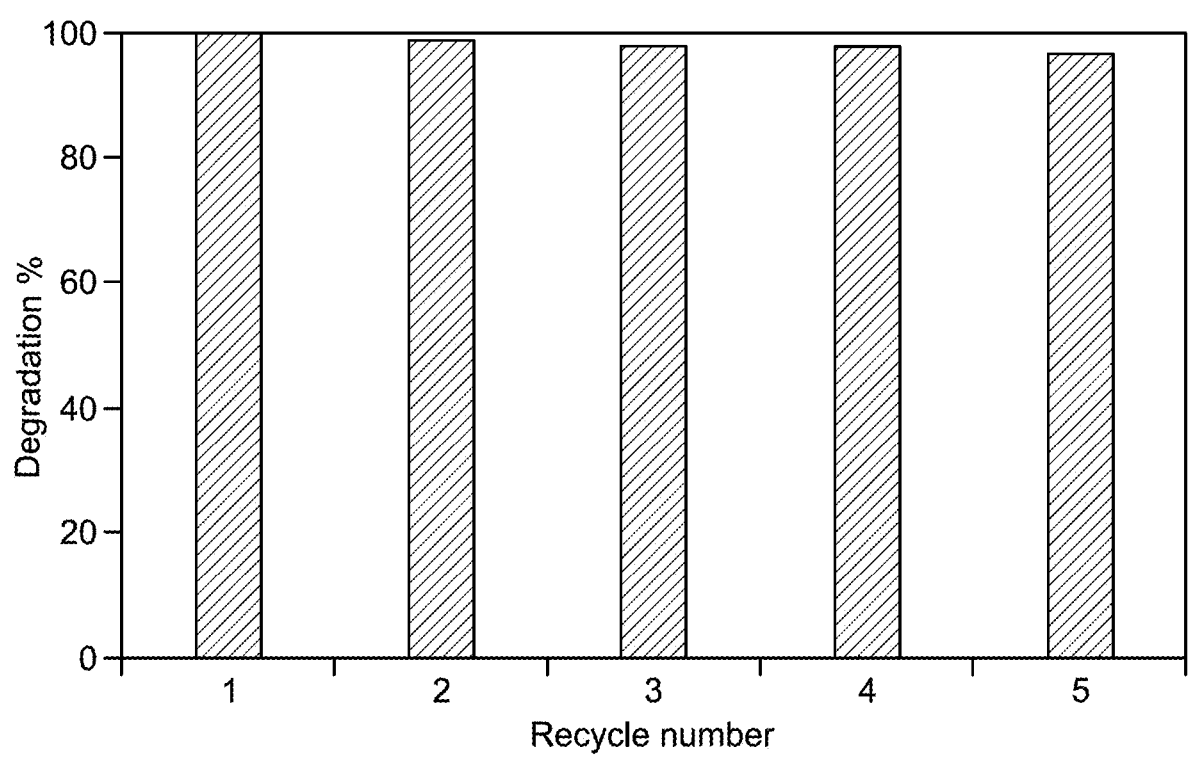
FIG. 8E shows a bar chart of recyclability at reaction condition of 100 ml of (20 mg/1) ciprofloxacin, $1.7 \times 10^{-4}$ M $H_2O_2$, 0.1 g catalyst, pH 3.5, and at room temperature, according to certain embodiments.

After 5 consecutive runs, the recyclability of the photocatalyst $FeS_2/FeO@10TiO_2$ was assessed and found to be extremely stable, reaching 98% (FIG. 8E).

TABLE 2

The kinetic data of all the synthesized photocatalysts in the presence of $H_2O_2$

| Sample | k × $10^{-3}$ ($min^{-1}$) | $R^2$ |
|---|---|---|
| $FeS_2/FeO@4\%\ TiO_2$ | 7.5 | 0.9334 |
| $FeS_2/FeO@4\%\ C_3N_4$ | 6.9 | 0.9384 |
| $FeS_2/FeO@4\%\ TiO_2\ b/C_3N_4$ | 7.2 | 0.9262 |
| $FeS_2/FeO@10\%\ TiO_2$ | 17.6 | 0.911 |

Figure 9A:
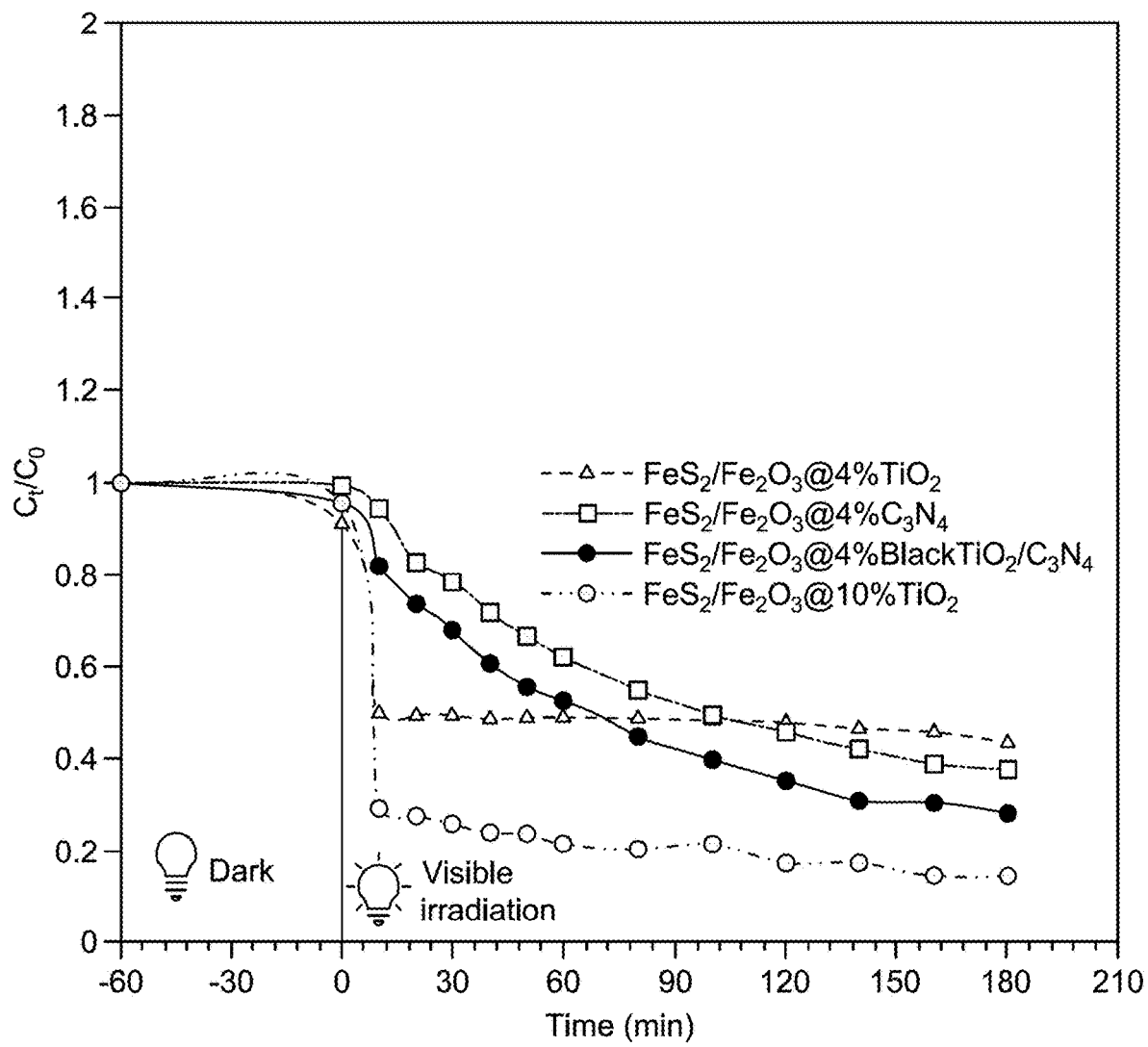
FIGS. 9A-9B show plots of $C/C_0$ versus irradiation time of photodegradation of ciprofloxacin with the prepared photocatalysts ($FeS_2/Fe_2O_3@4\% TiO_2$, $FeS_2/Fe_2O_3@4\% C_3N_4$, $FeS_2/Fe_2O_3@4\% TiO_2b/C_3N_4$ and $FeS_2/Fe_2O_3@10\% TiO_2$) under visible light illumination in comparison with $FeS_2$, $FeO$ and $FeS_2/FeO$ catalysts, according to certain embodiments.
Figure 9B:
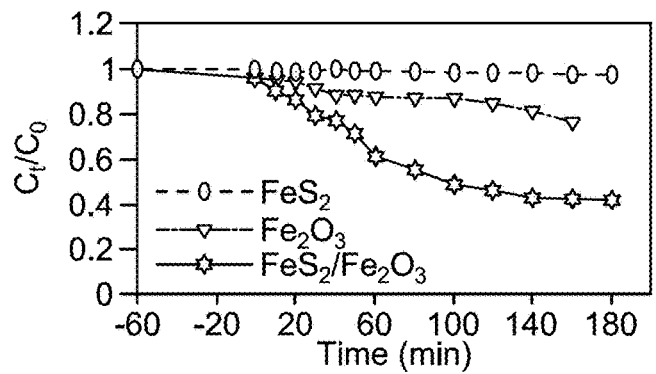
Figure 9C:
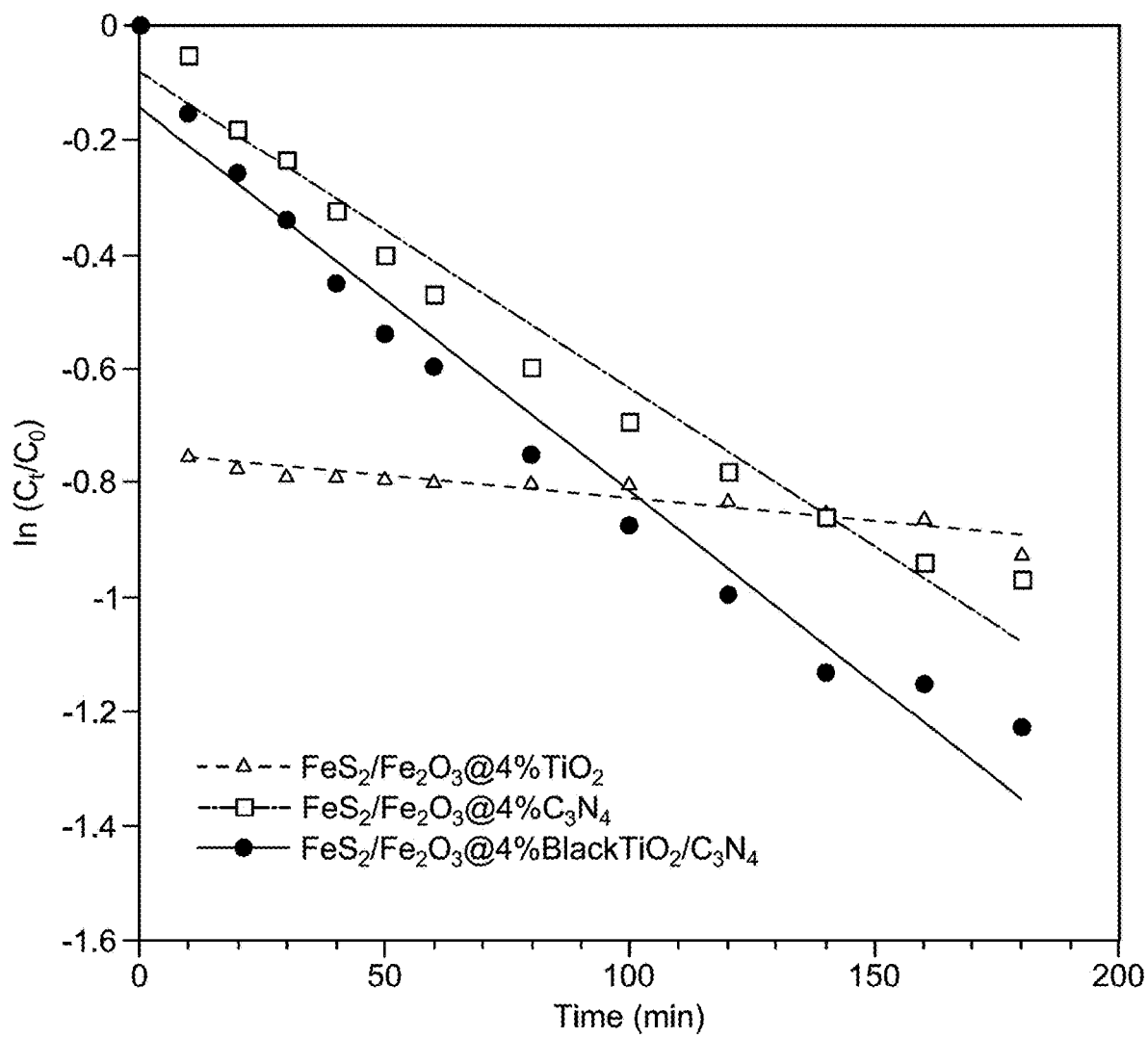
FIG. 9C shows plots of kinetics curves $\ln C/C_0$ vs. time for various photocatalysts, according to certain embodiments.
Figure 9D:
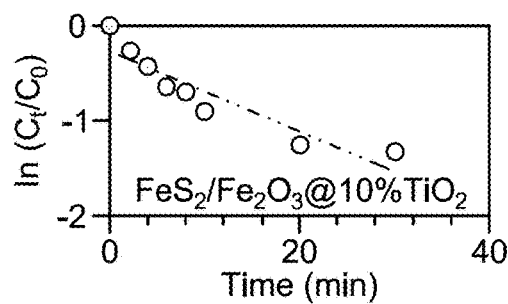
FIG. 9D is a plot showing the kinetic curve $\ln C/C_0$ vs. time for $FeS_2/Fe_2O_3@10\% TiO_2$.
Figure 9E:
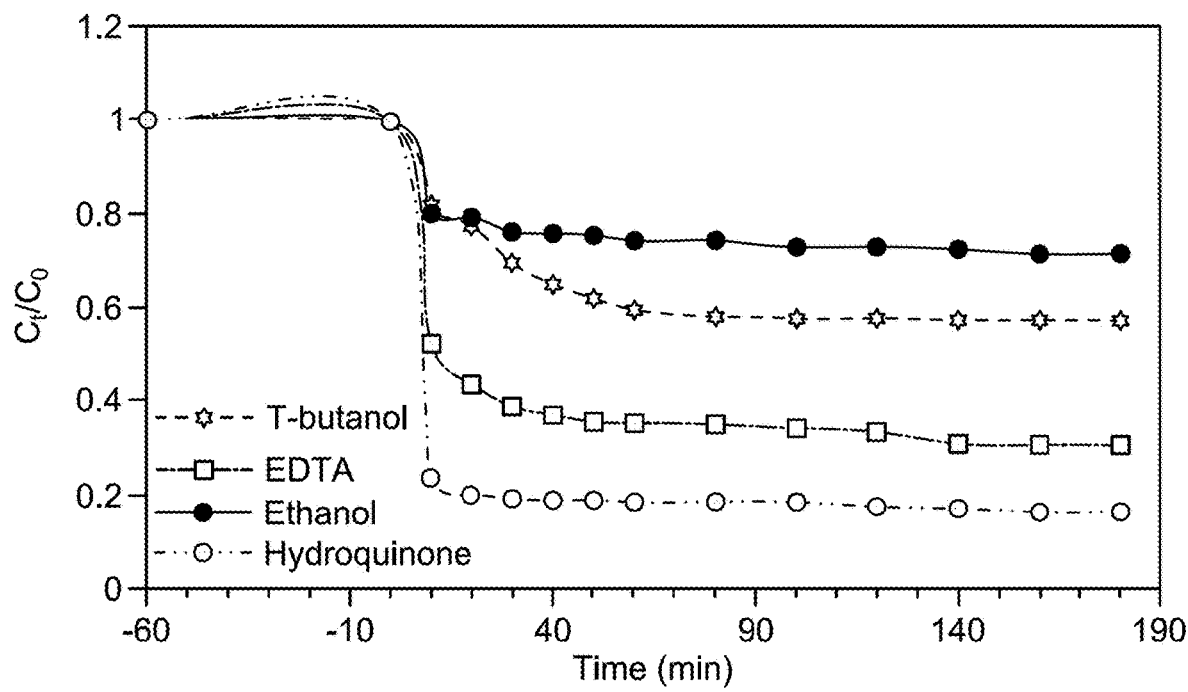
FIG. 9E is a plot showing an effect of different scavengers on the photodegradation of Ciprofloxacin using $FeS_2/Fe_2O_3$@10% $TiO_2$ catalyst, according to certain embodiments.
Figure 9F:
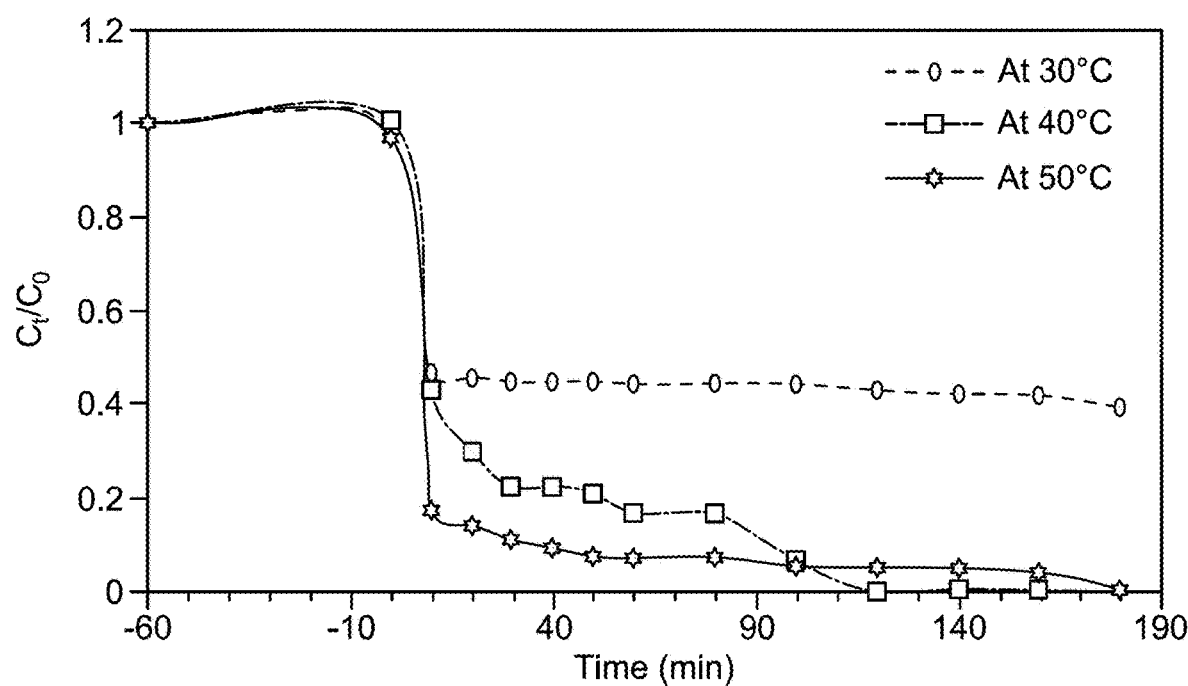
FIG. 9F is a plot showing an effect of temperature on the photocatalytic activity of $FeS_2/Fe_2O_3$@4% $TiO_2$, according to certain embodiments.

Example 12: Ciprofloxacin Photocatalytic Degradation with Potassium Persulfate The photocatalytic performance of $FeS_2/FeO$ doped 2D of $C_3N_4$, $TiO_2$ and $TiO_2b-C_3N_4$ at the 4% loading in comparison of 10% $2DTiO_2$ toward Ciprofloxacin (20 ppm) degradation is shown in FIG. 9A with comparative FeS, FeO, and nanocomposites $FeS_2/FeO$ shown in FIG. 9B. The corresponding kinetics curves are shown in FIGS. 9C, 9D, 9F, and 9G. This reaction, that was carried out at pH 3.5 assisted by $K_2S_2O_8$ as an oxidant, indicates that $FeS_2/FeO@10\%\ TiO_2$ presented almost no degradation in the dark showed the best degradation behavior (90%) after 180 min reaction followed in sequence by $FeS_2/FeO@4\%\ TiO_2b/C_3N_4$ (70%)>$FeS_2/FeO@4\%\ C_3N_4$ (60%)>$FeS_2/FeO@4\%\ TiO_2$ (55%). The CIP degradation efficiency in pure PPS under the same experimental conditions was 12.4% within 180 minutes (not shown). The $FeS_2/FeO@10\%\ TiO_2$ photocatalyst reached 70% degradation only in 10 minutes and approaches the rest (20%) in 180 min. The kinetic curves shown in Table 3 and in FIGS. 9C-9D indicate pseudo-first-order kinetics with $R^2$ close to 1 with rate constant (k) values in the order: $FeS_2/FeO@10\%$ Ti ($12.1 \times 10^{-3}$ min-1)>$FeS_2/FeO@4\%$ $TiO_2$black/$C_3N_4$ ($6.7 \times 10^{-3}\ min^{-1}$)>($FeS_2/FeO@4\%\ C_3N_4$ ($5.5 \times 10^{-3}\ min^{-1}$)>($FeS_2/FeO$)$@4\%\ TiO_2$ ($0.8 \times 10^{-3}\ min^{-1}$). FIGS. 9C-9D show that the individual catalysts have relatively modest activity levels of 3% and 20% for $FeS_2$ and FeO, respectively. However, under the same conditions, the binary photocatalyst show 59% elimination, even exceeding that containing 4% $TiO_2$. The activation ability of 10% $TiO_2$ for PPS was found to be greater than that of other nanocomposites. This is attributed to enhanced active sites and electron transfer, as shown in FIGS. 9A-9D. A scavenger investigation was conducted for the best photocatalyst to track the impact of the active radicals generated during potassium persulfate activation upon the degradation of ciprofloxacin (FIG. 9E). Through this analysis, it was found that the most important active species were in the order $SO_4^{•-} > •OH > h^+$, where $•O_2^-$ did not contribute to the activation of the pollutant degradation.

Figure 9G:
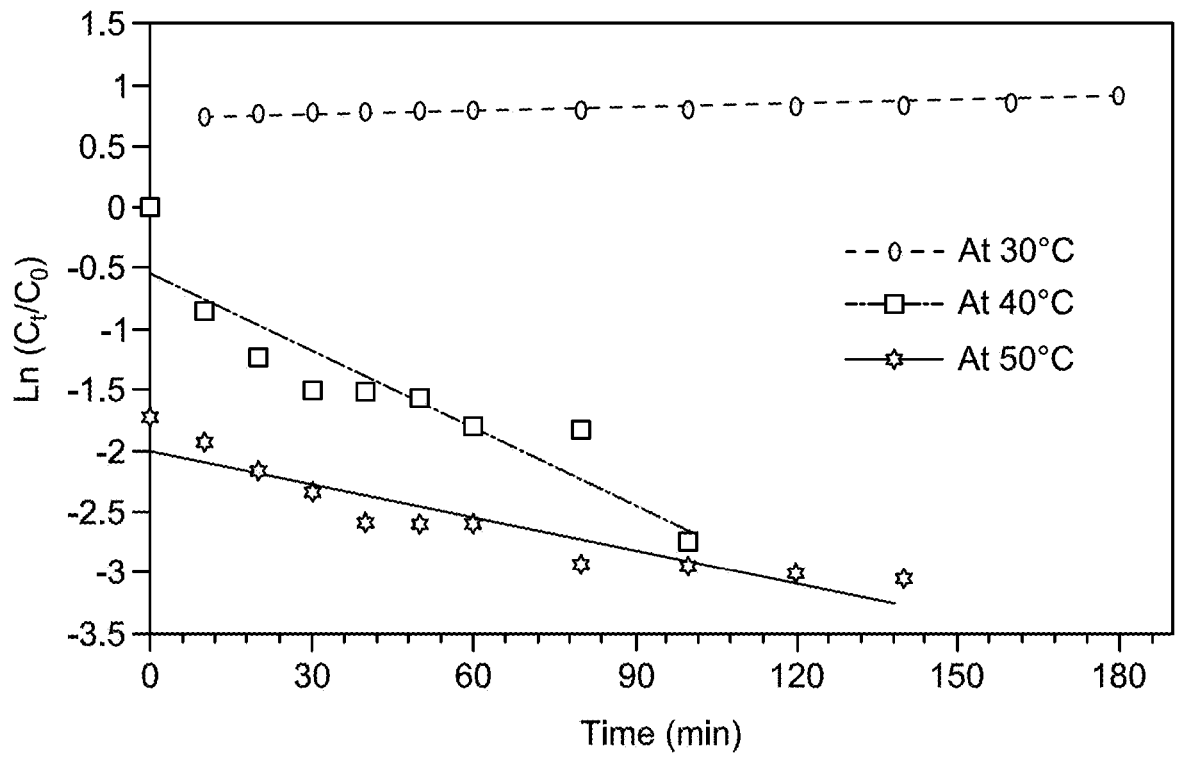
FIG. 9G is a plot showing kinetic curves $\ln C/C_0$ vs. time of $FeS_2/Fe_2O_3$@4% $TiO_2$, according to certain embodiments.

As temperature rises, $S_2O_8$ and the $FeS_2/FeO@4\%\ TiO_2$ catalyst react more quickly, which speeds up the production of oxidizing species like sulfate and hydroxyl free radicals, which are effective at destroying the pharmaceutical. The photocatalytic efficiency increased when the reaction temperatures were raised from 30 to 40° C. because the higher temperatures enhanced the mobility of charge carriers and interface charge transport. As the temperature was raised to 50° C. (FIG. 9F), the activity decreased as the rate of recombination between electrons and holes rose. As a result, from 30 to 40° C., the rate constant jumped by a magnitude of 26 times from $0.8 \times 10^{-3}$ to $21 \times 10^{-3}\ min^{-1}$, but at 50° C., it reduced to $9.1 \times 10^{-3}\ min^{-1}$ (FIG. 9G).

TABLE 3

The kinetic data of all the synthesized photocatalysts in presence of persulfate

| Sample | k × $10^{-3}$ ($min^{-1}$) | $R^2$ |
|---|---|---|
| $(FeS_2/Fe_2O_3)@4\%\ TiO_2$ | 0.8 | 0.9132 |
| $(FeS_2/Fe_2O_3)@4\%\ C_3N_4$ | 5.5 | 0.9685 |
| $(FeS_2/Fe_2O_3)@4\%\ TiO_2\ b/C_3N_4$ | 6.7 | 0.9671 |
| $(FeS_2/Fe_2O_3)@10\%\ TiO_2$ | 12.1 | 0.9187 |

The energy consumption in kilowatt hours needed for CIP degradation using PPS or $H_2O_2$ is an essential factor to consider. This parameter is important from an economic standpoint because it has to do with the expenses involved throughout the reaction process. The following formula was used to determine the amount of energy consumed:

$$E_{EO} = Pel \times t \times 1000 / V \times 60 \times \log C_o/C \quad (5)$$

Here V is the amount of water (1) in the reactor; t is the duration of the irradiation period (min); $C_o$ is the original pollutant concentration; and C is the final polluting concentration. Pel is the sum of the input power (kW) both stirring and the visible light lamp. For $FeS_2/FeO@1\ TiO_2$, the computed values with $H_2O_2$ and PPS were 3.2 and 3.5 kWh $m^{-3}$ oder$^{-1}$, respectively. This demonstrates that it became more cost-effective to use $H_2O_2$ rather than PPS.

Figure 10A:
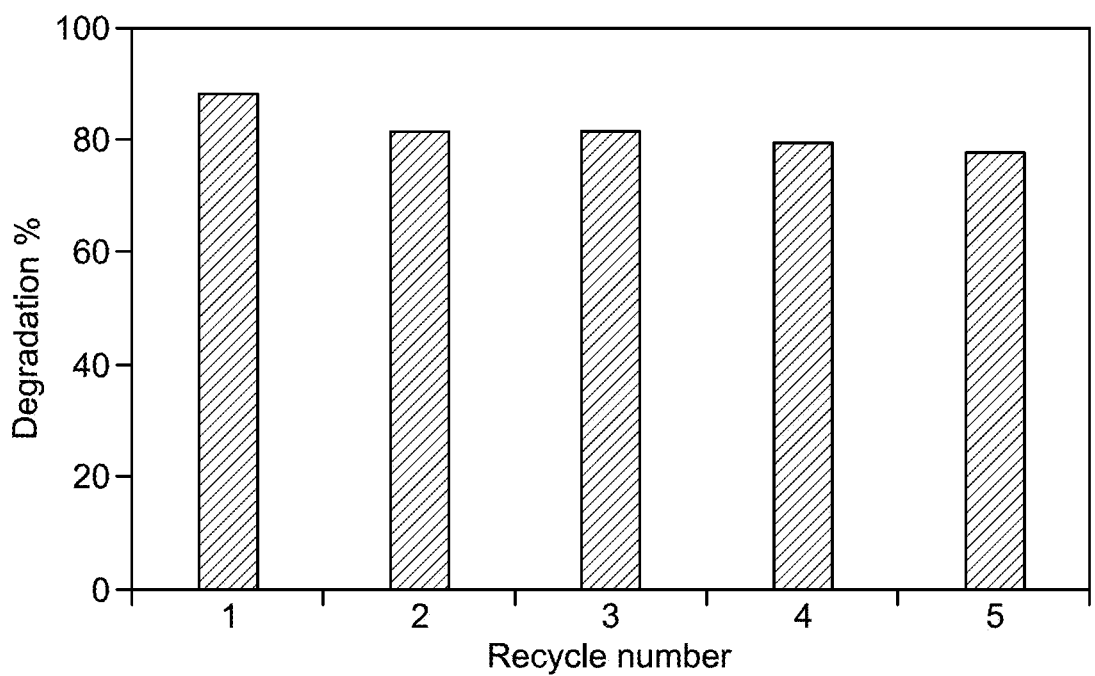
FIG. 10A is a column graph for the recyclability of the prepared photocatalyst $FeS_2/Fe_2O_3$@10% $TiO_2$ for 5 consecutive runs, having reaction conditions: 100 ml (20 mg/l) of Ciprofloxacin $1 \times 10^{-3}$ M of potassium persulfate, 0.1 g catalyst, room temperature, and pH (3.5) according to certain embodiments.

When examining possible wastewater treatment applications, the catalyst's reliability and reusability are also important to consider. To assess this, stability experiments were conducted on the $FeS_2/FeO@10TiO_2$ nanocomposite. The outcomes of these stability experiments are shown in FIG. 10A. The CIP's initial degradation efficiency was 90% with a 180 min reaction. Following five successive cycles, there was only an eight percent decrease from the starting trial.

The enhanced degradation efficiency of CIP on $FeS_2/FeO@10TiO_2$ when using $H_2O_2$ as an oxidant rather than PPS may be attributed to the nanocomposite, which exposes more active sites to activate the former oxidant and generates more efficacious radicals than the latter. Further, extra OH groups or acidic conditions may provide $H^+$ ions, which scavenge the sulphate radical and facilitate generating hydrogen sulphate, therefore influencing the degradation activity as shown in formula 6:

$$(SO_4^{•-} + H^+ + e^- \rightarrow HSO_4^-) \quad (6)$$

Figure 10B:
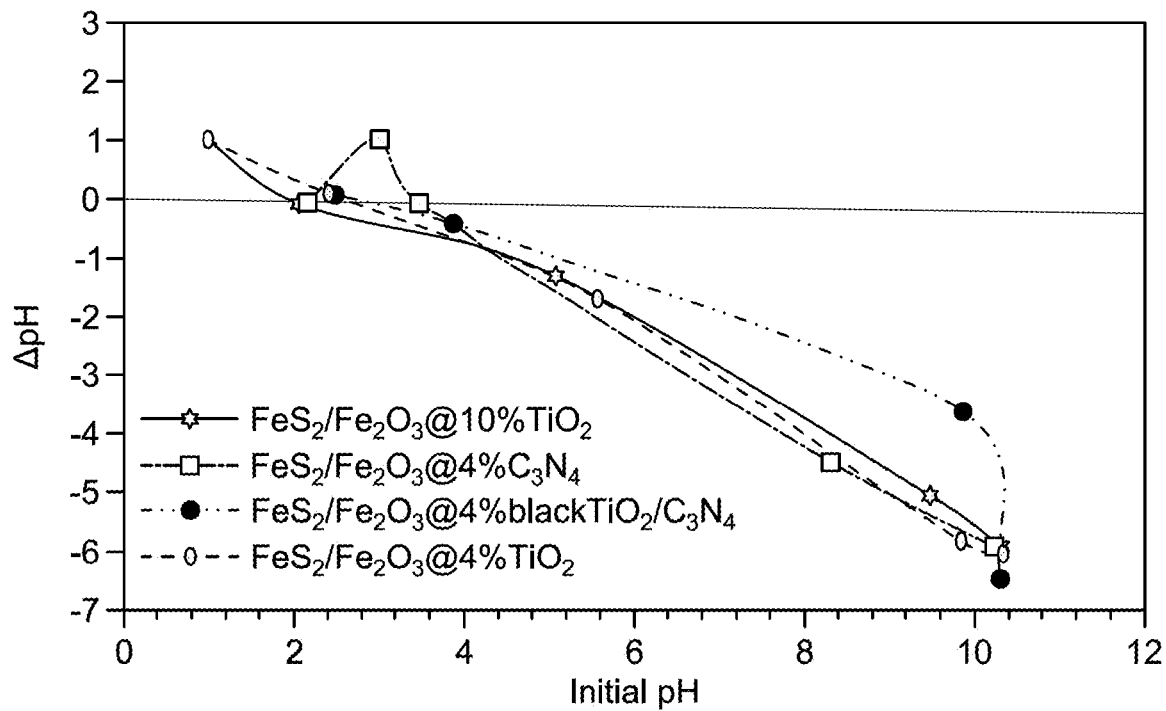
FIG. 10B shows a graph for zero-point charge (ZPC) of all the photocatalysts, according to certain embodiments.

Based on these experimental results, the impressive photoactivity observed for $FeS_2/FeO@10TiO_2$ may be attributed to several factors. First, the presence of defect $Ti^{3+}$ (19%) is higher than any of the nanocomposites, and this exposes higher active sites via, in addition, the exposure of Ti—O—Fe bonds released from Fe substitution. Both $e^-/h^+$ separation and visible light absorption are improved by this increase in the $Ti^{3+}$ ratio. The existence of a phase not observed in the binary with d spacing of 0.56 nm exhibits higher activity than that at 0.64 nm dedicated to the $TiO_2b$-$C_3N_4$ nanocomposite. Second, the percentage of $Fe^{3+}$ that constituted the highest amount in 10% $TiO_2$ presented the lowest crystallite diameter and rather advocated the lowest energy gap value (1.68 eV). It also presented the least charges recombination. Third, this nanocomposite shows one of the highest amounts of OH and sulfate groups, as well as the ability to facilitate electron transmission and permeability as deduced from the magnetic properties. The $10TiO_2$ catalyst has a larger proportion of $Fe^{2+}$ than the $4TiO_2$ catalyst, as estimated from XPS results. The impact of solution pH on CIP degradation by the $FeS_2/FeO@C_3N_4$ nanocomposite in the presence of $H_2O_2$ is shown in FIG. 10B. Within 180 minutes of radiation, there were significant variations in the amount of catalytic activity associated with a pH shift from an acidic solution of 3.5 to a basic pH of 9.5. This resulted in the degradation of 20 mg $L^{-1}$ CIP, which went from 20.8% at pH 9.5 to 65% at pH 3.5.

Using persulfate as an oxidizing agent, $FeS_2/FeO@10TiO_2$ produced a comparable result, obtaining 88% at pH 3.5 and 78% at pH 9.5 and 6.5. This illustrates how photocatalytic activity increases in acidic environments for both oxidants. Although the experiments presented here were performed in an acidic environment, the generated hydrogen ions did not inhibit the formation of free radicals. Accordingly, the measured ZPC via potentiometric titration route were 2.5 and 2.16 for $TiO_2$ and $C_3N_4$ containing photocatalysts, implying that their surfaces contain negative charges. This is likely because the solution pH is less acidic than the ZPC. Since CIP exists at least partially in cationic form (carry positive charges) up to pH 6, an electrostatic interaction may occur between the pharmaceutical CIP with the photocatalyst surface carrying negative charges. This may result in higher photocatalytic degradation at pH 3.5. On the other hand, basic conditions favour the production of the anionic CIP at a pH of 9, causing repulsion and reducing CIP adsorption on the catalyst surface, both of which may have an impact on CIP's photocatalytic degradation.

The ZPC of FeO was 8.2 and decreased to 2.5 upon the incorporation of FeS, indicating that the latter had adsorption and interaction with the former. It is probable that the highest $Fe^{2+}$ availability for $H_2O_2$ breakdown and the consequently high rate of OOH production at pH 3.5 account for the high removal effectiveness of CIP. Accordingly, the improved removal capability of the photocatalyst containing 10% $TiO_2$ are attributed to the following: (i) •OH possesses a significant potential for oxidation-reduction in acidic environments; (ii) the establishment of a significant amount of $Fe^{2+}$ in acidic environments can further enhance the efficiency of the Fenton system as shown in formula 7 below; (iii) acidic circumstances can alleviate the passivity formation of film $(Fe(OH)_3)$ on the outside surface of $TiO_2$ and decrease the removal of active sites.

$$Fe^{2+}+H_2O_2 \rightarrow Fe^{3+}+\cdot OH+OH^- \quad (7)$$

The low removal efficacy of CIP at alkaline pH levels may also be because the redox potential of •OH has been shown to decrease with rising pH and also excess $OH^-$ will react with $H_2O_2$ to generate $O_2$ as shown in formula 8 below, influencing the CIP degradation.

$$OH^-+H_2O_2 \rightarrow O_2+H_2O \quad (8)$$

Figure 10C:
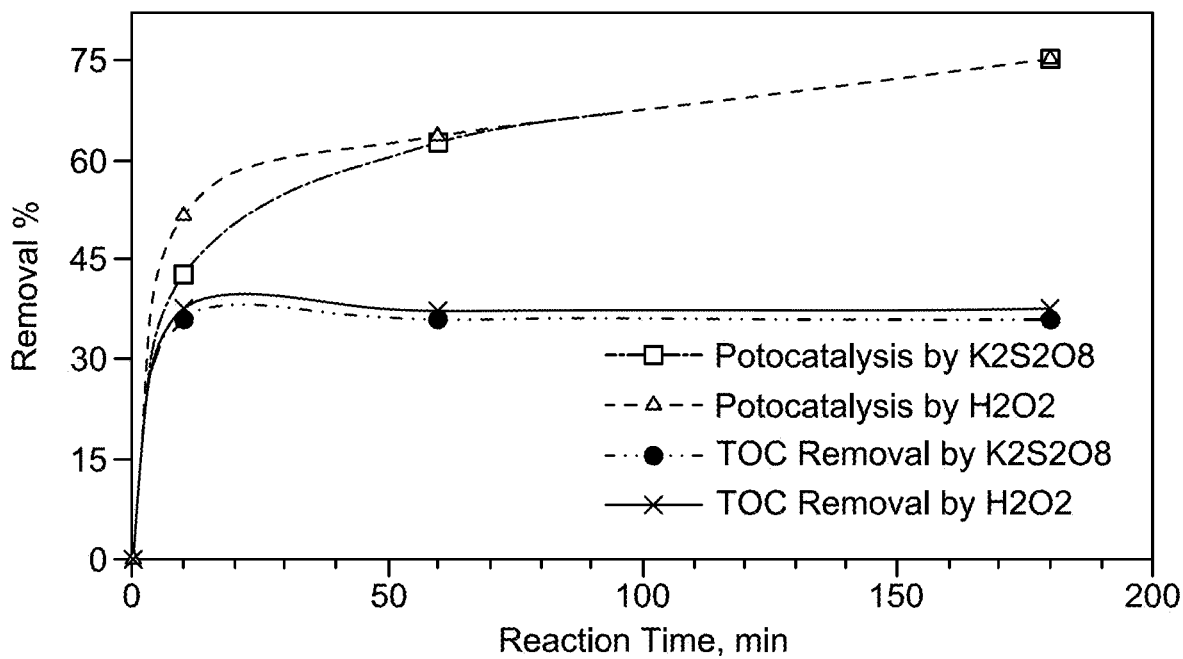
FIG. 10C shows a graph for the extent of mineralization based on the variance of total organic carbon (TOC), according to certain embodiments.

A mineralization examination was conducted, which was based on the variance of total organic carbon (TOC), in order to further investigate the photocatalytic efficiency of the $FeS_2/FeO@10TiO_2$ nanocomposite (FIG. 10C). In the presence of both oxidants and the photocatalyst, the mineralization rate for the degradation of CIP reached 74% under ideal reaction conditions. However, a 32% mineralization was achieved when the oxidants were present without the photocatalyst. The results of these experiments indicate that the CIP degradation in the presence of oxidants and photocatalyst may be caused by the photocatalyst's heterostructure, large pore opening and catalyst stability, which lead to prohibiting blocking and boosting catalytic surface activity.

As shown in Table 4, the $FeS_2/FeO@2D10TiO2$ catalyst was found to be superior in degrading CIP under visible light illumination compared to other catalysts like $TiO_2/MMT$, $CuS/Fe_2O_3/Mn_2O_3$, $CuS/BiVO_4$ (0-4), 3D $T-Fe_2O_3@ZnO$, and $g-C_3N_4/RGO/WO_3$. The CIP decontamination of the photocatalyst of the present disclosure was accomplished using either PPS or $H_2O_2$ oxidants. The latter shows the highest removal rate, which is close to 100% at a concentration of 20 ppm. This level of activity surpasses all the identified references, which were limited to concentrations of 10 ppm. Based on this relatively high CIP concentration, the photocatalyst of the present disclosure presented moderate rate constants compared to the reference catalysts. The rate constant of the photocatalyst of the present disclosure was comparable to that of the $TiO2/\gamma-Fe_2O_3/GO$ catalyst. However, the photocatalyst of the present disclosure has other distinct advantages over these catalysts. It is more magnetically recyclable, is prepared in a shorter time, was compatible with a higher CIP concentration, and was compatible with a more acidic environment.

TABLE 4

Comparison of the CIP photodegradation efficiency of the $FeS_2/FeO@2D10TiO_2$ catalyst with others in the literature.

| Catalyst | pH and type of light source | Reaction time (min), CIP conc. | Degradation efficiency | Rate constant, $min^{-1}$ and (Oxidant name) | Ref. |
|---|---|---|---|---|---|
| $TiO_2/MMT$ | 5, UV | 120, 10 ppm | 61.70% | 0.0069 ($H_2O_2$) | 1 |
| $CuS/Fe_2O_3/Mn_2O_3$ | 5.84, - - - | 120, 10 ppm | 88% | 0.10083 (PMS) | 2 |
| $CuS/BiVO_4$ (0 4 0) | - - -, 300 W Xe lamp | 90, 10 ppm | 86.7% | 0.02151 | 3 |
| 3D $\gamma-Fe_2O_3@ZnO$ | 5.8, 300 W Xe lamp | 60, 10 ppm | 92.5% | 0.0419 | 4 |
| $g-C_3N_4/RGO/WO_3$ | - - -, 500 W Xe lamp | 180, 10 ppm | 85% | | 5 |
| $TiO_2/\gamma-Fe_2O_3/GO$ | 6.3, Vis | 140, 10 ppm | 99% | 0.019 ($H_2O_2$) | 6 |

TABLE 4-continued

Comparison of the CIP photodegradation efficiency of the $FeS_2/FeO@2D10TiO_2$ catalyst with others in the literature.

| Catalyst | pH and type of light source | Reaction time (min), CIP conc. | Degradation efficiency | Rate constant, $min^{-1}$ and (Oxidant name) | Ref. |
|---|---|---|---|---|---|
| $FeS_2/FeO@2D10TiO_{2-x}$ | 3.5, Vis lamp | 120, 20 ppm | 100% 90% | 0.0176 ($H_2O_2$) 0.0121 (PPS) | This work |

References: (1) Hassani A, et. al., J Mol Catal A Chem 2015; 409:149-61; (2) Huang Y, et. al., Chem Eng J 2020; 388:124274; (3) Lai C, et. al., Chem Eng J 2019; 358:891-9; (4) Li N, et. al., Chem Eng J January 2017; 308(15):377-85; (5) Deng Y, et. al., J Hazard Mater 2018; 344:758-69; and (6) Wang F, et. al., Chem Eng J March 2020; 384(15):123381, each of which is incorporated herein by reference in its entirety.

Figure 11:
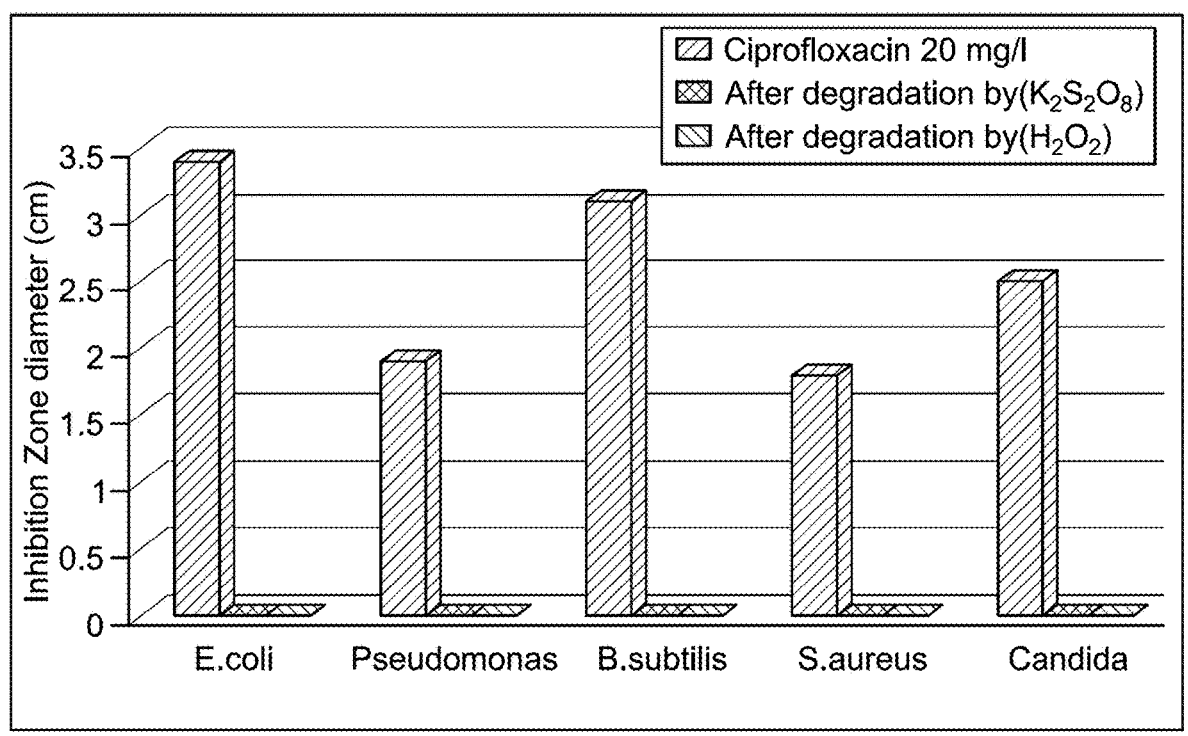
FIG. 11 illustrates a column graph for the inhibitory concentration of free ciprofloxacin and ciprofloxacin-photocatalyst ($FeS_2/FeO$@10$TiO_2$) against tested bacteria and fungi strains in the presence of different oxidants, according to certain embodiments.

The toxicology of CIP at a concentration of 20 ppm as well as when combined with the catalyst $FeS_2/FeO@10TiO_2$ exposed to light irradiation for 180 min in the presence of both oxidants was assessed for a variety of strands of bacteria and fungi, including *E. coli* and *P. aeruginosa* (gram negative), *B. subtilis* and *S. aureus* (gram positive), and *C. albicans* (fungal). It is clear from Table 5 and FIG. 11 that CIP by itself inhibits the viability of all organisms growing in various zone diameter ratios. Following the complete degradation of CIP with for both oxidants, all the microorganisms showed no growth inhibition. This finding supports the conclusion that CIP photodegradation results in benign or less hazardous chemicals.

TABLE 5

Toxicity and microbial activity

| Inhibition | Sample | E. coli | Pseudomonas | B. subtilis | S. aureus | Candida |
|---|---|---|---|---|---|---|
| Zone Diameter (Cm) | Ciprofloxacin 20 mg/l | 3.4 | 1.9 | 3.1 | 1.8 | 2.5 |
| | After degradation by $K_2S_2O_8$ | 0 | 0 | 0 | 0 | 0 |
| | After degradation by $H_2O_2$ | 0 | 0 | 0 | 0 | 0 |

Example 13: CIP Photodegradation Proposed Mechanism

Figure 12A:
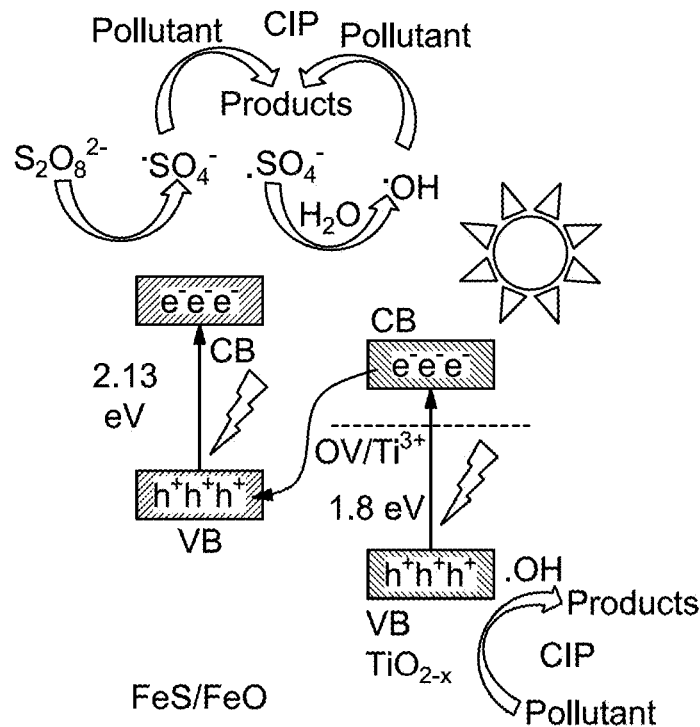
FIG. 12A schematic diagram depicting the photocatalytic mechanism for eliminating ciprofloxacin (CIP) over the $FeS_2/FeO$@10$TiO_{2-x}$ system using potassium persulfate (PPS) oxidants, according to certain embodiments.
Figure 12B:
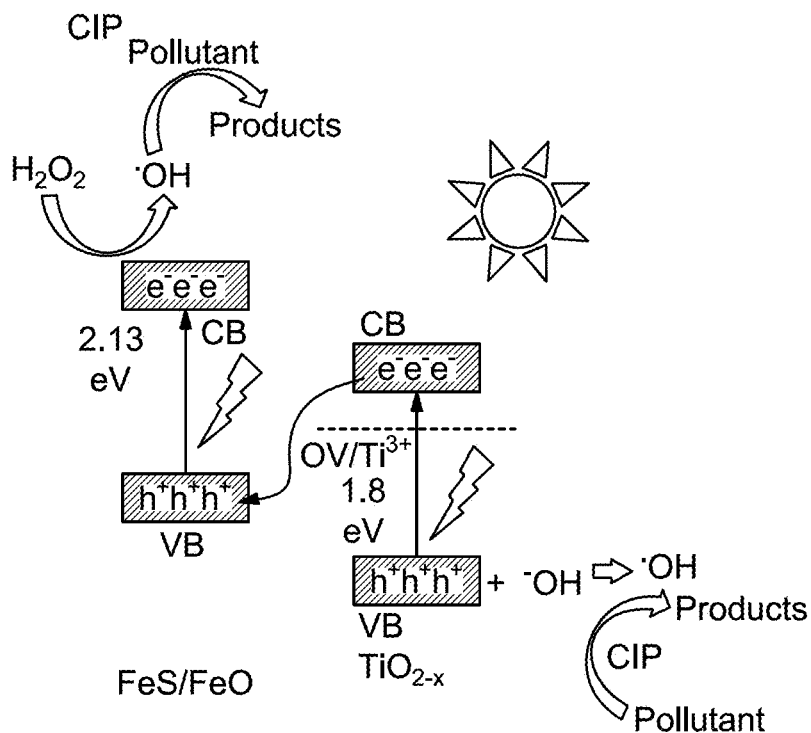
FIG. 12B schematic diagram depicting the photocatalytic mechanism for eliminating CIP over the $FeS_2/FeO$@10$TiO_{2-x}$ system using $H_2O_2$ oxidants, according to certain embodiments.

FIG. 12A-12B show depictions of processes involved in the $FeS_2/FeO@10\% TiO_{2-x}$ nanocomposite's photocatalytic potential for CIP elimination in the presence of PPS and $H_2O_2$. $TiO_{2-x}$ has CB and VB values of −2.25 and +0.15 eV, respectively as deduced from applying equations $$E_{VB} = X - E_e + 0.5 E_g \quad (9)$$

$$E_{CB} = E_{VB} - E_g \quad (10).$$

The CB and VB of $FeS_2/FeO$ are respectively equal 0.065 eV and +2.19 eV. The 10% $TiO_2$ catalyst with higher levels of lattice distortion exhibits a higher fraction of $Ti^{3+}$ defects, which were previously identified based on XPS data. This increases the nanocomposite's photocatalytic activity and improve photocurrent generation under visible light. Both $TiO_{2-x}$ and $FeS_2/FeO$ are stimulated to produce electrons and holes on their respective CB and VB when exposed to light. Once on the CB of $TiO_{2-x}$, electrons that are photoexcited move to the VB of $FeS_2/FeO$, and then the light energy that was received gets released as heat during recombination. With an energy gap of 2.13 eV, the latter nanocomposite's CB electrons may react with PPS on its surface to produce $SO_4^{•−}$ and $^•OH$ (FIG. 12A), which have strong oxidation capabilities and will oxidize the pollutant. Likewise, holes have the ability to react with specific hydroxyl groups to produce hydroxyl radicals as well. Therefore, by providing more reducing electrons in the CB of $FeS_2/FeO$ and more potent holes in the VB of $TiO_{2-x}$, the formation of Z-Scheme heterojunction within the $FeS_2/FeO@TiO_{2-x}$ nanocomposite can accelerate the segregation of photon-generated charged particles and improve the photocatalytic performance.

These experiments demonstrated that $^•OH$ and $SO_4^{•−}$ were the most active species in the process using both oxidants, according to the reactive species quenching analyses. Molecules of water cannot be directly oxidized to $^•OH$ by holes in the VB of $TiO_{2-x}$ because the potential energy of $^•OH/H_2O$ (+2.4 V) is more positive than that of $TiO_{2-x}$ (+0.15 eV). Due to the higher positive potentials than $SO_4^{2−}/SO_4^{•−}$ (2.5-3.1 V), the electrons on the CB of $FeS_2/FeO$ (0.065 V) were incapable of reducing $SO_4$ to its radical. This precludes the creation of type II mechanisms and supports a conclusion of the Z scheme. As illustrated, FIG. 12 shows how the holes created by photons in the VB of $FeS_2/FeO$ and the electrons produced by light in the CB of $TiO_{2-x}$ may recombine. In the conduction of $FeS_2/FeO$ and the valance band of $TiO_{2-x}$, this results in an abundance of holes and electrons with substantial oxidation and reduction capabilities, respectively. However, the holes in $TiO_{2-x}$'s VB remain capable of oxidize OH or water to produce •OH. Stated differently, $TiO_{2-x}$ and $FeS_2/FeO$ work together in charge creation and segregation because of their suitable band energies and remarkable contribution to the preservation of highly reactive charges. Unfortunately, it's likely that the 90% degradation in case of PPS is limited by the small number of $^•OH$ radicals that are produced by $SO_4^{•−}$. In contrast, $H_2O_2$ causes a significant quantity of $^•OH$ radicals to be produced following adsorption on the $FeS_2/FeO$ surface via the $Fe_{2+}/H_2O_2$ and $SO_4^{•−}/H_2O$ approaches (FIG. 12B). Also, $Ti^{3+}$ releases •OH by a Fenton-like reaction with $H_2O_2$ according to formula 11

$$Ti^{3+} + H_2O_2 \rightarrow Ti^{4+} + {^•OH} + OH^- \quad (11)$$

A detectable amount of $SO_4^{2−}$ has also been found on $FeS_2/FeO@10TiO_2$, as evidenced by the XPS results, which can be activated by light irradiation or transition metal ($Fe^{2+}$) activation to produce $SO_4^{•-}$ radicals that, in turn, can be tuned to $^•OH$.

The probable $^•OH$ amount produced can follow the following routes:

$$Fe^{2+} + H_2O_2 \rightarrow Fe^{3+} + 2^•OH \quad (12)$$

$$SO_4^{2-} + H_2O \rightarrow {^•OH} + SO_4^{2-} + H^+ \quad (13)$$

$$SO_4^{2-} + Fe^{2+} \rightarrow SO_4^{•-} + H_2O \rightarrow {^•OH} + SO_4^{2-} + H^+ \quad (14)$$

Figure 1D:
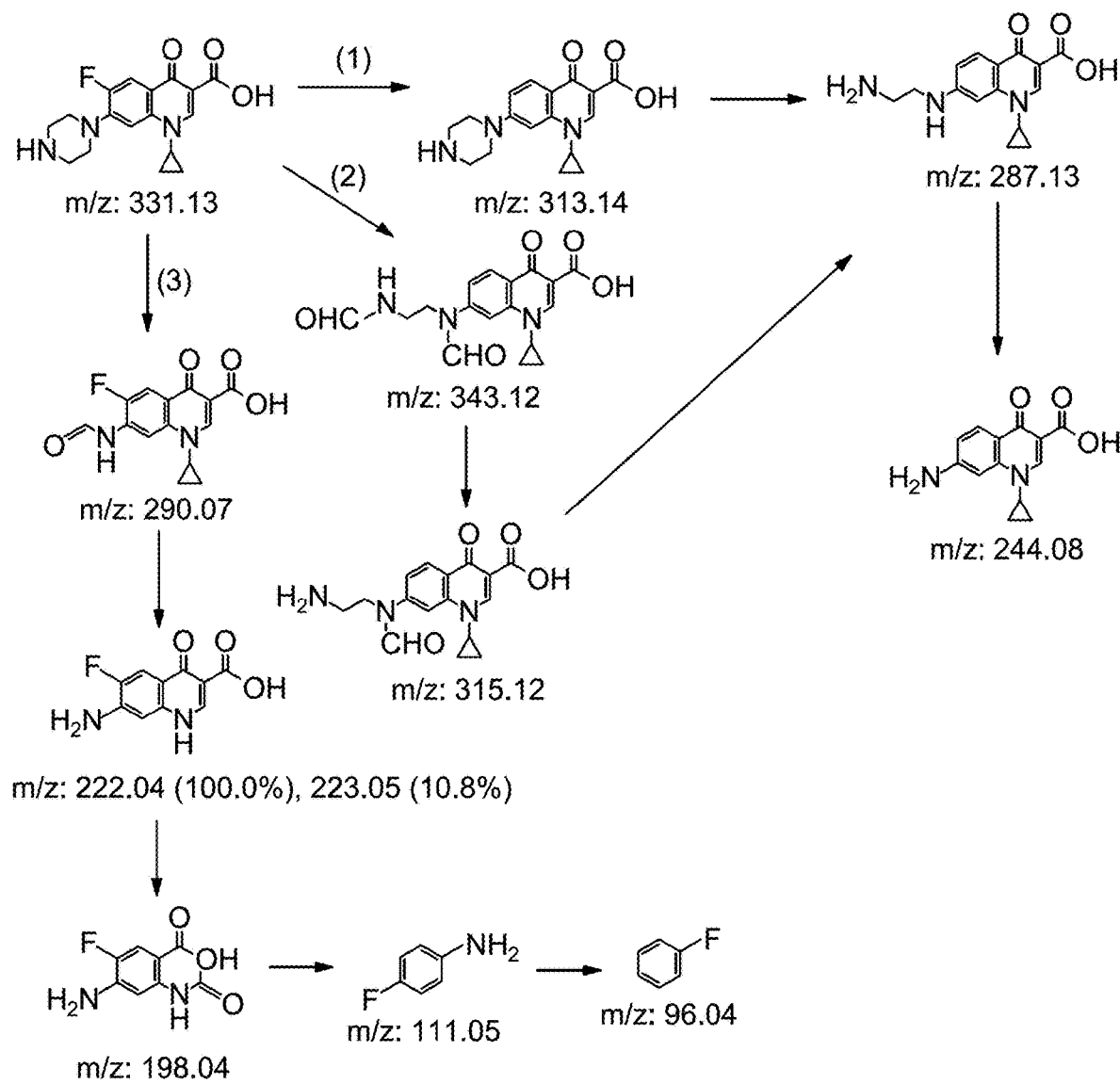
FIG. 1D is a schematic diagram depicting an exemplary scheme for photodegradation pathways of ciprofloxacin with $FeS_2/\alpha$-$Fe_2O_3$@10% $TiO_{2-x}$ under visible light irradiation using potassium persulfate (PPS) (1 and 2) oxidants and $H_2O_2$ (3) oxidants, according to certain embodiments.

FIG. 1D shows a variety of CIP degradation intermediates and degradation pathways which were consider in the analysis of the HPLC/MS data. Path number 1 is shown by 3 molecular ion peaks indicating intermediates with m/z values of 313, 287, and 244. Defluorination, piprazine ring oxidation, and the removal of two —$CH_2$ and —$NH_2$ groups are indicated as the degradation time increases while applying the persulfate oxidizing agent. Path No. 2, on the other hand, shows the fragments m/z=313, 343, 315, 287, and 244, which indicate the production of certain unique chemicals during the CIP-PPS degradation process in comparison to previous molecules reported in the literature. They consequently indicate the subsequent CIP chemical modifications: defluorination (m/z=343) and dialdehyde derivative formation (m/z=315.), piprazine ring oxidation, and the removal of amine nitrogen (m/z=244). Potential intermediates were found in path 3 during the CIP photodegradation process utilizing $H_2O_2$. Intermediate products were observed at m/z=290, 222 (223), 198, 111, and 96. These intermediates are part of the fragments that are generated by the following processes: ring openings-oxidation (m/z=290), cyclopropane opening+decarbonylation (m/z=222/223), quinolonic ring oxidation (m/z=198), elimination of NH—C=O and COOH (m/z=111), and $NH_2$ group removal (m/z=96). It is also possible for the fluorobenzene (m/z=96) produced to break down into other molecules or into water and carbon dioxide. Most of the organic matter was converted to water and carbon dioxide while using $H_2O_2$ at the end of the 120-minute analysis, which supported 100% of CIP removal and 75% of CIP elimination as disclosed by the TOC analysis. Regarding the $FeS_2/FeO@10TiO2-x/H_2O_2$ process, it is important to emphasize that hydroxyl radical attack, as opposed to sulfate radical attack, greatly promotes efficient piperazine ring fragmentation.

Example 14: Water Splitting

Figure 13A:
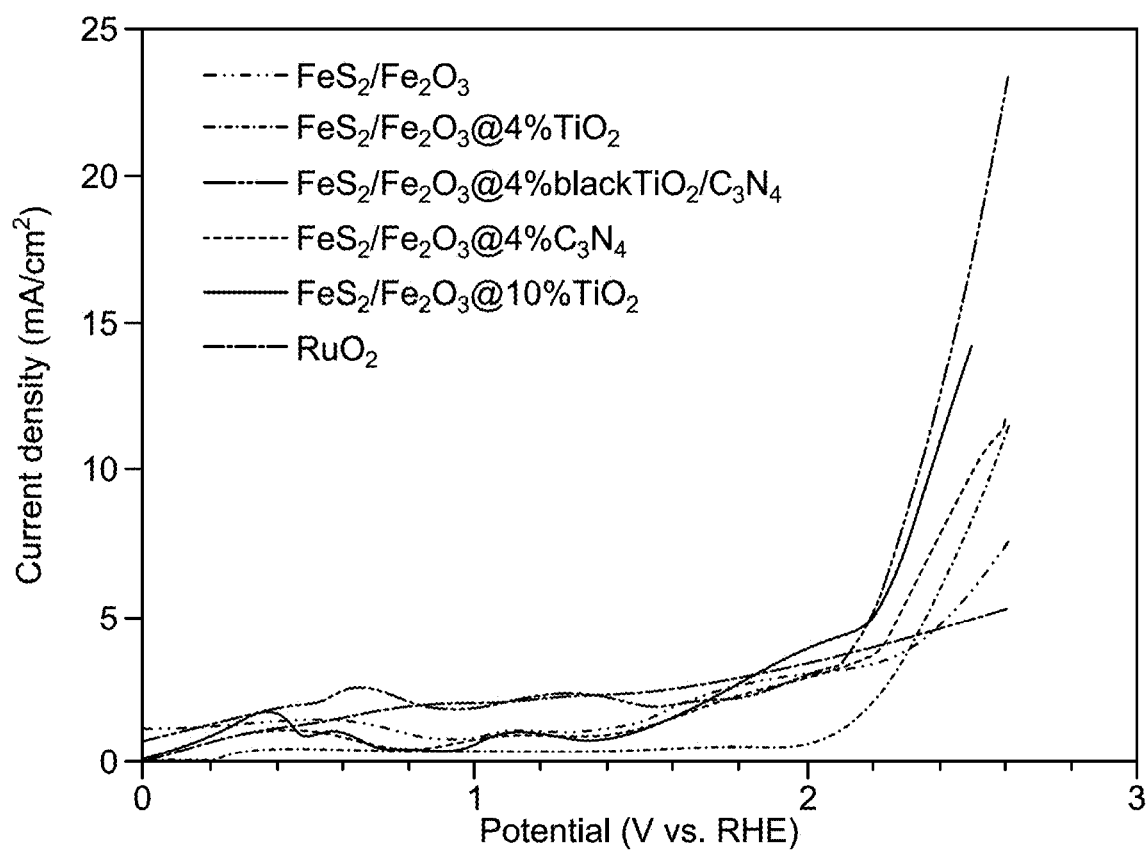
FIG. 13A shows polarization curves of all catalysts for OER in 1.0 M KCl, measured with a scan rate of 10 millivolts per second (mV/s) under visible irradiation, according to certain embodiments.

The Tafel slope and linear sweep voltammetry techniques were used to determine the kinetic parameters of OER and HER for each photocatalyst under visible light illumination. Linear sweep voltammograms (LSVs) were recorded in the potential ranges 0-3.0 V and −1.2-0.0 V for OER and HER, respectively, versus the reversible hydrogen electrode (RHE). FIG. 13A illustrates the resulting LSVs of $FeS_2/FeO@4\%$ $TiO_2$, $FeS_2/FeO@4\%$ $C_3N_4$, $FeS_2/FeO@4\%$ $TiO_2b/C_3N_4$ and $FeS_2/FeO@10\%$ $TiO_2$ in comparison to $FeS_2/FeO$ in a 1.0 M KCl electrolyte. Among the four different materials studied, $FeS_2/FeO@4\%$ $TiO_2b/C_3N_4$ showed the lowest overpotential for OER, with an onset at approximately 0.93 V. It reached a current density of 10 $mAcm^{-2}$, a bench-mark value for evaluating OER catalysts, with an overpotential of 1.09 V. This photocatalyst never reached the benchmark value of 10 $mAcm^{-2}$ under dark conditions and indicated an onset at 1.5 V. The maximum reached photocurrent density was 23 mA $cm^{-2}$ at 1.22 V. This indicates that the development of heterogeneous interfaces can obviously boost conductivity and OER catalytic activity.

The existence of two oxidation peaks during photoirradiation may be attributable to the transition of Fe sulfides/oxides into metal (oxy)hydroxide during the OER test under oxidizing potentials, while its absence in the dark may indicate the relevance of (oxy)hydroxide moieties to OER. The OER overpotentials for rest of the photocatalysts at a current density of 10 $mAcm^{-2}$ were in the order; $FeS_2/FeO@10\%$ $TiO_2$ (1.14 V)<$FeS_2/FeO@4\%$ $C_3N_4$ (1.30 V)<$FeS_2/FeO@4\%$ $TiO_2$ (1.33 V)<$FeS_2/FeO$ (1.57 V).

Figure 13B:
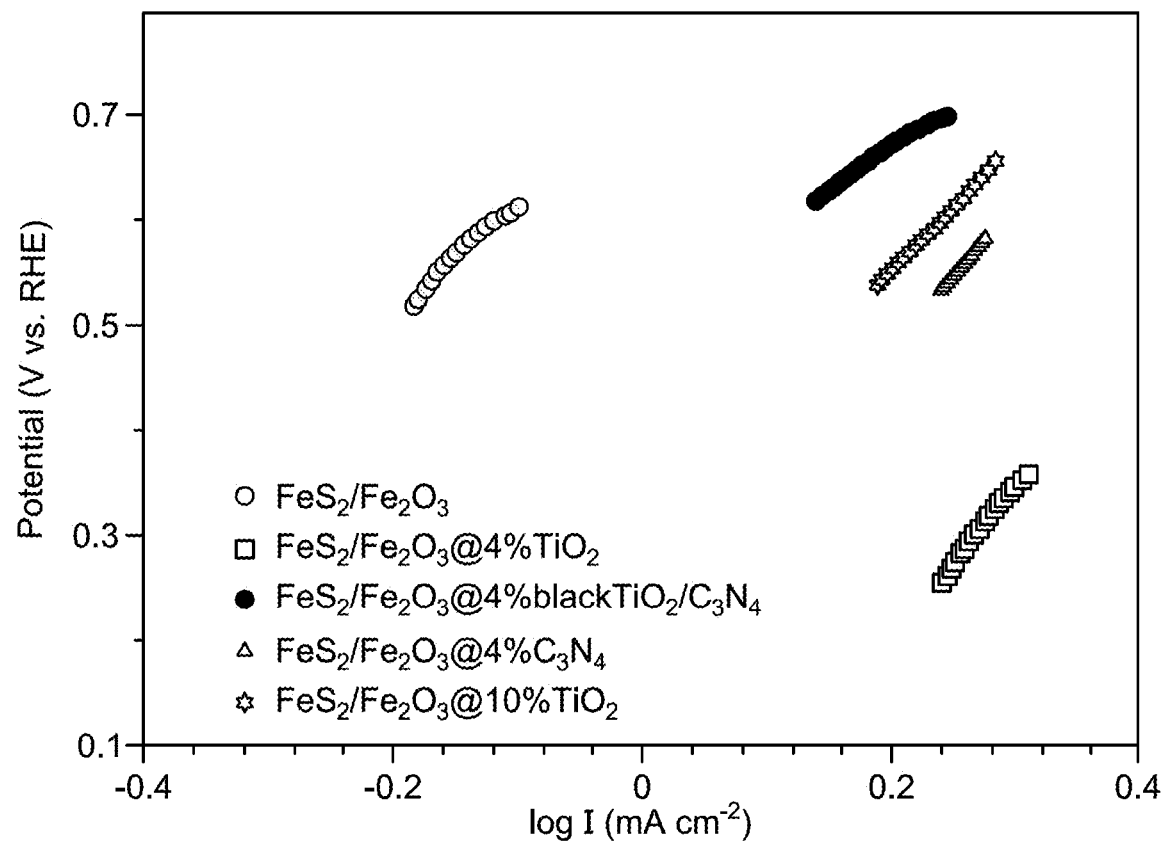
FIG. 13B depicts Tafel plots to determine the kinetic parameters of OER and HER for each photocatalyst under visible light illumination, according to certain embodiments.

The energetic kinetics of charge transfer across the electrode-electrolyte boundary during OER was examined using the Tafel slope technique (FIG. 13B). The slope of 51.56 mV $dec^{-1}$ obtained for $FeS_2/FeO@4\%$ $TiO_2b/C_3N_4$ was the smallest among all the photocatalysts, as shown in Table 6, which tabulates the electrochemical kinetic parameters and EIS data. By comparing the OER potentials of the catalysts that contain $C_3N_4$, it was observed that the addition of black titania results in the formation of new active sites, as dedicated from XRD, XPS and TEM results, which speeds up the movement of charges over the electrode surface.

Figure 13C:
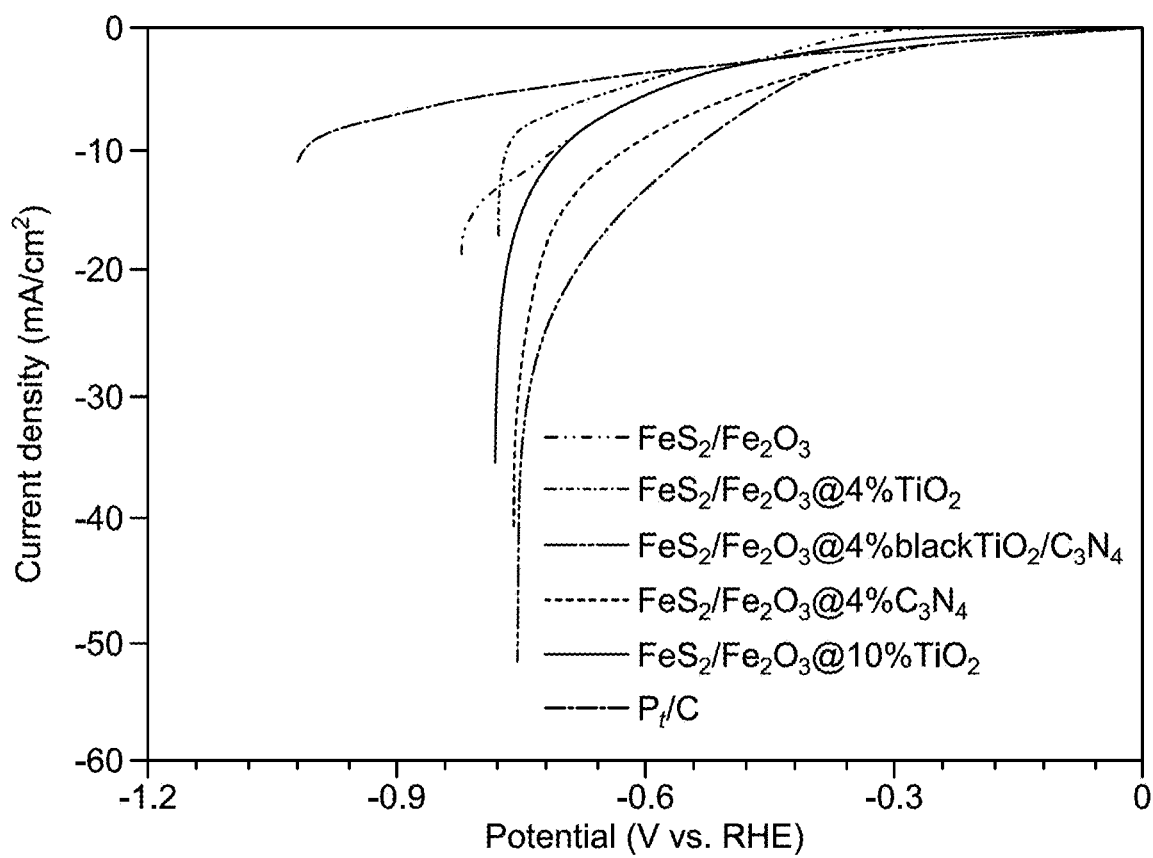
FIG. 13C depicts HER polarization curves obtained for photo electrocatalyst, according to certain embodiments.
Figure 13D:
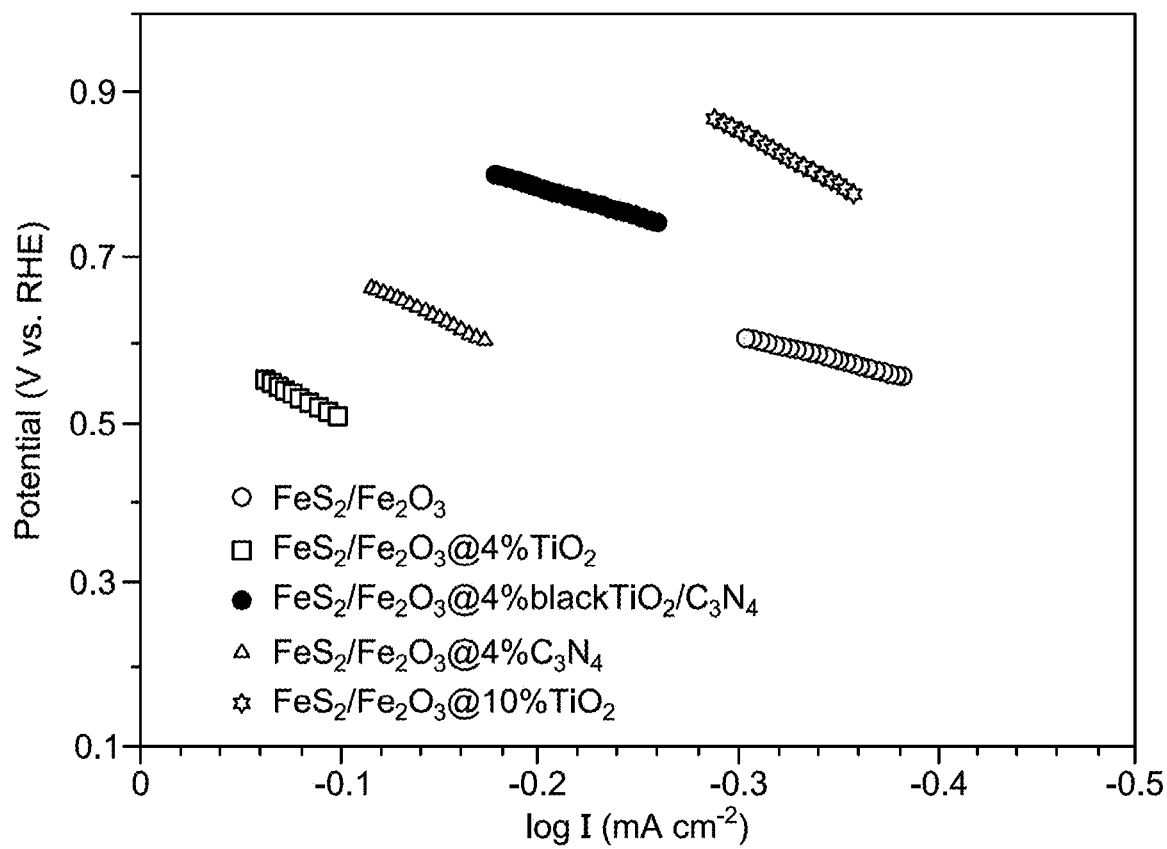
FIG. 13D presents Tafel values for electrodes, according to certain embodiments.

The highest recorded photocurrent density was 52 mA $cm^{-2}$ at −0.75 V from the same photoelectrocatalyst ($FeS_2/FeO@4\%$ $TiO_2b/C_3N_4$) towards HER. This photoelectrocatalyst also showed strong activity with an onset potential of −0.1 V against −0.4 V in the dark. It achieved a current density of 10 mA $cm^{-2}$ with an overpotential of −0.54 V (FIG. 13C) in the presence of illumination and −0.72 V in the absence of light. The activity of the rest of the photocatalysts towards HER at a current density of 10 mA $cm^{-2}$ was in the following sequence: $FeS_2/FeO@4\%$ $C_3N_4$ (−0.626 V)<$FeS_2/FeO@10\%$ $TiO_2$ (−0.702 V)<$FeS_2/FeO$ (−0.719 V)<$FeS_2/FeO@4\%$ $TiO_2$ (−0.76 V). Similarly, the $FeS_2/FeO@4\%$ $TiO_2b/C_3N_4$ electrode presented the lowest tafel value (FIG. 13D), comprised of −23.72 mV $dec^{-1}$, followed in sequence by $FeS_2/FeO$ (−25.36 mV $dec^1$), $FeS_2/FeO@4\%$ $C_3N$ (−28.07 mV $dec^1$), $FeS_2/FeO@4\%$ $TiO_2$ (−30.83 mV $dec^{-1}$) and $FeS_2/FeO@10\%$ $TiO_2$ (−33.15 mV $dec^{-1}$).

It was also noted that $TiO_{2-x}$ at the 10% loading opens more active sites for accelerating OER and HER than those at the 4% ratio. The constraints on catalytic active sites and effective surface area appear to prevent the binary component of bulk $FeS_2/FeO$ from meeting the necessary conditions for high-efficiency water splitting. Additionally, techniques for enhancing their activity have been created, such as the engineering of morphology, structure, composition, and interface by incorporating 2D.

TABLE 6

Electrochemical kinetic parameters, EIS and TOF data of all photoelectrocatalysts towards water splitting in 1.0M KCl.

| Parameters | FeS$_2$/Fe$_2$O$_3$ | FeS$_2$/Fe$_2$O$_3$@4% TiO$_2$ | FeS$_2$/Fe$_2$O$_3$@4% black TiO$_2$/C$_3$N$_4$ | FeS$_2$/Fe$_2$O$_3$@4% C$_3$N$_4$ | FeS$_2$/Fe$_2$O$_3$@10% TiO$_2$ |
|---|---|---|---|---|---|
| Rs (Ω) | 34.9 | 22.8 | 50 | 26.45 | 34.9 |
| Rct (Ω) | 1068 | 532 | 100 | 473.5 | 152 |
| Cathodic tafel slope (mv/decade) | −25.36 | −30.83 | −23.72 | −28.07 | −33.15 |
| Anodic tafel slope (mv/decade) | 62.52 | 67.18 | 51.56 | 63.97 | 68.5 |
| (v)@−10 mAcm$^{-2}$η | −0.719 | −0.76 | −0.546 | −0.626 | −0.702 |
| (v)@10 mAcm$^{-2}$η | 1.57 | 1.33 | 1.09 | 1.30 | 1.14 |
| Electrochemical surface area (mF/cm$^{-2}$) | 2 | 11.5 | 25.9 | 12.9 | 16 |
| TOF for HER (s$^{-1}$) | 0.12 | 0.15 | 0.29 | 0.18 | 0.23 |

Figure 13E:
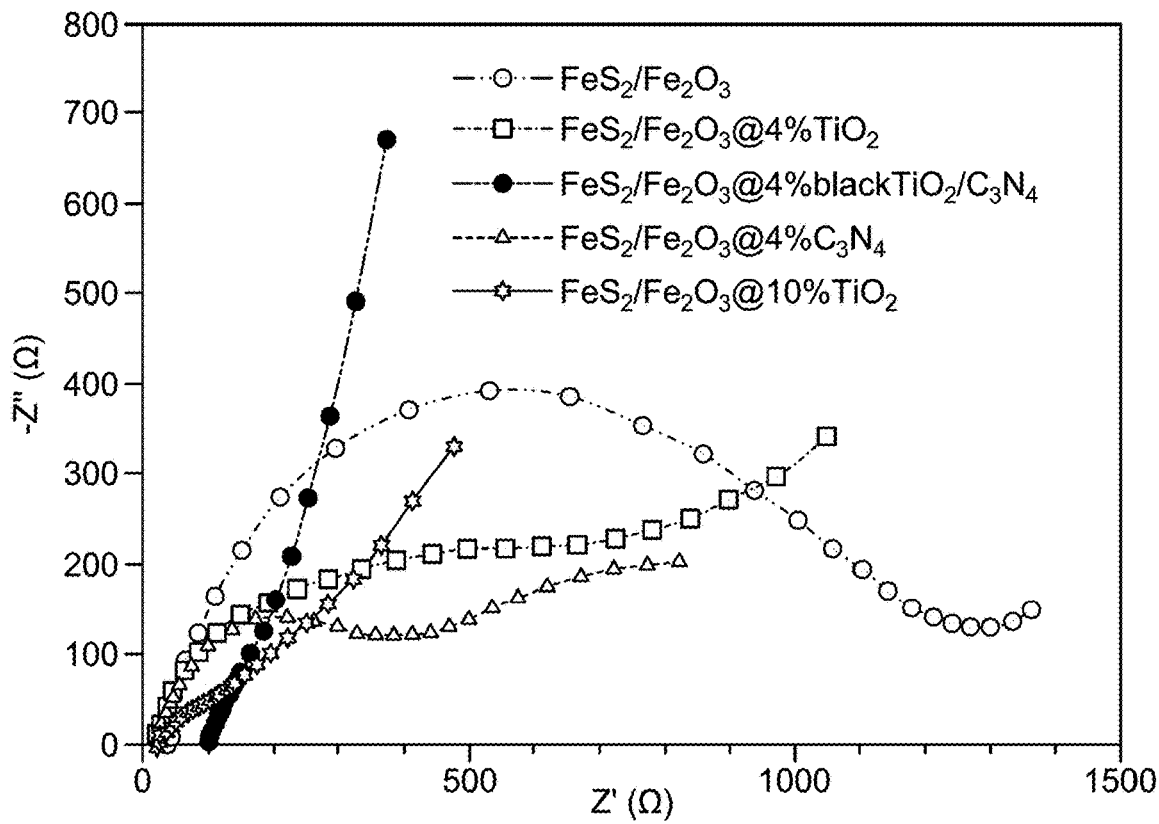
FIG. 13E depicts Nyquist plots for photo electrocatalyst, according to certain embodiments.

To evaluate the charge transport at the electrode interface, EIS experiments were conducted. Because of the narrow arc radius of the fitted model, which is directly connected to lower charge transfer resistance, the Nyquist plots (FIG. 13E) support the observation of an increased OER-HER rate of the FeS$_2$/FeO@4% TiO$_2$b/C$_3$N$_4$ as well as FeS$_2$/Fe$_2$O$_3$@10% TiO$_2$ electrocatalysts (Table 6).

The FeS$_2$/FeO@4% TiO$_2$b/C$_3$N$_4$ nanocatalyst is estimated to have a charge transfer resistance of 100Ω, significantly lower than that of FeS$_2$/FeO@10% TiO$_2$ (150Ω), FeS$_2$/FeO@4% C$_3$N$_4$ (473.5Ω), FeS$_2$/FeO@4% TiO$_2$ (532Ω), and FeS$_2$/FeO (1068Ω). This indicates the structure of the electrocatalyst FeS$_2$/FeO@4% TiO$_2$b/C$_3$N$_4$ exhibits rapid interfacial electron transfer kinetics, which may potentially account for an increase in the electrocatalytic activity. These findings verify that the interfacial electron-transfer dynamics are significantly increased by the successful bridging of the bimetallic nanoparticle (FeS$_2$/FeO) and their strong interaction with the TiO$_2$b-C$_3$N$_4$ support. Although the electrode containing C$_3$N$_4$ presented lower charge transfer values than the 4% TiO$_2$ containing electrode as well as FeS$_2$/FeO, it presented lower OER-HER activity because of the strong e$^-$-h$^+$ recombination during the visible light illumination, as shown in the PL results.

Figure 13F:
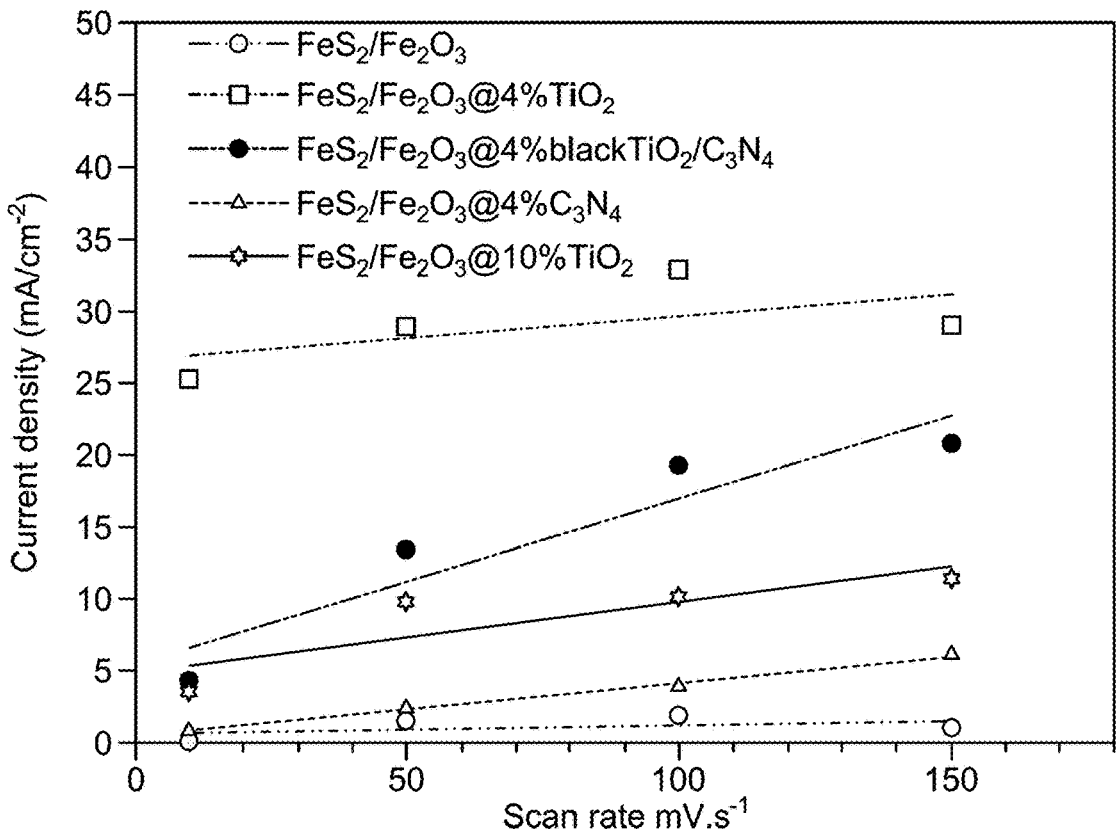
FIG. 13F shows differences in current density plotted against scan rates, according to certain embodiments.

The difference between the anodic and cathodic currents (ja-jc) obtained at various scan speeds is used to determine the current density change (|Δj|) (FIG. 13F). An additional metric to examine when investigating the catalytic capabilities of both OER and HER is the electrochemical surface area (ECSA). Greater slopes are associated with more active substances in the intrinsic catalytic efficiency value of C$_{dl}$ features. Consequently, the C$_{dl}$ reading for FeS$_2$/FeO@4% TiO$_2$b/C$_3$N$_4$ is 25.9 F cm$^{-2}$, which is larger than that of the other catalysts and 2.0 times higher than the C$_3$N$_4$ containing electrode. When compared to the 4 and 10% TiO$_2$ catalysts, the TiO$_2$black catalyst was associated with a significantly higher ECSA value (Table 6). This may be explained by specific chemical characteristics as well as the harmony among amorphous and crystalline surfaces that facilitate strong adherence to the 2D TiO$_{2-x}$ support and increased accessibility of electrochemically active sites. Through the synergistic impact of high-energy surfaces and structural imperfections, the integration of C$_3$N$_4$ with Ti$^{3+}$ and O$_v$ generated from Ti-black plays a vital role in boosting the photocatalytic activity. Furthermore, it is well known that the smaller energy gap (1.98 eV) enhances its photocatalytic activity by maximizing the absorption of visible light radiation.

By employing the turnover frequency (TOF) value for HER in internal activity computations, an expressive analysis of electrochemical activity was accomplished. FeS$_2$/FeO@4% TiO$_2$b/C$_3$N$_4$ outperformed all other photocatalysts with a TOF of 0.29 s$^{-1}$, as shown in Table 6. The TOF values decrease in the following order: FeS$_2$/FeO@4% TiO$_2$b/C$_3$N$_4$>FeS$_2$/FeO@10% TiO$_2$>FeS$_2$/FeO@4% C$_3$N$_4$>FeS$_2$/FeO@4% TiO$_2$>FeS$_2$/FeO. By improving electron nanostructures with morphological changes from flat and symmetrical to anisotropic in nature, the electronic configuration is changed, as evidenced magnetism and TEM results. This results in a boosting of the activities of the electrophotocatalyst containing 2D-layered TiO$_2$b-C$_3$N$_4$ and FeS$_2$/FeO.

Figure 14A:
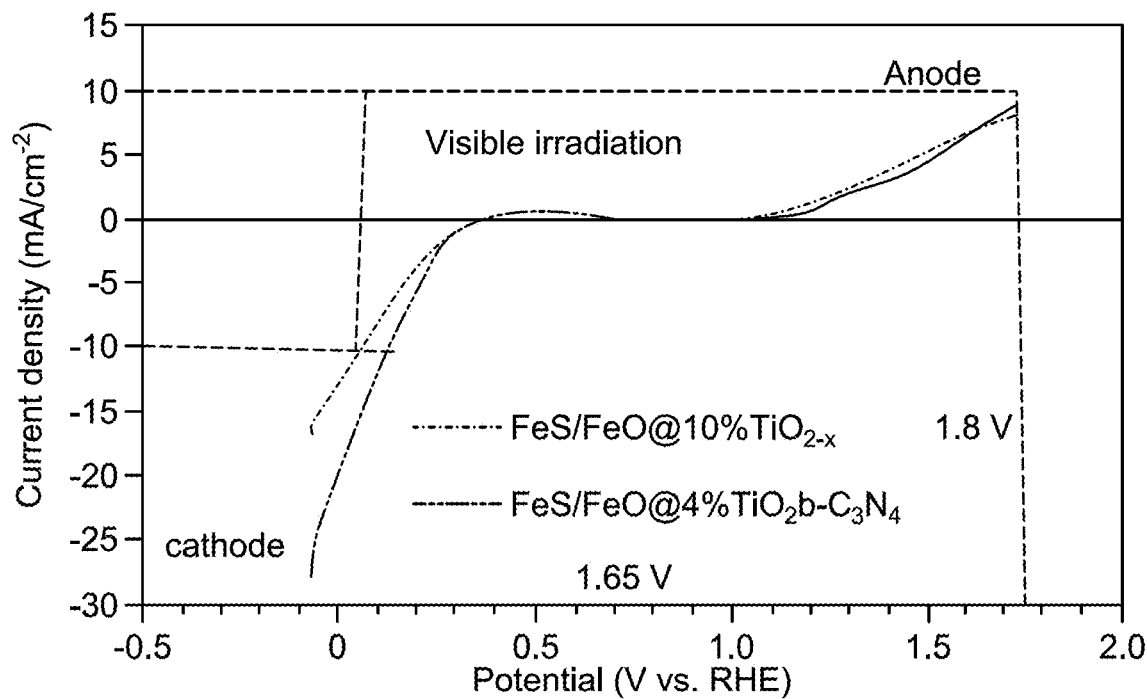
FIG. 14A shows polarization curves of the HER and OER processes on $FeS_2/FeO$@$TiO_2$b-$C_3N_4$ and $FeS_2/FeO$@10% $TiO_2$, according to certain embodiments.
Figure 14B:
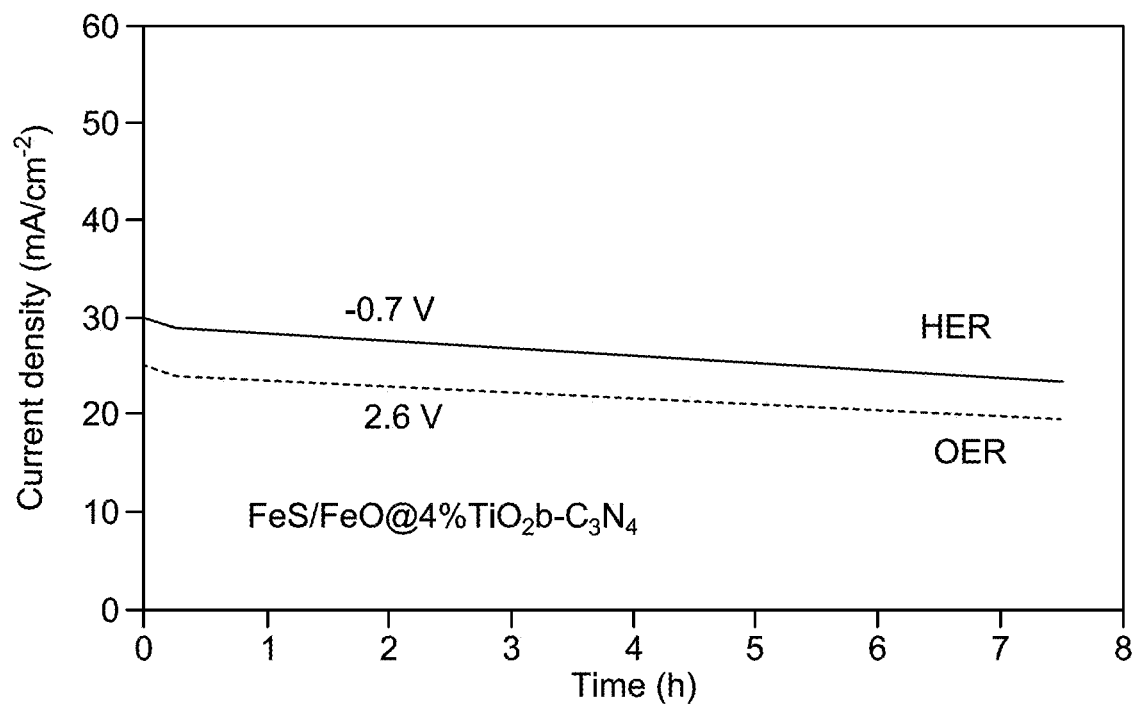
FIG. 14B shows a chrono-amperometric curves of $FeS_2/FeO$@$TiO_2$b-$C_3N_4$ at a potential of −0.7 V for HER and 2.6 V for OER, according to certain embodiments.

The FeS$_2$/FeO@TiO$_2$b-C$_3$N$_4$ and FeS$_2$/FeO@10% TiO$_2$ electrodes have been shown to exhibit significant activity for both OER and HER, indicating that they may be used as effective bi-functional electrodes for overall water splitting in neutral medium. The total water splitting performance of a two-electrode system using the electrocatalysts FeS$_2$/FeO@TiO$_2$b-C$_3$N$_4$||FeS$_2$/FeO@TiO$_2$b-C$_3$N$_4$ and FeS$_2$/FeO@10% TiO$_2$||FeS$_2$/FeO@10% TiO$_2$ as both cathode and anode in a 1.0 M KCl solution is depicted in FIG. 14A. Remarkably, the former achieves a significantly lower cell voltage (1.65 V) at a current density of 10 mA cm$^{-2}$ compared to the latter nanocomposite catalyst cell (1.8 V). The chrono-amperometry curves of the FeS$_2$/FeO@TiO$_2$b-C$_3$N$_4$ nanocomposite catalyst cell for HER and OER, collected at 30 mA cm$^{-2}$ and 25 mA cm$^{-2}$ respectively, are compared in FIG. 14B. Their respective measurements were at −0.7 V and 2.6 V. Both have long-term durability; after 7.5 hours, they still exhibit 80% of the initial activity. Moreover, during the stability test, persistent hydrogen and oxygen bubbles were visible on the anode and cathode. The FeS$_2$/FeO@TiO$_2$b-C$_3$N$_4$ electrode's exceptional structural stability is attributed to the rapid electro-catalytic reaction kinetics, more active sites, electrical conductivity and strong adhesion between the TiO$_2$b-C$_3$N$_4$ and FeS$_2$/FeO nanostructures, as demonstrated from the characterization results. FeS$_2$/FeO@TiO$_2$b-C$_3$N$_4$ is therefore a viable catalyst for practical usage in neutral water splitting.

The heterojunction interface of 2D TiO$_{2-x}$ sheets including FeS$_2$/FeO showed 100% and 90% photocatalytic efficacies towards CIP degradation with H$_2$O$_2$ and PPS, respectively. The increased ability to absorb visible light, the existence of Ti$^{3+}$ (19%) defects, electron transport through Ti—O—Fe bridges, a smaller band gap (1.68 eV), and the appropriate number of OH groups were found to be contributing factors to this improved performance. According to the Z-scheme mechanism, this synergistic improvement may be a result of successful separation of the photon-generated charge carrier. Furthermore, the FeS$_2$/FeO@4% TiO$_2$black-C$_3$N$_4$ nanocomposite electrode showed better PEC capabilities than the other nanocomposite materials, according to the PEC water splitting parameters assessment. Its apparent visible light absorption, high electrochemical surface area, rapid charge kinetics, and efficient charge separation at the heterojunction interface are all possible contributing factors to the PEC performance of the nanocomposite. The nanocomposite achieved overpotentials of −0.546 V at 10 mA cm$^{-2}$ for HER and 1.09 V mV at 10 mA cm$^{-2}$ for OER. At 10 mA cm$^2$, the nanocomposite displayed a cell voltage of 1.65 V while retaining 80% stability after 7-8 h. The enhanced PEC activity of the nanocomposite can be attributed to the close interaction between the two different morphologies of FeS$_2$ and FeO in 2D.

Numerous modifications and variations of the present disclosure are possible in light of the above teachings. It is, therefore, to be understood that within the scope of the appended claims, the invention may be practiced otherwise than as specifically described herein.

The invention claimed is:

1. A nanocomposite, comprising
FeS$_2$ nanoparticles;
α-Fe$_2$O$_3$ nanoparticles;
TiO$_2$ nanoparticles; and
C$_3$N$_4$ nanosheets, wherein
the nanocomposite has a ratio of Fe(II) to Fe(III) of 0.50:1 to 1.15:1; and
the nanocomposite has a mean particle size of 100 to 400 nm.

2. The nanocomposite of claim 1, wherein
the TiO$_2$ nanoparticles are present in an amount of 1 to 15 wt. %, based on a total weight of nanocomposite; and
the C$_3$N$_4$ nanosheets are present in an amount of 1 to 15 wt. %, based on a total weight of nanocomposite.

3. The nanocomposite of claim 1, having
a band gap of 1.65 to 2.15 eV; and
an electrochemical surface area of 13 to 40 mFcm$^{-2}$.

4. The nanocomposite of claim 1, having
a saturation magnetization of 0.001 to 0.1 emu/g;
a remnant magnetization of 0.0001 to 0.01 emu/g; and
a coercivity of 500 to 2000 G.

5. A method of forming the nanocomposite of claim 1 the method comprising
hydrothermally treating an aqueous mixture of an iron precursor and thiourea at 150 to 250° C. for 2 to 28 hours to form an iron-comprising component;
calcining a mixture of imidazole, hydrochloric acid, and titanium dioxide at a first temperature of 300 to 375° C. for 2 hours and a second temperature of greater than 375 to 450° C. for 1 hour to form a titanium-comprising component; and
ultrasonically treating a suspension comprising the iron-comprising component, the titanium-comprising component, and an alcohol having 1 to 4 carbon atoms to form a precursor mixture; and
drying the precursor mixture to form the nanocomposite.

6. The method of claim 5, wherein
the iron precursor is iron (III) acetate; and
the aqueous mixture has a ratio of iron (III) acetate to thiourea of 1:1 to 1:5.

7. The method of claim 5, wherein
the alcohol having 1 to 4 carbon atoms is methanol;
the suspension has a ratio of the iron-comprising component to the titanium-comprising component of 0.01 to 0.15; and
the ultrasonically treating is performed for 6 to 24 hours.

8. A method of electrochemically forming oxygen gas by an oxygen evolution reaction, the method comprising:
contacting the nanocomposite of claim 1 with an aqueous electrolyte solution comprising 1.0 M KCl; and
applying a potential of 0.01 to 1.5 V to the nanocomposite and a counter electrode immersed in the aqueous electrolyte solution, and
irradiating the nanocomposite with visible light.

9. The method of claim 8, wherein
the nanocomposite has an oxygen evolution reaction onset potential of 0.75 to 1.25 V relative to the reversible hydrogen electrode.

10. The method of claim 8, wherein
the nanocomposite has a potential required to generate a current density of 10 mAcm$^{-2}$ (η10) of 0.95 to 1.25 V relative to the reversible hydrogen electrode.

11. The method of claim 8, wherein
the nanocomposite has a Tafel slope of 37.5 to 65 mV dec$^{-1}$.

12. A method of electrochemically forming hydrogen gas by a hydrogen evolution reaction, the method comprising:
contacting the nanocomposite of claim 1 with an aqueous electrolyte solution comprising 1.0 M KCl; and
applying a potential of −1.2 to −0.01 V to the nanocomposite and a counter electrode immersed in the aqueous electrolyte solution, and
irradiating the nanocomposite with visible light.

13. The method of claim 12, wherein
the nanocomposite has a hydrogen evolution reaction onset potential of −0.25 to −0.01 V relative to the reversible hydrogen electrode.

14. The method of claim 12, wherein
the nanocomposite has a potential required to generate a current density of 10 mAcm$^{-2}$ (η10) of −0.75 to −0.25 V relative to the reversible hydrogen electrode.

15. The method of claim 12, wherein
the nanocomposite has a Tafel slope of −40 to −10 mV dec$^{-1}$.

16. The method of claim 12, wherein
the nanocomposite has a turnover frequency of 0.20 to 0.40 s$^{-1}$.

17. A method of photodegrading an organic pollutant, the method comprising:
irradiating with visible light a photodegradation mixture comprising
the organic pollutant,
an oxidant selected from the group consisting of hydrogen peroxide and a persulfate salt; and
the nanocomposite of claim 1,
wherein the organic pollutant is at least one selected from the group consisting of a dye, a phenol, a polycyclic aromatic hydrocarbon, an herbicide, a pesticide, an antibiotic, and a persistent organic pollutant.

18. The method of claim 17, wherein
the nanocomposite is present in the photodegradation mixture in an amount of 0.01 to 0.75 g/100 mL, based on a total volume of the photodegradation mixture.

19. The method of claim 17, wherein
the method degrades 70 to 99% of an initial amount of organic pollutant in a reaction time of 180 minutes.

20. The method of claim 17, wherein the oxidant is potassium persulfate; and the organic pollutant is an antibiotic.

\* \* \* \* \*